United States Patent [19]

Wheeler

[11] Patent Number: 5,311,240
[45] Date of Patent: May 10, 1994

[54] TECHNIQUE SUITED FOR USE IN MULTI-ZONE AUTOFOCUSING CAMERAS FOR IMPROVING IMAGE QUALITY FOR NON-STANDARD DISPLAY SIZES AND/OR DIFFERENT FOCAL LENGTH PHOTOGRAPHING MODES

[75] Inventor: Richard B. Wheeler, Webster, N.Y.

[73] Assignee: Eastman Kodak Company, Rochester, N.Y.

[21] Appl. No.: 971,012

[22] Filed: Nov. 3, 1992

[51] Int. Cl.$^5$ .................... G03B 13/36; G03B 7/08
[52] U.S. Cl. .................. 354/402; 354/412; 354/441; 354/105
[58] Field of Search ............... 354/400, 401, 402, 403, 354/406, 407, 408, 195.11, 195.12, 441, 442, 443, 444, 445, 412, 105

[56] References Cited

U.S. PATENT DOCUMENTS

| | | | |
|---|---|---|---|
| Re. 32,797 | 12/1988 | Harvey | 354/481 |
| 4,309,089 | 1/1982 | Harvey | 354/23 |
| 4,345,825 | 8/1982 | Matteson et al. | 354/23 |
| 4,354,749 | 10/1982 | Grimes et al. | 354/401 |
| 4,362,372 | 12/1982 | Kiesel | 354/195.11 |
| 4,431,287 | 2/1984 | Sakai et al. | 354/441 |
| 4,583,831 | 4/1986 | Harvey | 354/106 |
| 4,593,987 | 6/1986 | Takahashi et al. | 354/402 |
| 4,639,111 | 1/1987 | Harvey | 354/481 |
| 4,745,428 | 5/1988 | Miyasaka | 354/443 |
| 4,760,413 | 7/1988 | Taniguchi et al. | 354/106 |
| 4,785,323 | 11/1988 | Bell | 354/443 |
| 4,829,331 | 5/1989 | Aihara | 354/400 |
| 4,843,418 | 6/1989 | Taniguchi et al. | 354/419 |
| 4,860,039 | 8/1989 | Hata et al. | 354/106 |
| 4,868,589 | 9/1989 | Taniguchi et al. | 354/127.1 |
| 4,943,825 | 7/1990 | Taniguchi et al. | 354/481 |
| 4,978,981 | 12/1990 | Satoh et al. | 354/410 |
| 4,982,213 | 1/1991 | Kazami et al. | 354/195.12 |
| 5,003,329 | 3/1991 | Itabashi | 354/106 |
| 5,003,340 | 3/1991 | Harvey | 354/456 |
| 5,006,877 | 4/1991 | Katoh et al. | 354/412 |
| 5,014,078 | 5/1991 | Kudo et al. | 354/195.1 |
| 5,017,955 | 5/1991 | Kotani | 354/400 |
| 5,025,275 | 6/1991 | Taniguchi et al. | 354/106 |
| 5,038,164 | 8/1991 | Harada | 354/400 |
| 5,049,916 | 9/1991 | O'Such et al. | 354/412 |
| 5,091,742 | 2/1992 | Fukahori et al. | 354/402 |
| 5,099,268 | 3/1992 | O'Such et al. | 354/414 |
| 5,121,155 | 6/1992 | O'Such et al. | 354/414 |
| 5,124,740 | 6/1992 | Wheeler | 354/421 |
| 5,124,741 | 6/1992 | O'Such et al. | 354/441 |
| 5,130,739 | 7/1992 | O'Such et al. | 354/423 |
| 5,146,261 | 9/1992 | Soshi | 354/402 |
| 5,151,583 | 9/1992 | Tokunaga et al. | 354/406 |
| 5,168,298 | 12/1992 | Hirai | 354/402 |
| 5,170,202 | 12/1992 | Bell | 354/402 |
| 5,170,205 | 12/1992 | Saton et al. | 354/195.12 |

Primary Examiner—Russell E. Adams
Attorney, Agent, or Firm—Francis H. Boos

[57] ABSTRACT

Exposure control apparatus, and various accompanying methods, for use in a photographic camera for improving the overall quality of photographed images, i.e. increasing the number of acceptable and higher quality images, that are produced by the camera for user-selected non-standard display sizes and/or different focal length photographing modes over that obtainable by adherence to ISO/ANSI exposure standards. The quality improvement is attained through user selection of a desired display size and/or focal length photographing mode for each image to be captured followed by an optimization, for that size and mode, of various photographic exposure parameters (exposure settings and, where appropriate, flash parameters). The invention violates the ISO/ANSI exposure standards where necessary to improve image quality, for the desired display size and focal length photographing mode, beyond that which would result from adherence to these standards.

26 Claims, 15 Drawing Sheets

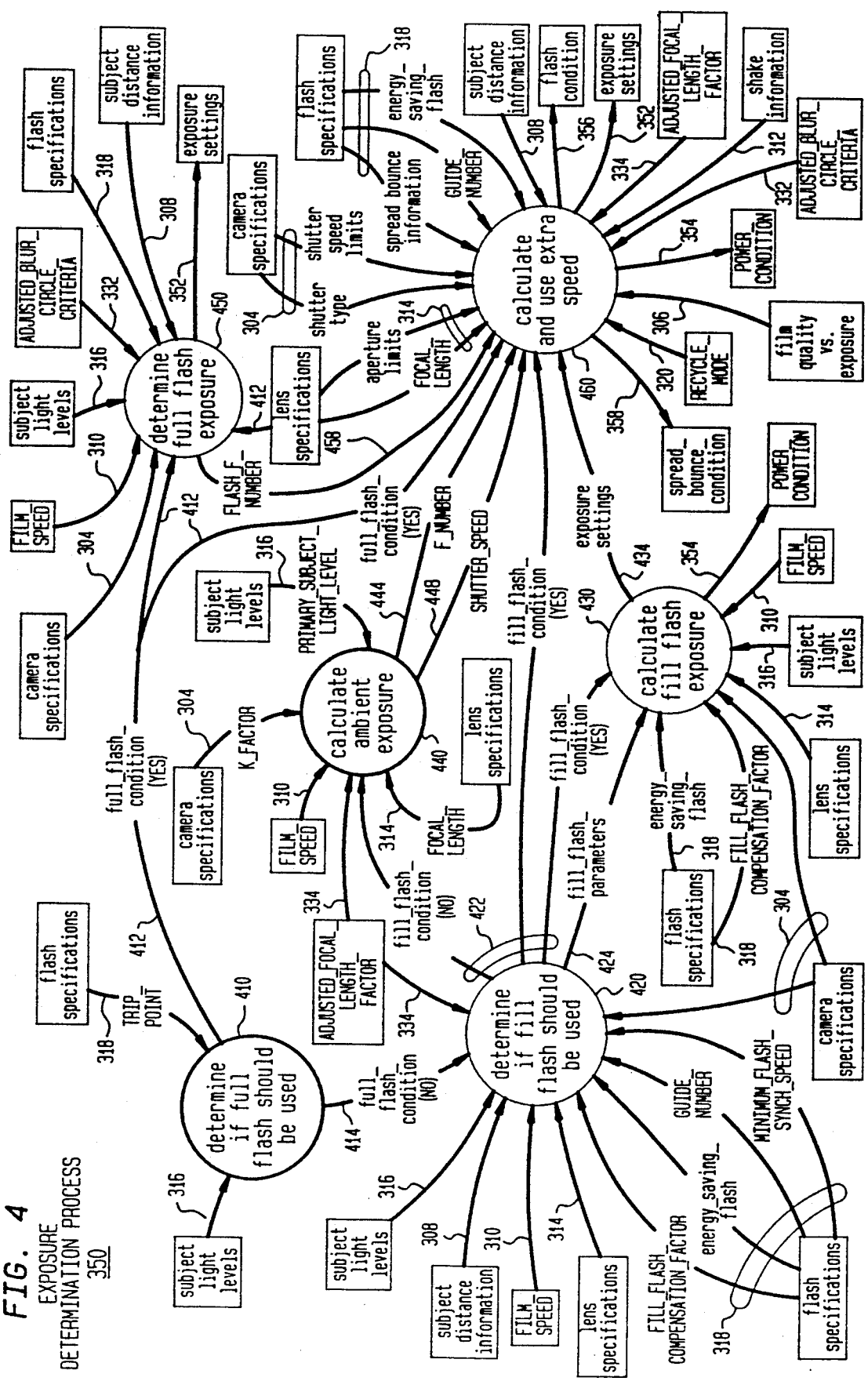
FIG. 4 EXPOSURE DETERMINATION PROCESS 350

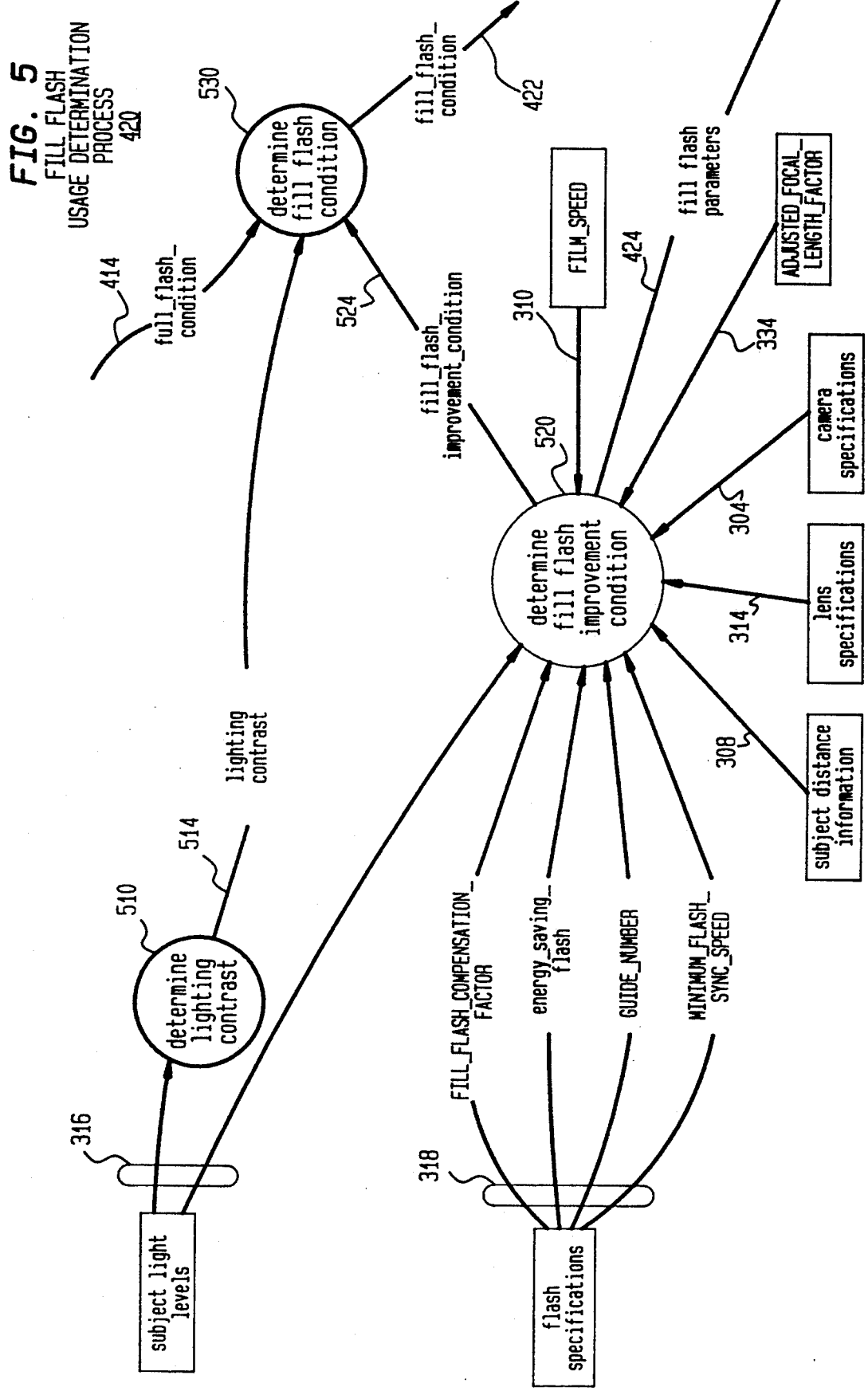

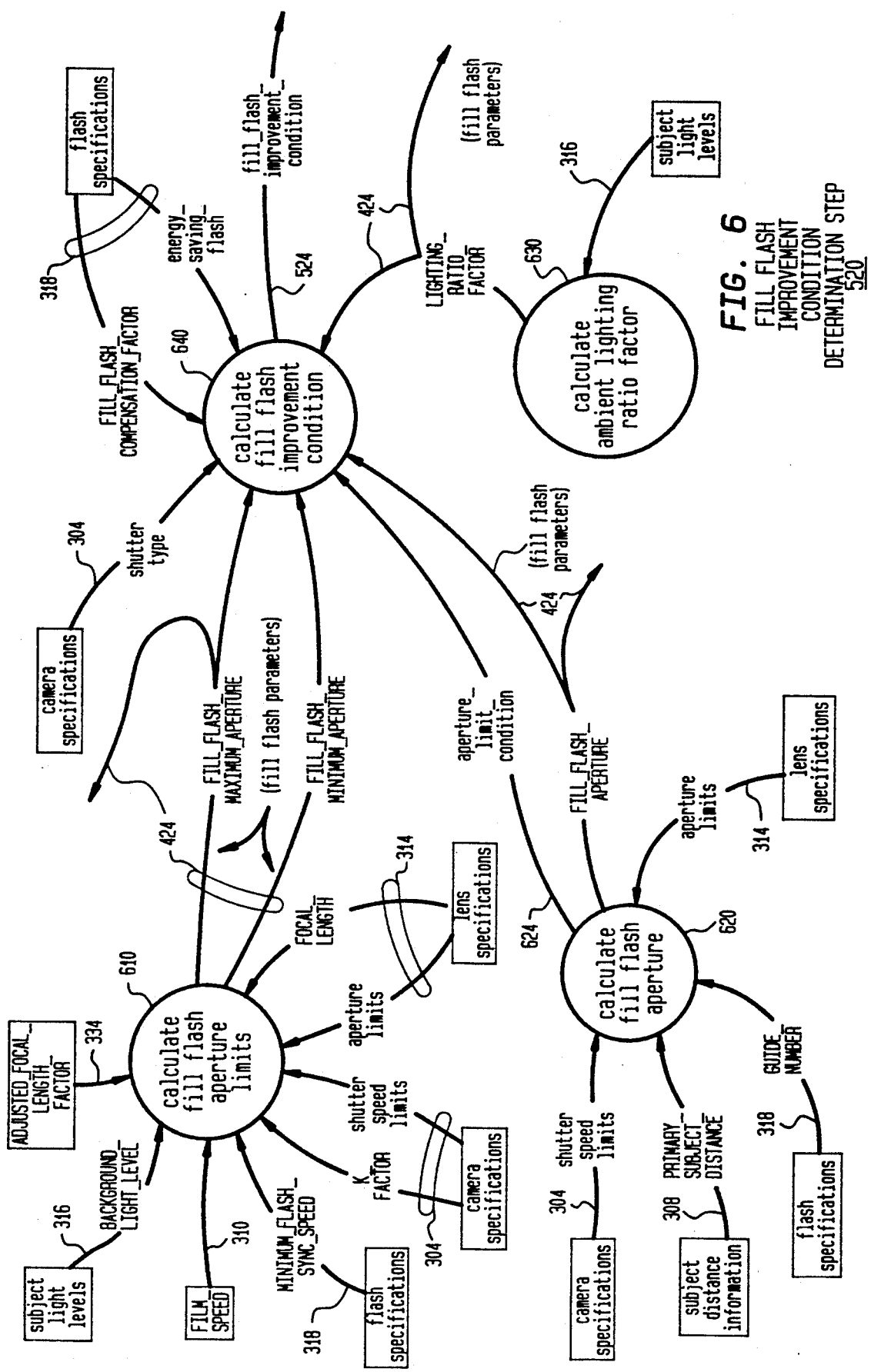

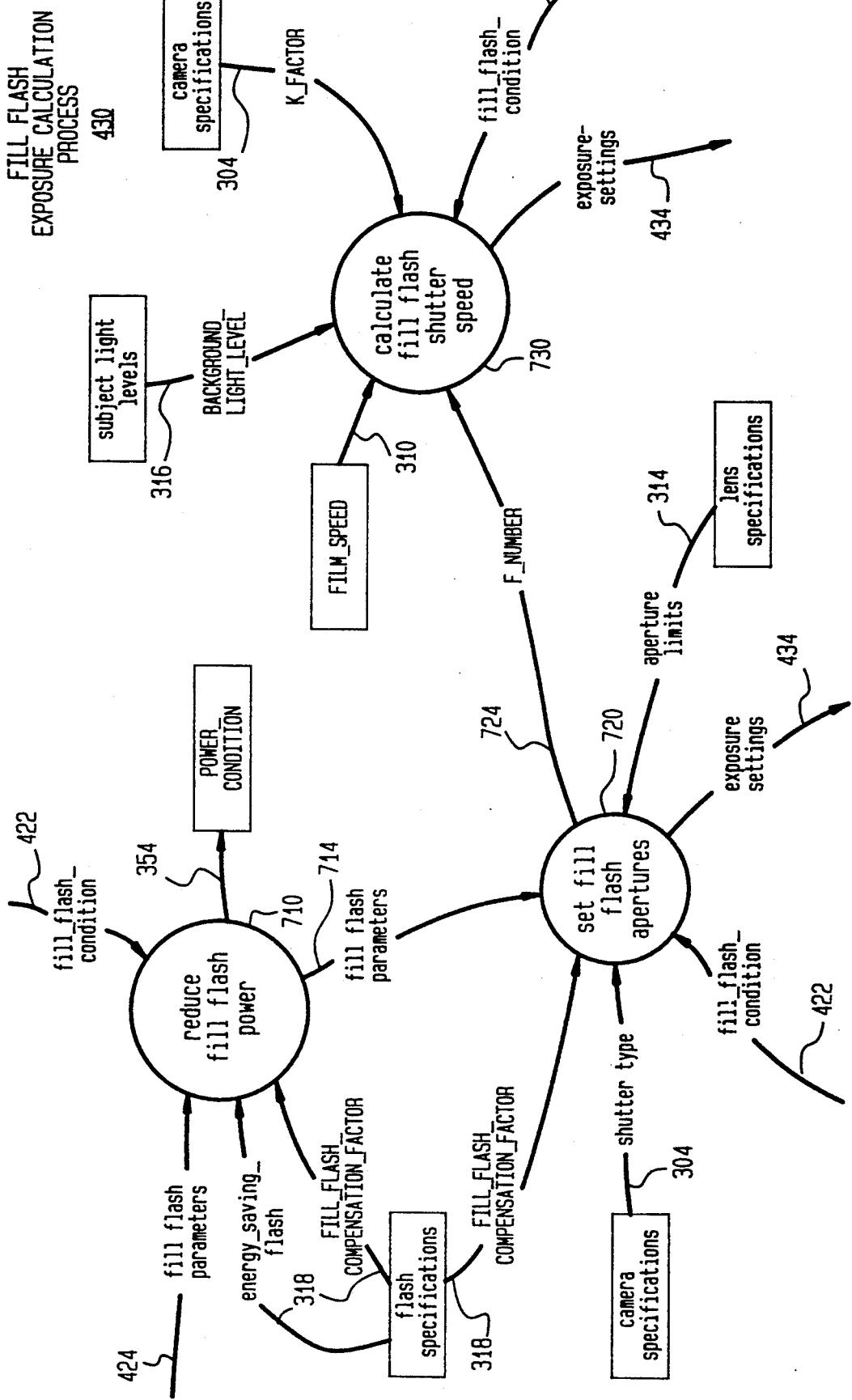

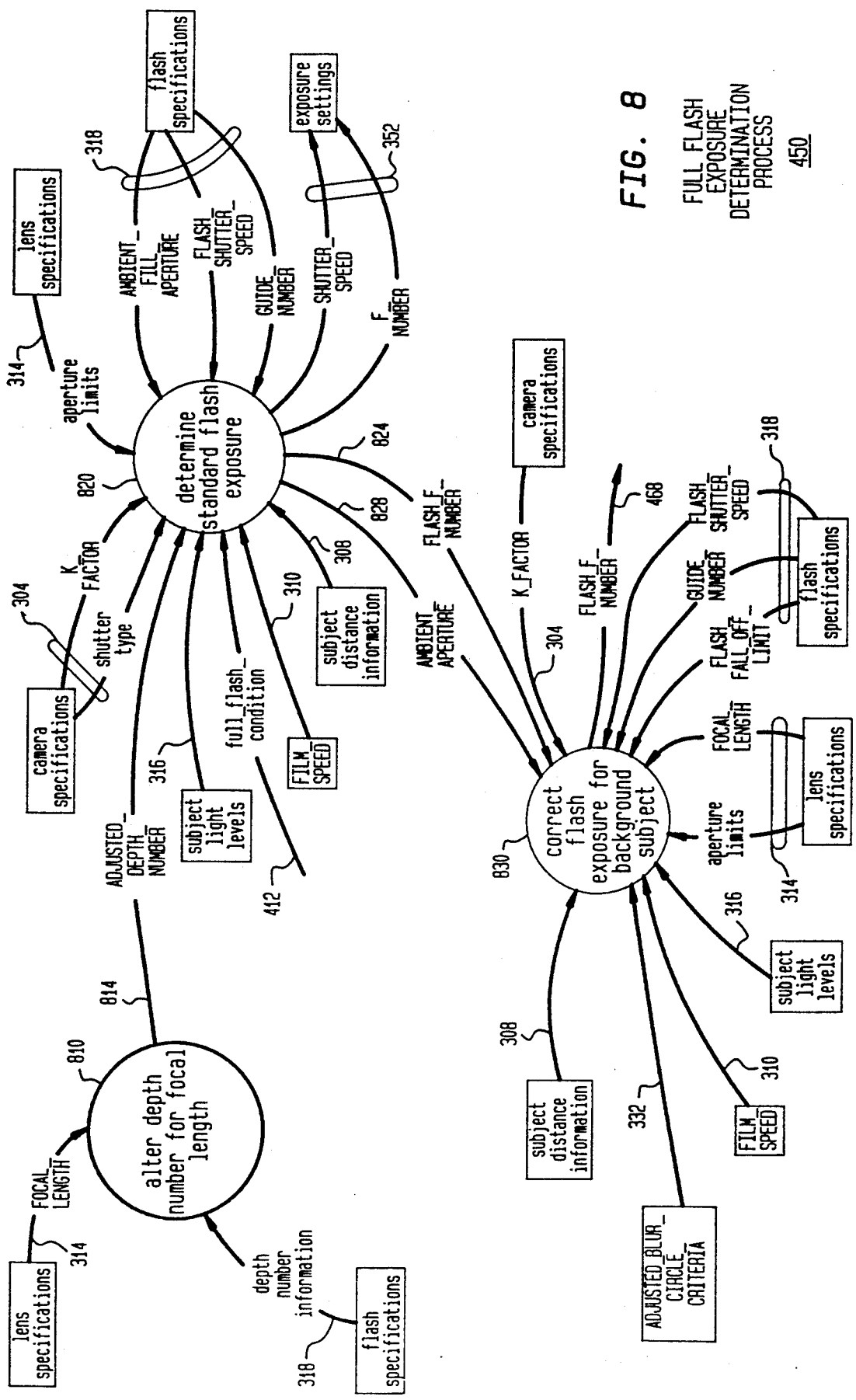

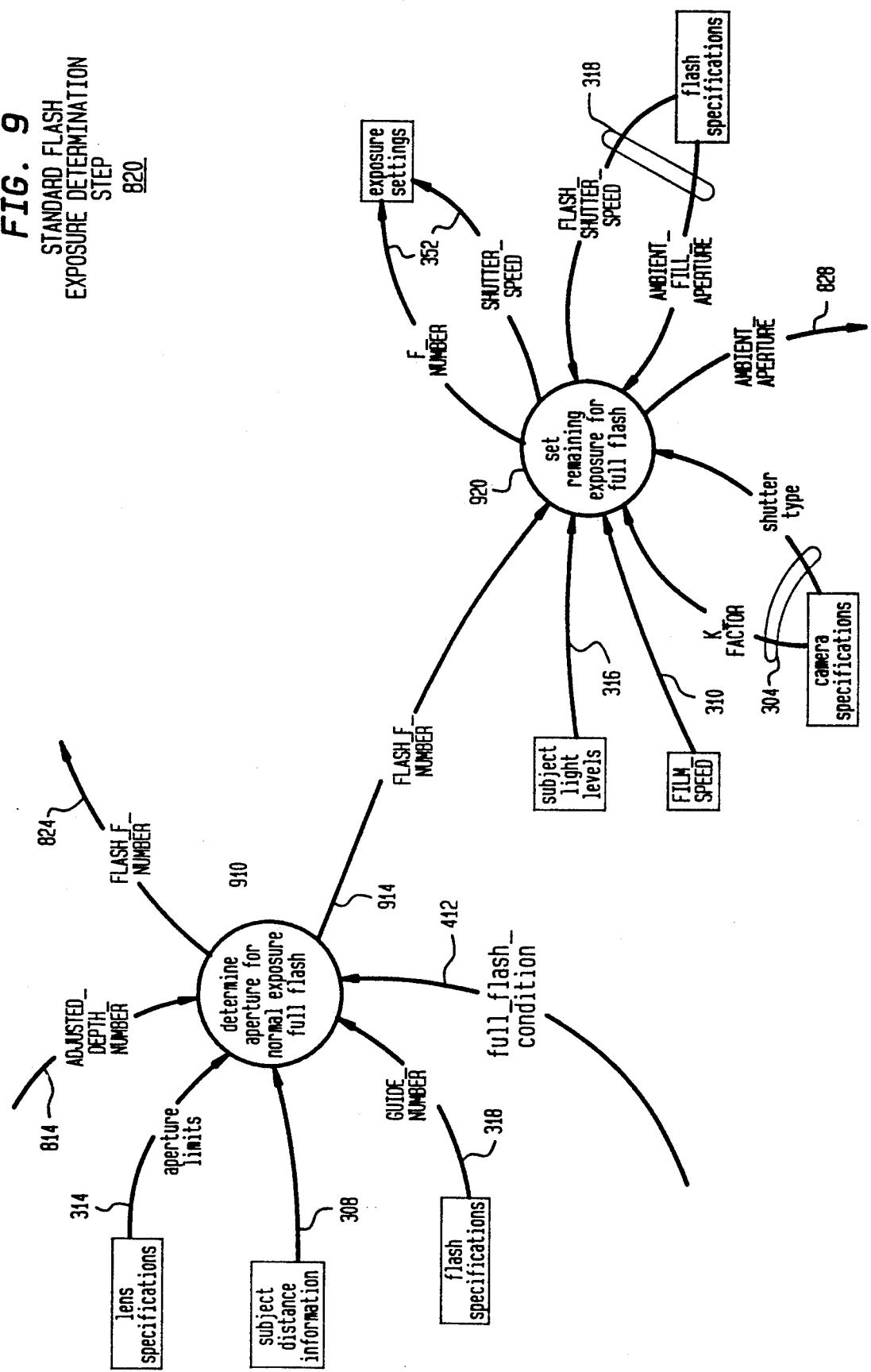
FIG. 9 STANDARD FLASH EXPOSURE DETERMINATION STEP 820

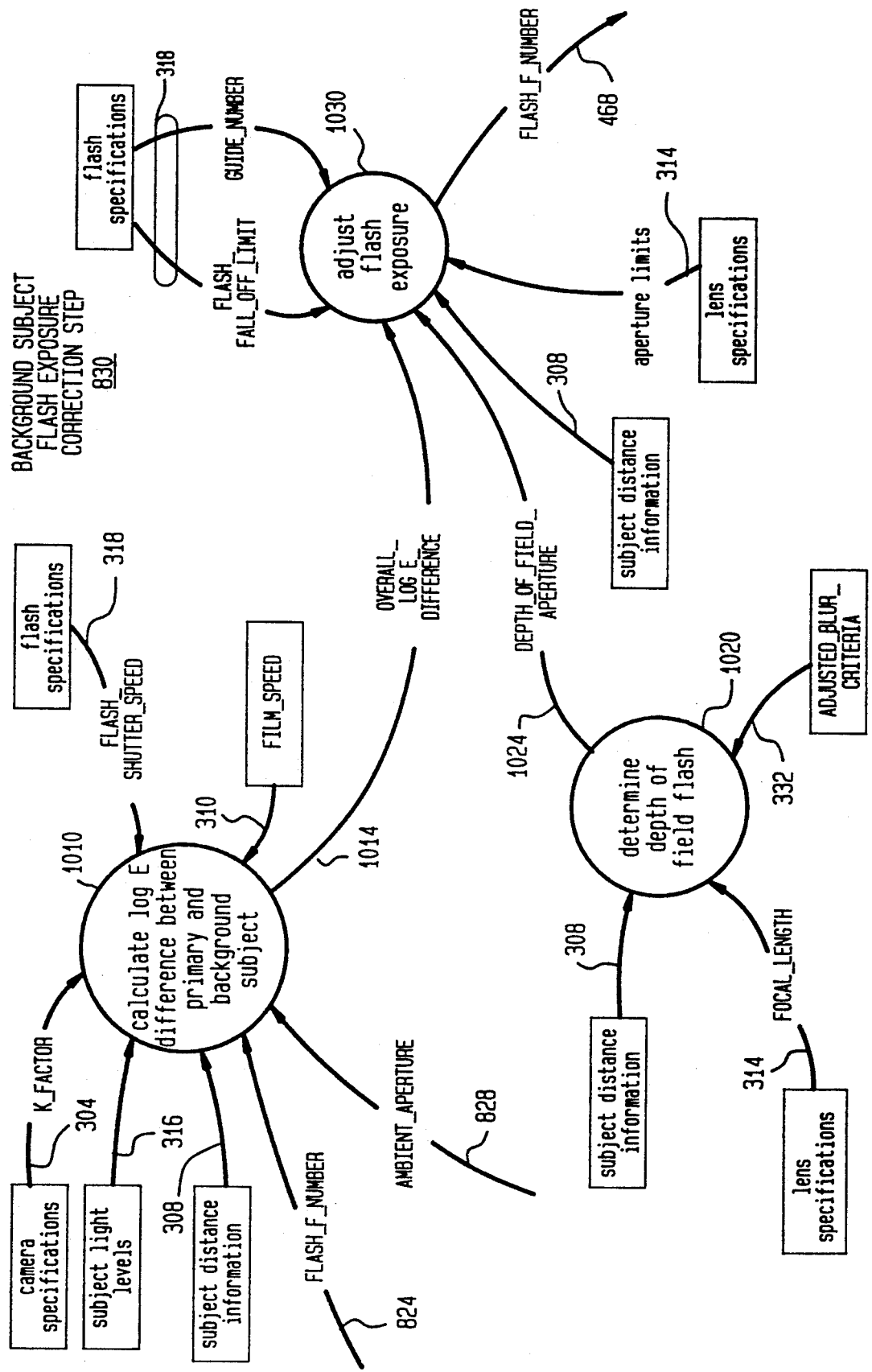

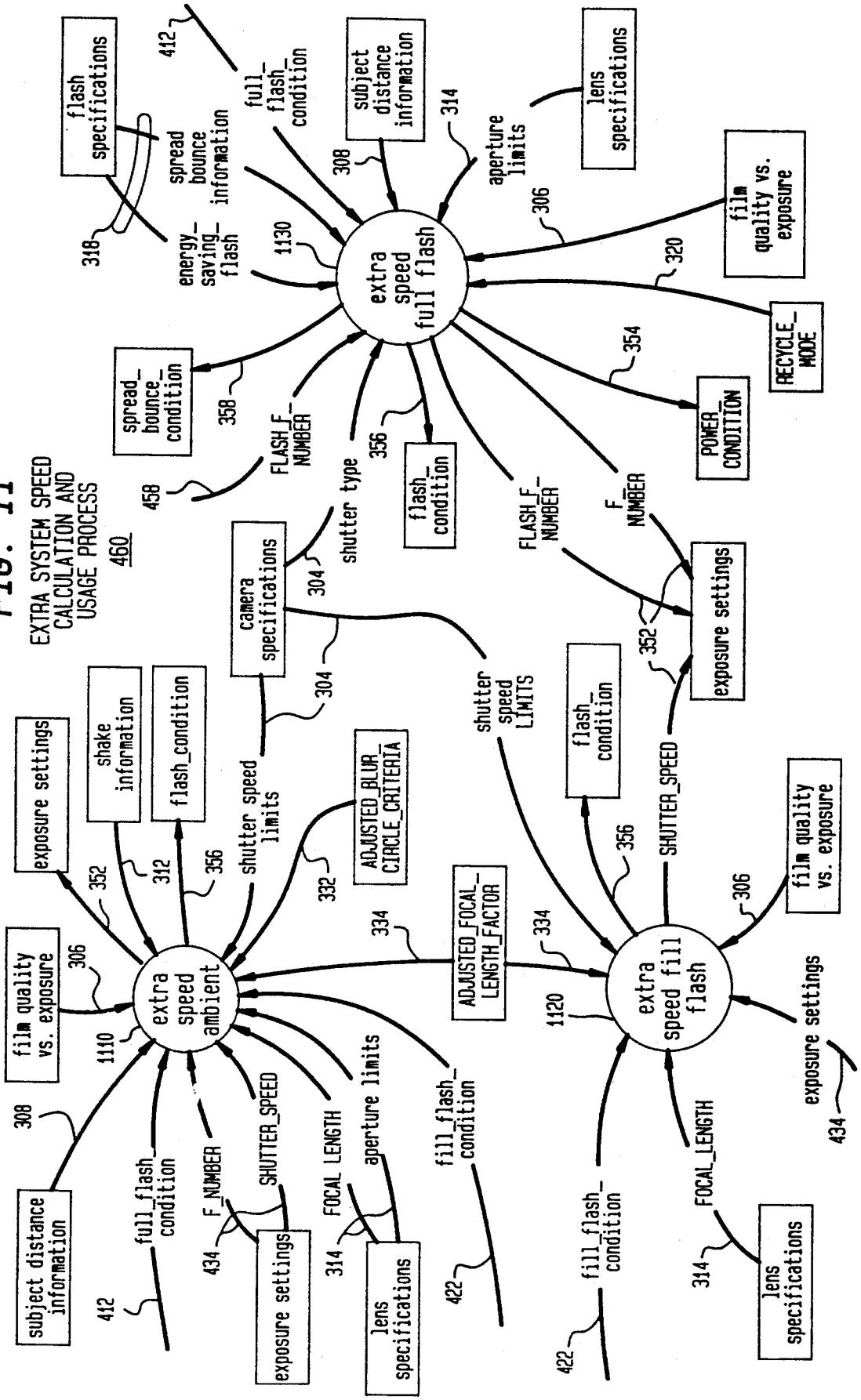

EXTRA SPEED
AMBIENT DETERMINATION
AND USAGE STEP
1110

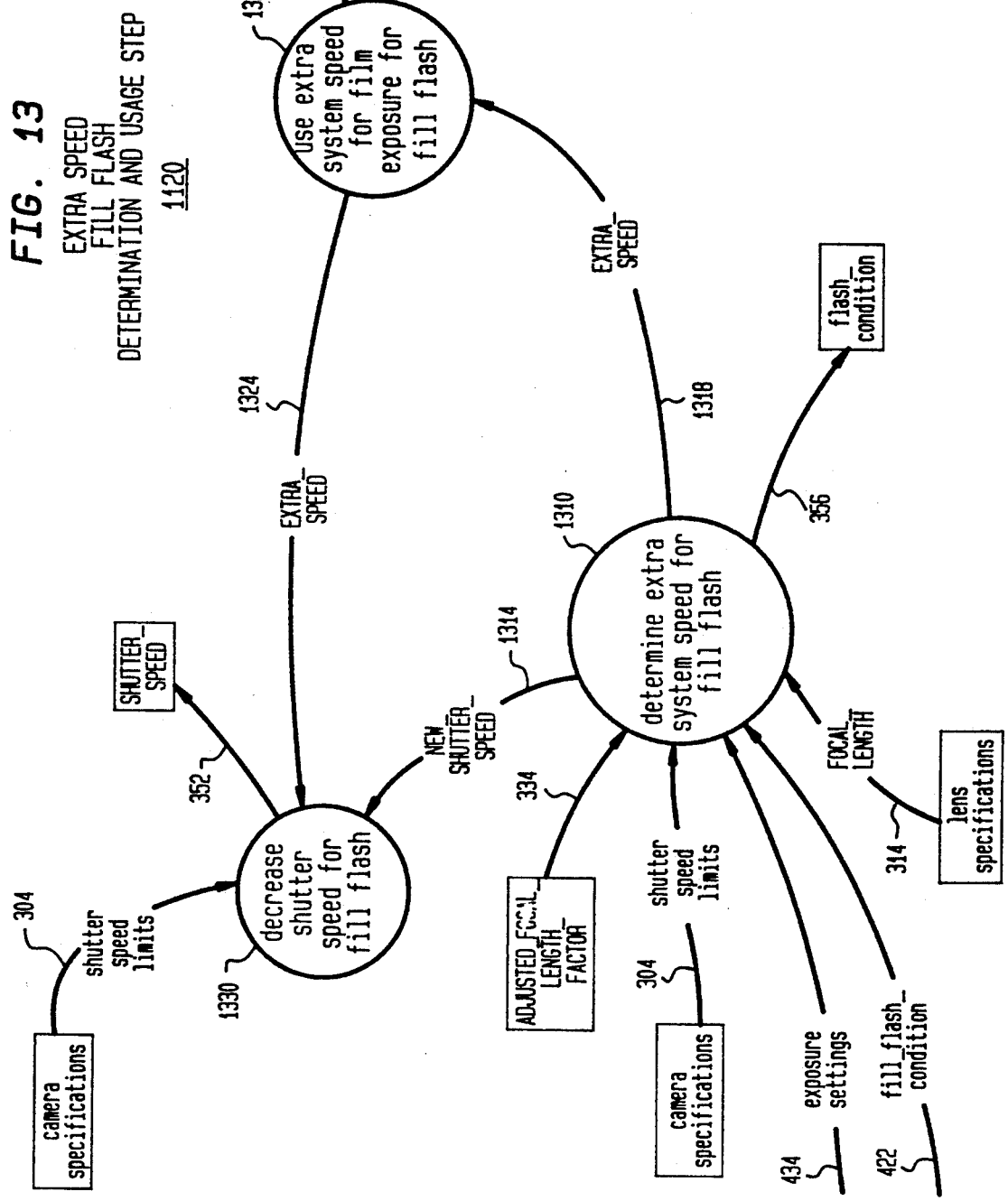
FIG. 13 EXTRA SPEED FILL FLASH DETERMINATION AND USAGE STEP 1120

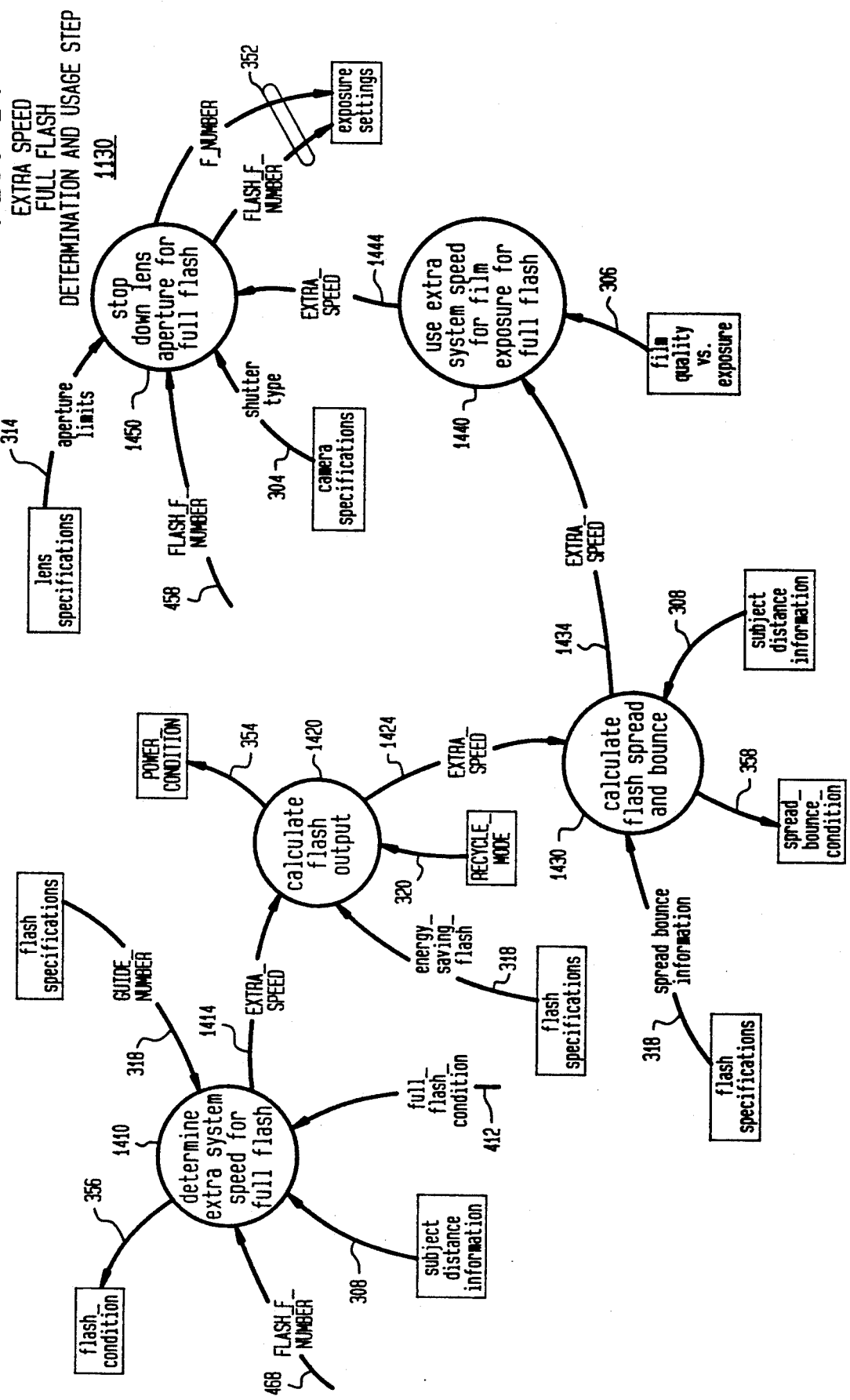

TECHNIQUE SUITED FOR USE IN MULTI-ZONE AUTOFOCUSING CAMERAS FOR IMPROVING IMAGE QUALITY FOR NON-STANDARD DISPLAY SIZES AND/OR DIFFERENT FOCAL LENGTH PHOTOGRAPHING MODES

TECHNICAL FIELD OF THE INVENTION

The invention relates to apparatus, and various accompanying methods, for use in a photographic camera for improving the overall quality of photographed images, i.e. increasing the number of acceptable and higher quality images, that are produced by the camera for non-standard display sizes and/or different focal length photographing modes. The quality improvement is attained through user selection of a desired display size and/or focal length photographing mode followed by an optimization, for that size and/or mode, of various photographic exposure parameters (exposure settings and, where appropriate, flash parameters) based upon scene requirements and film quality characteristics and, where suitable, deviations from the corresponding exposure values that would otherwise be dictated by adherence to ISO/ANSI exposure standards.

BACKGROUND ART

Photographic cameras have been in widespread use for quite some time. Basically, such a camera operates by exposing a portion of a light sensitive media, i.e. a frame of film, for a pre-defined period of time to scene illumination. The light is focused on the frame through a lens that has an aperture of a given, often variable, size. A shutter, situated behind the lens and in front of the film, opens for a selected period of time in order to permit the light to transit therethrough, illuminate and expose the film. As a result of being properly exposed and subsequently developed, the film undergoes a photochemical process, on a two-dimensional basis throughout the frame, that locally varies the optical transmissivity of each portion of the frame in proportion to the amount of illumination that reaches that portion of the frame from a corresponding portion of the scene, thereby producing, depending upon whether reversal or negative film is used, either a two-dimensional positive or negative optical image of the scene. As such, tonal variations that appeared in the scene are captured in the frame of the film. Photographic prints are often made from negatives, while transparencies (commonly referred to as "slides") are made from positives.

Though this overall process, which relies on the use of silver halide as a photosensitive reagent in film, has basically remained unchanged over many years, this process is highly non-linear and subject to a great many variables which significantly complicate its use. In particular, exposure (E) is defined, under a standardized definition, as being a product of the illuminance (I) multiplied by the time (t) during which the film is exposed to this illumination. In this regard, see specifically ANSI (American National Standards Institute) standard PH 3.49-1971 "American National Standard for General Purpose Photographic Exposure Meters" (re-affirmed in its entirety with no modifications in 1987 as ANSI standard PH 3.49-1987) [hereinafter referred to as ANSI standard 3.49-1987], and also ANSI standard PH 2.7-1986 "American National Standard for Photography—Photographic Exposure Guide" and specifically page 13 thereof. In a camera, the combination of two settings, namely lens aperture (size of the lens opening) and shutter speed (time during which the shutter remains open), primarily defines a particular exposure. Unfortunately, lens aperture and shutter speed define more than just an amount of exposure, these settings also dramatically affect picture (hereinafter including both prints and transparencies) quality and hence must be judiciously chosen in each photographic situation; otherwise, a picture (also referred to hereinafter as an image) having inferior quality will result.

Skilled photographers often experience difficulties in choosing the proper photographic settings under certain lighting conditions, e.g. lens aperture and shutter speed settings, selection of lens focal length, use and amount of flash illumination. These situations include, e.g. photographing a scene with a relatively thick subject (i.e. one necessitating a lens aperture setting that provides a sufficiently wide depth-of-field) under relatively low-light and particularly without the aid of either a flash unit or a tripod (or other similar device to hold the camera steady during an exposure). While certain lighting conditions are so extreme that they simply can not be handled by even a professional photographer—such as the above low-light condition but also with use of a telephoto lens that has a relatively long focal length, the vast majority of scene lighting conditions fortunately do not fall in this category. Nevertheless, from time-to-time actual photographic conditions may present sufficient difficulties to effectively frustrate the ability of an amateur photographer to take a picture of acceptable quality. In fact, for many inexperienced amateurs, choosing lens aperture size and shutter speed settings amounts to little more than mere guesswork, through which the probability is high that an amateur will select wrong settings and quickly become frustrated. Frustration, if it occurs sufficiently often, leads to dis-satisfaction, which in the context of an amateur photographer often means that that photographer will simply stop taking pictures and turn to other leisure activities which he or she believes to be less trying and more satisfying than photography. Since amateur photographers constitute a major portion of the photographic market, including both equipment and film, their continued satisfaction is essential to the photographic industry.

Having recognized this fact, the art has for many years pursued a goal of developing a camera that, over its lifetime, will produce more pictures that exhibit at least an acceptable and preferably higher level of quality than those resulting from cameras heretofore in use while, at the same time, relieving the photographer of the tedium and difficulty associated with choosing the photographic settings appropriate to a current lighting condition.

Hence, over the years, considerable activity has occurred in the art to provide cameras that automatically select a lens aperture size and/or shutter speed appropriate for a current scene being photographed. However, many of these automated cameras have uniformly based their exposure settings on strict adherence to the ISO/ANSI exposure standards. By doing so, these cameras provide a level of quality that, for a number of photographic conditions, is simply unacceptable. For ease of reference, these automated cameras will be referred to hereinafter as "ISO/ANSI" based automated cameras.

In essence, with such ISO/ANSI based automated cameras, once the value of one exposure parameter (such as shutter speed) is selected, a value of the other parameter (e.g. lens aperture) is dictated by that which would be required to produce a so-called ISO "normal" exposure of the scene being photographed. For example, in many inexpensive single mode and expensive multi-mode ISO/ANSI based automated cameras known in the art [the latter including those which can operate in shutter priority mode (where the photographer manually selects the shutter speed and the camera selects the lens aperture size), aperture priority mode (where the photographer manually selects the lens aperture size and the camera selects the shutter speed), and/or program mode (where the camera selects both the shutter speed and lens aperture size)], once one exposure parameter setting is fixed, the other parameter setting (e.g. lens aperture size or shutter speed, respectively) is selected by substituting the former parameter setting, along with the ISO (ASA) film speed, into a standard ISO metering equation and solving for a value of the latter parameter. The camera then simply sets the shutter speed and lens aperture mechanisms to the corresponding parameter values and then activates the shutter to capture an image of the scene.

In this regard, a "normal" exposure is defined by the ISO/ANSI standards as the lowest log exposure value, i.e. a single point—the so-called "normal" exposure point, on an exposure vs. density characteristic curve for each layer of a film in use that, in terms of faithful tone reproduction, produces an "excellent" quality image on that layer. By contrast, the ISO (ASA) film speed is defined from the exposure necessary to produce a specific value of image density on each layer of the film. Given the value of the "normal" exposure point for each such layer and associated standard exposure definitions for the film as a whole, then pairs of lens aperture and shutter speed settings that will each produce an ISO "normal" exposure can be readily determined by substituting the values for ISO (ASA) film speed and scene luminance into the ISO standard metering equation and calculating the results. See, specifically, ANSI standard PH 2.27-1988 "American National Standard for Determination of ISO (ASA) Speed of Color Negative Films for Still Photography" and ISO standard 588-1979, with the former ANSI standard adopting the latter ISO standard for determining the film speed; and the ANSI standard 3.49-1987, particularly page 21 thereof for the ISO standard metering equation; as well as D. M. Zwick, "The Technical Basis of Photographic Speed Determination or What is a Normal Exposure", *SMPTE Journal*, Vol. 88, No. 8 August 1979, pages 533-573 (hereinafter referred to as the Zwick publication). For ease of reference, the pertinent standards will be referred to hereinafter as the "ISO/ANSI exposure standards" with an exposure defined by these standards being referred to hereinafter as synonymously either an ISO "standard" or normal exposure and the normal exposure point being referred to as the ISO normal exposure point. From these definitions and use of the standard metering equation, the ISO normal exposure point occurs at higher density and exposure values on the log exposure vs. density curve than those associated with the ISO (ASA) speed point.

Since the ISO/ANSI standards are not predicated upon actual scene content, but rather for example on scene luminance, the resulting exposure settings, in certain instances, will not coincide with the actual requirements of the scene; consequently producing a rather poor quality image in these instances. For example, if a photographer were to select a shutter speed (such as through operation of an ISO/ANSI based automated camera in a shutter priority mode) to photograph a scene with a relatively thick subject, then the camera, though use of an ISO/ANSI standard metering equation and the speed o the film, would select a lens aperture that will produce an ISO normal exposure. Unfortunately, since this aperture selection is made without consideration of the actual scene content, the resulting lens aperture may not provide sufficient depth-of-field to properly cover the entire subject thickness. Hence, in the resulting photographed image, peripheral portions of the subject may appear out-of-focus and blurred. Moreover, if the photographer were to manually select a lens aperture (such as through operation of the camera in an aperture priority mode), then the resulting shutter speed for an ISO normal exposure may be inadequate to fully compensate for actual or expected camera shake given the size of the lens in use and the actual steadiness (or lack thereof) of the photographer—thereby resulting in a completely blurred and hence ruined image. In addition, owing to simple inexperience, an amateur photographer, when operating the camera in either the aperture priority or shutter priority mode, may often respectively select either a lens aperture size that simply provides insufficient depth-of-field for a given subject thickness or a shutter speed that is insufficient to fully accommodate actual or expected camera shake; in either case, such an errant setting would produce a poor quality image.

In view of the poor attendant image quality that often results from strict adherence to the ISO/ANSI standards under certain photographic conditions, efforts underway at the present assignee have resulted in the recognition that, contrary to long-standing and widely held conventional wisdom, these standards are not sacrosanct and should be intentionally violated where, based upon actual scene requirements and film quality characteristics, improved image quality will likely result. In this regard, U.S. Pat. No. 5,049,916 (issued Sep. 17, 1991 to W. R. O'Such et al—hereinafter referred to as the O'Such '916 patent and commonly assigned to the present assignee hereof) describes an automated exposure control system that, where necessary, intentionally violates the ISO/ANSI exposure standards to provide exposure (and, where suitable, flash) parameter settings that, based upon meeting actual scene requirements and use of film quality characteristics, will yield highly acceptable images under a wide variety of photographic conditions. In fact, the resulting image quality produced by this system is consistently much higher than that attainable through strict adherence to the ISO/ANSI exposure standards.

Specifically, for a scene being photographed, the exposure control system described in the O'Such '916 patent: (a) determines initial exposure settings (e.g. shutter speed and lens aperture and, where appropriate, flash parameters) that are necessary to provide a baseline, typically ISO normal, exposure of that scene; (b) ascertains corresponding exposure settings (and again, where appropriate, flash parameters) that actually meet the scene requirements, such as, e.g., expected or actual camera shake induced image blur and required depth-of-field given actual subject thickness in the scene; (c) assesses, in response to differences between the initial and corresponding exposure settings, whether any extra system speed exists and, if so, the amount of extra system speed which is available for use in photographing the scene; and (d) finally, where possible, properly utilizes that extra system speed in a pre-defined prioritized incremental manner to vary the baseline exposure settings (and again, where appropriate, flash parameters) to provide an exposure of the scene that produces a desired level of quality —e.g. in excess of the quality that would result from strict adherence to the ISO-/ANSI standards.

By utilizing the ISO/ANSI exposure settings as effectively a baseline point from which to diverge (rather than as final settings as in conventional "ISO/ANSI" based automated cameras) and then properly deviating from these settings where necessary to satisfy actual scene requirements, the system described in the O'Such '916 patent advantageously yields a greater number of images with an acceptable and generally higher level of quality than does adherence to the ISO/ANSI standards.

However, we have discovered that the system described in the O'Such '916 patent contains an implicit underlying assumption that, if ignored, can artificially limit the quality improvement attainable through use of this system.

Specifically, as with most imaging systems, the system described in the O'Such '916 patent assumes that an output image will be viewed on a single standard display size, e.g. a 3½" by 5" (approximately 8.9 cm by 12.7 cm) photographic print, and at a standard viewing distance therefrom. The exposure settings are then optimized using parameter values that are based upon this assumption. However, in practice, photographic images are not necessarily enlarged to just one standard display size.

In this regard, images situated on photographic negatives are often enlarged across a variety of different display sizes. Oftentimes, prior to photo-finishing, an individual may elect to have an image on a particular negative enlarged from one standard size, e.g. such as 3½" by 5", to another, such as 8" by 10" (the latter being approximately 20.3 cm by 25.4 cm), or even to a non-standard size. Furthermore, with the possible advent of non-standard (pseudo) focal length photographing modes, i.e. pseudo-panoramic and pseudo-telephoto, we foresee an increased demand for non-standard sized prints in the near future. In particular, through various information exchange processes that have recently been developed in the art to exchange data recorded by the camera with downstream photo-finishing equipment, a photographer should be able to store data on the film that, at the time of image capture, will specify the desired display type and/or focal length photographing mode of a resulting print. This data will likely be stored on the film in the vicinity of each frame and will specify the desired display size and/or the focal length photographing mode to use in enlarging the image, i.e. as a normal print or as either a pseudo-panoramic or pseudo-telephoto image. In use, once the film is developed and then ready to be printed, this data will be subsequently read during enlargement by a photo-printer and will appropriately control its operation (e.g. setting a proper reproduction magnification ratio) to yield the desired display size and focal length photographing mode. With respect to the photographing mode, for a pseudo-panoramic image, the image on the negative could be enlarged (with or without vertical cropping) using a particular aspect ratio that greatly favors a horizontal direction to form, for example, a 3.5" by 10" (approximately 8.9 cm by 25.4 cm) print; while for a pseudo-telephoto image, the image on the negative could be cropped both horizontally and vertically to yield a central portion of the image that, in turn, could be appropriately enlarged to a specific size. The appropriate cropping could also occur through the lens at the time of image capture. For further details of cameras that have pseudo-panoramic and pseudo-telephoto capabilities, see illustratively U.S. Pat. Nos. 5,025,275 (issued to N. Taniguchi et al on Jun. 18, 1991—hereinafter referred to as the Taniguchi '275 patent); 5,003,340 (issued to D. M. Harvey on Mar. 26, 1991) and also assigned to the present assignee hereof); 4,860,039 (issued to Y. Hata et al on Aug. 22, 1989); 4,583,831 (issued on Apr. 22, 1986); and Re. 32,797 (issued on Dec. 6, 1988—the latter two patents both being issued to D. M. Harvey and assigned to the present assignee hereof). While both pseudo-panoramic or pseudo-telephoto type images represent just one exemplary situation that may yield non-standard display sizes we expect that the increasing ease with which enlarging equipment will be able to generate a wide variety of different print sizes (both standard and non-standard) will only heighten the demand for producing images across a broad range of display sizes.

Unfortunately, while use of non-standard display sizes does affect perceptual image quality, this factor is not taken into account through the optimization process described in the O'Such '916 patent. Consequently, we have determined that, while the resulting image quality that is attained through this optimization process for non-standard display sizes and viewing distances is still quite acceptable, i.e. at least equaling and usually exceeding that which would result from adherence to the ISO/ANSI standards, further improvements in image quality may well be possible if this optimization process could be modified to properly account for this factor.

In particular, to determine a lens aperture size that meets the scene requirements, that aperture size must, at a minimum, impart sufficient depth-of-field to a resulting photograph to clearly capture the entire thickness of a subject. As described in the O'Such '916 patent, near and far subject distance measurements (or e.g. statistical assumptions therefor) are used to determine the required depth-of-field to faithfully photograph an image of a scene. Thereafter, an appropriate maximum lens aperture opening is determined as a well known function of not only the measured near and far subject distances and the focal length of the lens in use, but also of a so-called "blur circle criteria" (also commonly known as the "permissible circle of confusion"). As is well known, for any focal length lens and an aperture setting therefor, there is only one distance from the lens at which that lens will perfectly focus light emanating from any point in the object field onto a resulting focal plane. Given this, the blur circle criteria (when multiplied by an appropriate reproduction magnification ratio) defines a diameter of a circle on a print that when viewed at a given, e.g. standard, viewing distance, will generally appear as a single point to a human observer. Hence, any blur that extends over an arc on the print equal to or less than that which is encompassed by this circle is not likely to be visible at the standard viewing distance to a naked eye. In essence, through use of the blur circle criteria and the measured near and far subject distances, a lens aperture setting can be defined as that which will capture an image with tolerable amounts of blur across the full extent of the required depth-of-field. Accordingly, the resulting portions of the image that are situated within the required depth-of-field will appear, at the standard viewing distance, clear and sharply focused.

Generally in camera design and in the exposure control system described in the O'Such '916 patent, the blur circle criteria itself, for e.g. amateur photographic cameras, is taken to be a fixed value, for example 0.002" (approximately 0.005 cm) on a negative for type 135 film. For images with increased sharpness, such as those taken with professional cameras, this criteria may be taken to be 0.001" (approximately 0.0025 cm). In any event, for a standard 3½" by 5" print taken with an amateur type camera, a negative is enlarged typically by a printing magnification factor (also referred to herein as a "reproduction magnification ratio") of 3.9–4× resulting in an 0.008" (approximately 0.020 cm) blur circle on the print. For a 0.001" blur circle on the negative, the resulting blur circle on this standard sized print would be 0.004" (approximately 0.010 cm). Image blur of this magnitude is generally not visible to a human observer when this print is held at a standard viewing distance, such as for example 10" (25.4 cm) or so. In this regard, see pages 160–161 of L. Stroebel et al, *Photographic Materials and Processes* (©1986: Focal Press, Boston) for further details. Now, as the reproduction magnification ratio increases (such as through use of relatively small sized negatives, e.g. type 110 film which requires a ratio of approximately 7.2× for a 3½" by 5" print rather than type 135 film which requires a ratio of 3.9–4×, or by producing increasingly large prints from a common sized, e.g. type 135, negative), then to maintain the same size blur circle and hence image sharpness on the print, the blur circle criteria for the negative must decrease accordingly.

Unfortunately, a fixed number is used as the blur circle criteria used in the O'Such '916 patent regardless of the actual display size. Accordingly, the exposure control system described in this patent may not always produce optimum exposure (and, where suitable, flash) settings for prints that have a non-standard display size, which, in turn, will limit the quality improvement attainable through use of this system.

While an attempt has been made in the art, specifically that shown in the Taniguchi '275 patent, to limit image degradation (though in an entirely different exposure control system than that described in the O'Such '916 patent) attributable to increased image noise (graininess) at relatively high reproduction magnification ratios, this attempt does not appear to fully counter the adverse affects on changes in image quality that result from changes in display size. In particular, the Taniguchi '275 patent teaches limiting the reproduction magnification ratio, whenever a photographer, using a relatively high speed film (such as over ISO (ASA) 400 speed) with correspondingly relatively coarse particles, selects a relatively large "pseudo focal length".

Consequently, a need still exists in the art to provide an automatic exposure control system for use in a camera that not only further reduces the tedium, difficulty and guesswork, associated with using currently available automated cameras, to take pictures under a wide variety of different lighting conditions but also provides pictures that possess a further increase in their overall level of quality than that attainable through such exposure control systems now known in the art. In that regard, a specific need now exists for an exposure control system that, not only automatically selects appropriate exposure settings based upon scene requirements and film quality characteristics for an image being captured, such as the methodology which occurs in the system described in the O'Such '916 patent, but also properly compensates these settings for changes in the resulting display size of that image and/or in the focal length photographing mode associated therewith.

DISCLOSURE OF THE INVENTION

These and other deficiencies that are inherent in cameras which utilize automatic exposure control systems known in the art are substantially remedied in accordance with the teachings of our present invention.

In that regard, we have discovered that changes in image blur are not solely attributable to changes in the reproduction magnification ratio, as the art would seem to indicate, but are also attributable to changes in the distance (i.e. the "viewing distance") through which a resulting image will be viewed. In fact, we have found that both the reproduction magnification ratio and the viewing distance independently affect the perceived image blur and hence are both necessary to fully and accurately characterize the resulting blur that will arise from any change in the display size.

Along these lines, we have discovered a perceptual relationship between viewing distance and display size which permits us to accurately quantify the affect on image blur on a displayed image, and hence on the blur circle criteria for a corresponding negative, that will result from a change in the display size of that image. Contrary to what one skilled in the art might think, changes in viewing distance are not simply scaled to (i.e. a linear function of) changes in the display size.

Now, with this in mind, to modify the optimization process described in the O'Such '916 patent to yield proper exposure (and, where appropriate, flash) parameter settings for a desired display size, we have developed a so-called "display size factor" (DSF) which characterizes changes in blur circle criteria and in a so-called focal length factor based on independent changes in the reproduction magnification ratio and the perceptual viewing distance for a desired change, specified at the time of image capture, in the display size. Inasmuch as the DSF independently varies with changes in the reproduction magnification ratio, this factor can also be used to characterize changes in the focal length photographing mode for a constant display size.

In accordance with the specific teachings of our invention, a film encoder is used with a camera to record data that specifies the desired display size and/or the desired reproduction magnification ratio (generally associated and delineated in terms of, e.g., a focal length photographing mode) chosen by a photographer at the time of image capture. The chosen size and mode are selected by the photographer through appropriate adjustment of an associated switch(es) situated on the camera body. The resulting data is recorded on the film and generally located in the vicinity of the frame that will hold the image currently being captured. The display size and mode data is also used within the exposure control process performed by the camera, in conjunction with scene based measurements and stored data regarding film quality, to properly select optimum exposure (and, where suitable, flash) parameter settings that fully account for a change in the display size from a standard size to the desired size as well as a change in the effective focal length associated with the displayed image. Once these parameter settings are determined and the shutter and lens aperture (and, where needed, flash) are automatically set thereto, the shutter (and the flash) is activated and the image is photographically recorded. Subsequently, during photo-finishing, a photo-printer will read the data associated with the frame and set its reproduction magnification ratio to enlarge the photographed image to produce a print at the desired display size and which exhibits the desired focal length photographing mode. Since the exposure (and flash) parameters will have been chosen for that particular mode and display size—rather than for a normal focal length photographing mode and an assumed standard display size, the resulting image, as printed, i.e. as actually displayed, will possess a higher perceived quality level than that previously attainable. Accordingly, output images produced by our invention will uniformly possess a much higher level of quality across a wide range of display sizes, particularly non-standard display sizes, and focal length photographing modes than that which could previously be achieved in the art.

In particular, within the camera itself, the selected display size and mode is used to determine, typically by a table look-up operation, a corresponding value of the DSF. This DSF value is then used to properly adjust values of both the blur circle criteria and the focal length factor. The resulting adjusted values are then used, in lieu of previously fixed values therefor, in an exposure control process to determine optimum exposure (and, where suitable, flash) parameter values for the scene being photographed and, equally importantly, for the particular size and effective focal length of the image that will ultimately result.

With respect to exposure control process itself, initial values for various exposure parameters (including exposure settings—such as shutter speed and lens aperture size; and, where appropriate, flash parameters) are determined for each photographic situation, i.e. including a scene that is to be photographed, the film being used, and the camera (including a lens and, where employed, auxiliary scene lighting such as that produced by a flash unit), that will provide a baseline exposure of that scene. This baseline exposure is typically an ISO normal exposure. Once the initial values for these parameters are determined, corresponding values of these parameters are then determined that—essentially regardless of the ISO/ANSI exposure standards—substantially meet the actual requirements of the scene and are specific to the selected display size and focal length photographing mode then being used. For example, in an ambient lighting situation, the scene requirements would include a shutter speed that is sufficiently fast to effectively reduce image blur (adjusted for the selected display size) attributable to camera shake as well as a lens aperture setting that provides sufficient depth-of-field to fully encompass, with sufficient sharpness, both the primary subject and background portion of the scene. Thereafter, based upon differences that occur between the initial and corresponding values of these parameters, for example lens aperture and shutter speed settings, the initial value of one or more of these parameters is then changed to a new value if doing so would provide an image that would possess a level of quality at least equal and preferably superior to that in an image of the same scene but obtained through use of the baseline exposure. The new value(s) of the parameter(s) together with any unchanged values, if appropriate, of other such parameters are then supplied to the lens and shutter mechanisms of the camera to subsequently expose the film and capture an image of the scene. "Extra system speed" is used as a cumulative measure of the change that is available in the resulting exposure between use of the initial and corresponding values of the exposure parameters. Extra system speed, when it occurs, is consumed in a prioritized incremental fashion to change various exposure parameters (including exposure settings and, where appropriate, flash parameters) to provide further improvements in image quality.

Each photographic situation is separately assessed to determine whether "extra system speed" exists for that situation and, if so, how that "extra system speed" can be best used to effectively improve the resulting quality of a photographed image of that scene.

"Extra system speed" is defined as simply the speed (measured in terms of log exposure) that is available in the photographic system (including the camera, lens, film and, where used, a flash unit) beyond the "system speed". The "system speed" is the amount of film speed which is necessary to satisfy the requirements of the scene ("standard scene requirements") that is to be currently photographed. In particular, the system speed is that amount of exposure, as measured in terms of log exposure, that is required by use of typically the ISO-/ANSI exposure standards to provide a ISO normal exposure of the current scene. Where the available speed in the photographic system just meets that required by the scene, corresponding initial ("baseline") exposure parameters (exposure settings including, for example, lens aperture and shutter speed; and, where appropriate, flash parameters), would be selected to photograph the scene such that the shutter speed would likely be sufficiently fast to substantially eliminate any adverse affects of camera shake on the resulting photographed image while the lens aperture size would likely provide sufficient depth-of-field in the photographed image to fully cover the thickness of the subject(s) in the scene. These exposure settings would result in a picture that has an exposure and quality level at least equal to those defined at the ISO normal exposure point.

Now, where "extra system speed" exists in a photographic situation, i.e. system speed is available beyond that which is required by the scene, our inventive process will then utilize that extra system speed on a predefined prioritized basis to modify the initial exposure parameters to further improve image quality beyond that obtainable through adherence to the ISO/ANSI exposure standards.

With this in mind, our inventive process specifically relies on, through use of the adjusted blur circle criteria and adjusted focal length factor: (a) determining, in view of the selected display size and focal length photographing mode, the initial value of the exposure parameters that are required to provide a baseline exposure of a scene to be photographed; (b) ascertaining corresponding exposure parameters that, for the selected display size and focal length photographing mode in use, actually meet the scene requirements, such as e.g. camera shake and required depth-of-field; (c) assessing, in response to differences between the initial and corresponding exposure parameters whether any extra system speed exists and, if so, the amount of extra system speed that is available for use in photographing the scene; and (d) finally, where possible, consuming that extra system speed in a pre-defined prioritized incremental manner to vary the baseline exposure parameters in order to provide an exposure of the scene that, for the selected display size and focal length photographing mode, has a level of quality which is a least equal to and, in many instances, significantly improved over that which would be obtained using the initial, i.e. ISO normal exposure, settings.

Advantageously, our inventive process handles ambient, fill and full flash lighting conditions. Thus, in stark contrast to that which occurs in automated cameras known in the art, our inventive system advantageously violates the ISO/ANSI exposure standards, where necessary, to set exposure parameters (including though not limited to lens aperture and shutter speed) at values that will actually improve image quality over that resulting from use of the ISO/ANSI exposure standards, i.e. use of an ISO normal exposure (i.e. intensity multiplied by exposure time) and resulting ISO normal exposure settings.

Apart from the overall concept of determining whether extra system speed exists in a current photographic situation and utilizing that extra system speed, through e.g. a pre-defined prioritized scheme, to improve the quality of the image as ultimately displayed, particularly in view of user selection of the display size and/or the focal length photographing mode at the time of image capture, our invention encompasses several new distinct features that can be independently used.

First, one feature of our present invention that can readily be used in currently available, and particularly inexpensive, cameras, involves selecting an appropriate shutter speed, based upon the reciprocal of the focal length multiplied by a so-called ADJUSTED_FOCAL_LENGTH_FACTOR (appropriate for a user specified display size), to minimize camera shake. Selecting a shutter speed in this manner would be particularly useful in cameras with a zoom lens, where the focal length and hence minimum shutter speed changes as the lens is zoomed. In this case, measurements of actual real-time shake information could be eliminated from our inventive process and replaced with suitable pre-defined constant(s) that is set during manufacture to approximate an expected amount of user induced camera shake which the camera is to experience. The camera could store one or several such constants. If multiple constants are stored, the user could select any one of these constants he or she desires in any instance by setting an appropriate user-accessible switch located on the camera.

Furthermore, through use of the DISPLAY_SIZE_FACTOR, cameras of virtually any complexity can readily provide excellent quality images, certainly with quality level higher than that currently occurring, for non-standard display sizes. Inasmuch as the DSF is governed by both the reproduction magnification ratio and the viewing distance, virtually any display size, whether cropped or full-frame, can be accommodated with our inventive method.

Specifically, then, an additional feature of our invention that can be used to improve image quality in inexpensive cameras, particularly those using a fixed focus lens but offering the photographer the ability to select a non-standard display size and/or non-standard (i.e. different) focal length photographing modes (e.g. pseudo-telephoto or pseudo-panoramic) during image capture, involves setting the aperture to provide the necessary depth-of-field, for the desired display size and focal length photographing mode, and then increasing the shutter speed, i.e. decreasing the time during which the shutter is open, to compensate for increased image blur that would otherwise result from selection of such a non-standard size and focal length photographing mode. Specifically, for a standard display size and standard focal length photographing mode (i.e. non-pseudo-telephoto and non-pseudo-panoramic), an initial aperture setting would first be determined that meets the scene requirements by providing sufficient depth-of-field to capture the entire range of subject distances (e.g. 4 feet (approximately 1.2 m) to infinity) without re-focusing the camera lens. Thereafter, an initial shutter speed would be determined, such as illustratively through use of a so-called FOCAL_LENGTH_FACTOR to determine a speed based upon the longest time during which the camera can be held steady. Then, if the photographer were to choose a non-standard display size and/or a different focal length photographing mode, the aperture setting would be adjusted to a new setting that, owing to the increased image blur that would otherwise result, maintains the same depth-of-field and blur circle on the print between the standard and selected non-standard display sizes and between the standard and selected non-standard focal length photographing modes. Specifically, the maximum lens aperture setting appropriate for the standard display size would be multiplied, prior to image capture, by the inverse of the DSF to obtain the maximum lens aperture setting appropriate for the non-standard display size and non-standard focal length photographing mode. Given this new aperture setting, the shutter speed would then be multiplicatively increased by the value of the DISPLAY_SIZE_FACTOR, to compensate for the increased blur that would otherwise occur in the non-standard display size and/or non-standard focal length photographing mode. In this manner, both the initial shutter speed would essentially define corresponding lower limits (i.e. a slowest usable shutter speed for the current image being captured and a largest lens opening) for the image currently being captured. Through use of this simple technique, an inexpensive camera, which would not possess the sophistication to determine the existence of and incrementally use extra system speed, would nevertheless implicitly use system speed, through more restrictive lens aperture and shutter speed settings, to compensate for increased image blur that would otherwise occur on the print in enlarging an image on a common negative from a standard to a non-standard display size and/or different focal length photographing mode.

Another severable portion of the inventive process involves use of the DISPLAY_SIZE_FACTOR in cameras that employ autofocusing zones in order to permit these cameras to provide, upon subsequent enlargement, images at non-standard sizes and/or at different focal length photographing modes with, in a number of instances, significantly increased quality over that which presently occurs. Inasmuch as depth-of-field is a function of the blur circle and the aperture size, the inverse of the display size factor, when multiplied by the aperture setting of the lens in use, yields an adjusted aperture setting that preserves the blur circle and depth-of-field on a print between non-standard and standard display sizes and/or between, e.g., a pseudo-telephoto or pseudo-panoramic and a standard focal length photographing mode. Accordingly, in cameras known in the art that contain some degree of exposure control and several zones of autofocusing but clearly no subject thickness measurement, the maximum lens aperture, that is appropriate for the specified number of autofocusing zones, is frequently determined during camera design and manufacture as that which imparts a desired depth-of-field in order to provide overlap of the autofocusing zones, thus providing the ability to capture images of subjects at nearly any distances, while maintaining a given pre-defined blur circle limit. Through inclusion and use of the DSF, these cameras can provide increased image quality, to a significant extent, for user selection of a non-standard display size or non-standard focal length photographing mode. Specifically, the maximum lens aperture value for each autofocusing zone would be an initial value determined during camera design and then multiplied, prior to image capture, by the inverse of the DSF. The resulting shutter speed would also be an initial value multiplied by the DSF. By adjusting the lens aperture and shutter speed settings in this manner for each such zone, the blur circle on the print will be preserved for non-standard display sizes and/or for non-standard focal length photographing modes. If the maximum lens aperture setting were not changed in this fashion, then the image on a resulting non-standard size print or resulting from use of a non-standard focal length photographing mode, particularly for relatively thick subjects or subjects located at a distance near the intersection of adjacent autofocusing zones, may appear blurred due to increasing image blur, for the non-standard display size or the non-standard focal length photographing mode, that would result from an increased reproduction magnification ratio. In essence, the use of the DSF in such a camera will effectively impart a program shift of the exposure settings due to use of a non-standard display size and/or non-standard focal length photographing mode. While these known cameras do not measure subject thickness and hence are incapable of determining a lens aperture setting that actually satisfies the scene requirements (in contrast with that which occurs with our invention), nevertheless adjusting the maximum lens aperture and the shutter speed, based upon use of the DSF, will still yield significant improvements in image quality by compensating for increased image blur that would otherwise occur when enlarging a photographed image to a non-standard display size and/or through a reproduction magnification ratio associated with a non-standard focal length photographing mode.

BRIEF DESCRIPTION OF THE DRAWINGS

The teachings of the present invention may be readily understood by considering the following detailed description in conjunction with the accompanying drawings, in which:

FIG. 4 depicts a high level operational diagram of exposure determination process 350 shown in FIG. 3A;

FIG. 5 depicts a high level operational diagram of fill flash usage determination process 420 shown in FIG. 4;

FIG. 6 depicts an operational diagram of fill flash improvement condition determination step 520 shown in FIG. 5;

FIG. 7 depicts a high level operational diagram of fill flash exposure calculation process 430 also shown in FIG. 4;

FIG. 8 depicts a high level operational diagram of full flash exposure determination process 450 shown in FIG. 4;

FIG. 9 depicts an operational diagram of standard flash exposure determination step 820 shown in FIG. 8;

FIG. 10 depicts an operational diagram of background subject flash exposure correction step 830 also shown in FIG. 8;

FIG. 11 depicts a high level operational diagram of extra system speed calculation and usage process 460 also shown in FIG. 4;

FIG. 13 depicts an operational diagram of extra speed fill flash determination and usage step 1120 also shown in FIG. 11; and FIG. 14 depicts an operational diagram of extra speed full flash determination and usage step 1130 also shown in FIG. 11.

To facilitate understanding, identical reference numerals have been used, where possible and appropriate, to denote identical elements that are common to various figures.

MODES OF CARRYING OUT THE INVENTION

After reading the following description, those skilled in the art will readily appreciate that our inventive system, and particularly the inventive process incorporated therein, can be utilized in any one of a wide variety of different image capturing devices and, specifically, in illustratively any one of a wide variety of photographic cameras that collectively employ widely varying film formats, as well as in conjunction with photo-finishing equipment that can produce different image sizes, so as to provide automatic exposure control and improved overall image quality. Furthermore, certain severable portions of our inventive process, as noted below, can be used in a camera, apart from the remainder of this process, in order to provide corresponding incremental improvements in overall image quality. Nevertheless, to simplify the following discussion, we shall describe our invention in the context of use with a 35 mm photographic camera.

Throughout the following discussion, we will repeatedly refer to "increasing" (or decreasing) shutter speed and "increasing" (or decreasing) lens aperture settings. To assure proper reader understanding, we now define increasing (decreasing) a shutter speed to mean changing the speed of the shutter in order to decrease (increase) the amount of time during which a shutter is open. In this regard, shutter speed increases whenever the numerical value of a denominator of a fractional value of the shutter speed increases, such as, for example, from 1/125th second to 1/250th second. We define increasing (decreasing) a lens aperture to mean changing the aperture to decrease (increase) the actual size of an opening provided by that aperture. In this regard, lens aperture increases whenever the numerical value of the lens aperture, as measured in f-stops, increases, such as, for example, from f/11 to f/22, and the corresponding physical size (opening diameter) of the aperture decreases.

A. Definition and Quality Limitations of an ISO Normal Exposure

Now, to fully appreciate the fundamental principles of our inventive process, the discussion will first address how an ISO normal exposure point is generally determined for film and then, through a number of illustrative examples, our inventive concept of "extra system speed". Thereafter, we will discuss how "extra system speed" can arise in a photographic situation and can best be used to improve corresponding image quality. Having done that, we will then address the specific hardware used to implement our inventive process followed by a detailed discussion of the entire inventive process itself.

Figure 1:
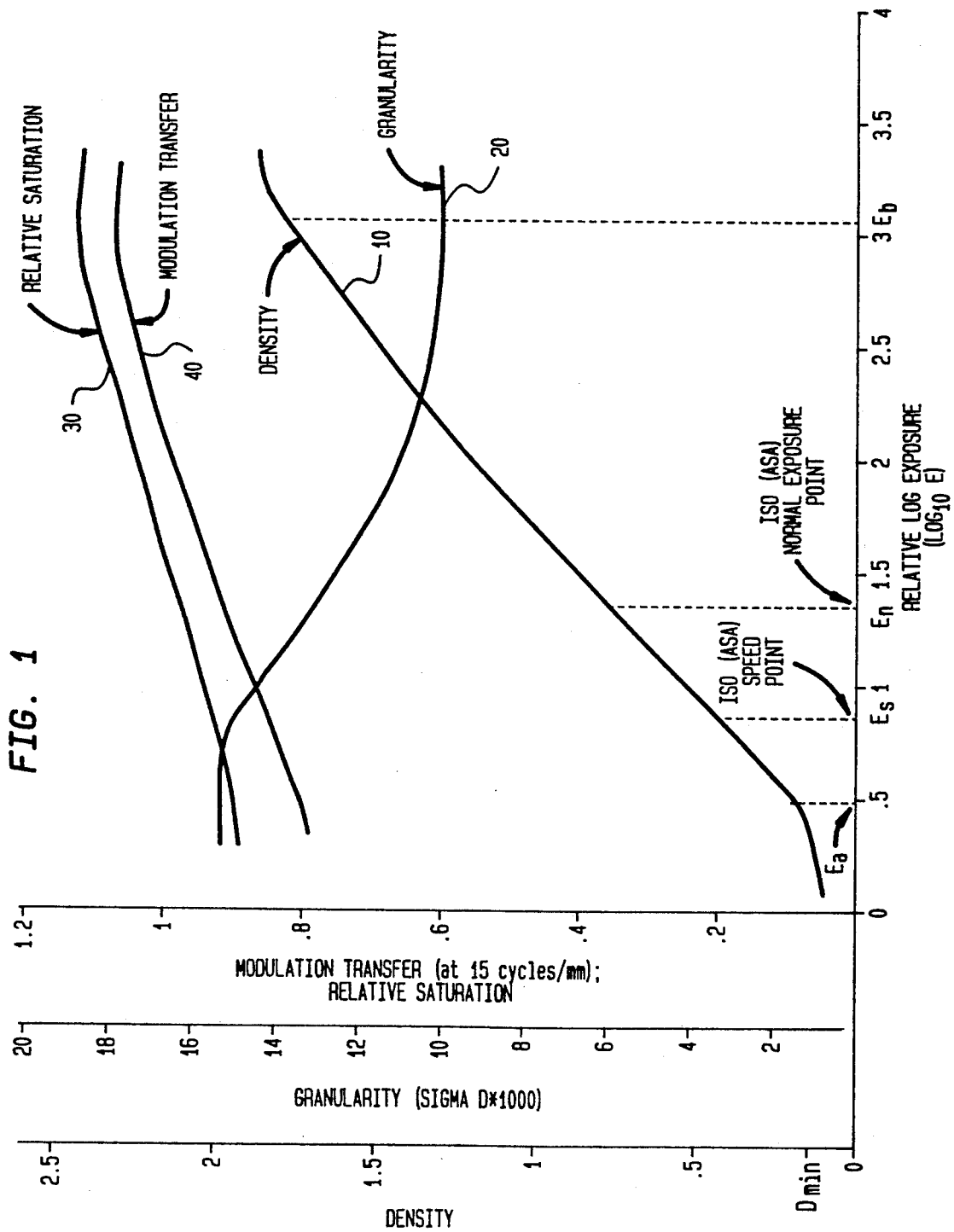
FIG. 1 graphically depicts various characteristics, specifically density vs. log exposure, granularity vs. log exposure, relative saturation vs. log exposure, and modulation transfer at 15 cycles/mm vs. log exposure, for a single layer of a typical photographic color negative print film that could be used with our inventive process.

FIG. 1 depicts density vs. log exposure, granularity vs. log exposure, relative saturation vs. log exposure, and modulation transfer at 15 cycles/mm vs. log exposure curves 10, 20, 30 and 40, respectively, for a single layer of a typical photographic color negative print film that could be used with our inventive process. As shown by curve 10, density remains relatively constant at a minimum value, $D_{min}$, until the layer is exposed to a minimum amount of exposure, $E_a$. Exposure (E) is defined, under a standardized definition, as a product of the scene illuminance (I) by the time (t) during which the film is exposed to this illumination. Until a minimum exposure, $E_a$, is reached, the film layer is simply incapable of recording subject details or tonal differences. Hence, no latent image is formed at these low exposure levels. At increasing levels of log exposure, density increases essentially linearly with increasing values of log exposure. The linear range is bounded by exposure values $E_a$ and $E_b$. Given this curve, a normal exposure point defines the sensitivity of the film layer, measured in terms of exposure stops, that typically allows an entire representative scene, in terms of its tonal content, to fit onto the linear portion of the curve and is typically the lowest value of exposure that, as determined through sensitometry analysis of developed prints, produces the so-called "first excellent" quality print. As shown, this point is defined by exposure value $E_n$ that lies on the linear portion of density vs. exposure curve 10. With such an exposure point, the mid-tone grays in a scene would produce an exposure associated with the ISO normal exposure point; while, lighter and darker tonal portions of the scene than the mid-tones would result in exposures that are located respectively above or below the density produced at this point on the curve. The linear portion may extend illustratively two full stops below the ISO normal exposure point and up to eight stops above it. The ISO normal exposure point for this film as a whole can be derived as a function of the values of the ISO normal exposure points for all the individual photosensitive layers in the film. The ISO (ASA) film speed is defined from the exposure, $E_s$, necessary to produce a specific value of image density on each layer of the film. The lens aperture and shutter speed settings, that will produce an exposure at the normal exposure point for a film layer, can be readily determined by substituting the values for the ISO (ASA) film speed and scene luminance into an ISO standard metering equation (specifically equation (1) discussed hereinbelow) and calculating a result. See, specifically, ANSI (American National Standards Institute) standard "American National Standard for Colour Negative Films for Still Photography—Determination of ISO Speed ANSI PH 2.27-1987" and ISO standard 588-1979, with the former ANSI standard adopting the latter ISO standard for determining film speed; and ANSI (American National Standards Institute) standard PH 3.49-1971 "American National Standard for General Purpose Photographic Exposure Meters" (reaffirmed in its entirety with no modifications in 1987 as ANSI standard PH 3.49-1987) [hereinafter referred to as ANSI standard 3.49-1987], particularly page 21 thereof for the ISO standard metering equation. Also, for a detailed description of density vs. exposure characteristics and film speed, the reader is referred to L. Stroebel et al, *Photographic Materials and Processes* (©1986: Focal Press; Boston, Mass.) and specifically pages 42-56 thereof, and D. M. Zwick, "The Technical Basis of Photographic Speed Determination or What is a Normal Exposure", *SMPTE Journal*, Vol. 88, No. 8, August 1979, pages 533-537. For ease of reference, the pertinent standards will be referred to hereinafter as the "ISO/ANSI exposure standards" with an exposure defined by these standards being referred to hereinafter as synonymously either an ISO "standard" or "normal" exposure and the normal exposure point being referred to as the ISO normal exposure point. As can be seen from FIG. 1, the ISO normal exposure point occurs at higher density and exposure values on the log exposure vs. density curve than those for the ISO (ASA) speed point.

Furthermore, as a negative print film experiences increasingly large exposure values, a corresponding print produced from that film exhibits, as shown by curve 20, decreasing granularity over that which occurs at lower exposure values. Furthermore, as shown by curves 30 and 40, color rendition and modulation transfer may increase with increasing exposure.

B. The Existence of Extra System Speed and its Use in Improving Image Quality beyond the ISO Normal Exposure Once the ISO normal exposure point is determined for a given film from sensitometry analysis, the performance of that film is then characterized by a single number. Although the value of the ISO normal exposure point does exhibit a certain exposure latitude, automated cameras known in the art merely rely on the single value given by the ISO normal exposure point to fully characterize the performance of a film and to determine appropriate lens aperture and shutter speed settings. As is evident by FIG. 1, this characterization results in a trade-off among tonal reproduction, sharpness, granularity and color rendition that does not always produce a print having optimum image quality. In fact, the highest quality print obtainable from the film may not necessarily be produced by exposing the film in accordance with the ISO/ANSI exposure standards. For example, as shown in FIG. 1, improved image detail (sharpness) and color rendition and decreased graininess can be had at excellent quality levels by intentionally over-exposing this particular film above that defined by the ISO normal exposure point.

Having recognized the shortcomings of basing lens aperture and shutter speed settings using film performance dictated only by its ISO normal exposure point—as often occurs in the art, the concept of "extra system speed" (which is also synonymously referred to herein as simply "extra speed") is used to define those photographic situations where image quality can be improved beyond that produced by exposure settings defined by the ISO (ASA) speed. In accordance with our inventive process, each photographic situation, i.e. including the scene that is to be photographed, the desired display size, the film being used, and the camera (including a lens and, where employed, auxiliary scene lighting such as that produced by a flash unit), is assessed to determine whether "extra system speed" exists for this situation and, if so, how that "extra system speed" can be best used to effectively improve the resulting image quality as ultimately displayed.

"Extra system speed" is simply defined as the speed (measured in terms of log exposure) that is available in the photographic system (including the camera, lens, film and, where used, auxiliary lighting —e.g. a flash unit) beyond the "system speed". The "system speed" is the amount of film speed which is necessary to satisfy the requirements of the scene ("standard scene requirements") that is to be currently photographed. In particular, the system speed is that amount of exposure, as measured in terms of log exposure, that would typically be required by use of the so-called ISO/ANSI exposure standards to provide an ISO normal exposure thereof of the current scene.

Where the available speed in the photographic system just meets that required by the scene (including the desired display size), corresponding initial ("baseline") exposure settings (e.g. lens aperture and shutter speed) and, where appropriate, flash parameters would have been selected through use of our inventive process to photograph the scene (and enlarge the resulting image thereof to the desired display size) such that the shutter speed would likely be sufficiently fast to substantially eliminate any adverse affects of camera shake on the resulting displayed image while the size of the lens aperture would likely provide sufficient depth-of-field in this image to fully cover the thickness of the subject(s) in the scene. These exposure settings would result in a picture that has an exposure and quality level at least equal to which occur at the ISO normal exposure point. Where "extra system speed" exists, i.e. an incremental amount of system speed beyond that which is required by the scene, that extra system speed can be used to modify the exposure settings to further improve image quality, such as for example and as discussed in full detail below, by: intentionally over-exposing the film —where appropriate, choosing a faster shutter speed or smaller lens aperture size than that required by the ISO/ANSI exposure standards or, in a flash situation, throttling down the flash output power and/or employing bounce and spread full flash illumination.

At this point, the concept of extra system speed can be clearly understood by considering three different simple illustrative examples of photographic situations where extra system speed exists and another such example where it does not exist. To simplify matters, we will assume that a photographer has selected a common standard display size for each of these examples. Having imparted an understanding of the concept of extra system speed to the reader, we will then address the variations necessitated by changes in the selected display size and the resulting affect on the exposure settings.

First, consider a case where a film having an ISO (ASA) speed of 100 is to be used to capture a scene having a light level of approximately 250 foot-lamberts. This level approximately matches that which typically occurs on a cloudy day. Given these amounts and through use of a well-known "sunny 16 rule of thumb" (governed by equation (1) herein and specifically discussed hereinbelow) the exposure settings for an ISO normal exposure can be readily calculated. Specifically, the exposure associated with scene illumination that occurs on a typical sunny day, i.e. 1000 foot-lamberts, would be that which occurs with an f/16 lens aperture and a shutter speed equal to the reciprocal of the ISO (ASA) speed, i.e. 1/100th second. However, the ambient scene lighting is not 1000 foot-lamberts, but instead 250 foot-lamberts. This means that the scene lighting is actually one fourth as bright as that on a sunny day upon which the "sunny 16 rule of thumb" is based. Inasmuch as one stop of exposure, which provides a doubling or halving of light intensity equals a change of 0.3 as measured in $\log_{10}$ exposure, then a quartering of the light level corresponds to a decrease of 0.6 in $\log_{10}$ exposure or two stops less. This entails, for example, quadrupling the exposure time or quadrupling the exposure intensity. Inasmuch as exposure intensity is proportional to the area of the lens opening which itself is a squared function of the radius of the opening, then a difference of a single f-stop in the size of the lens aperture will accordingly double or halve the light intensity. As such, photographing a scene on a cloudy day at 250 foot-lamberts requires, at a shutter speed of 1/100th second, a lens aperture of f/8 (i.e. two stops below f/16). Therefore, the necessary exposure settings would be 1/100th second for shutter speed and an f/8 lens aperture. Given these settings, assume the subject being photographed is formed of two people, the first situated approximately 6 feet (approximately 1.8 m) from the camera lens and the second situated at approximately 12 feet (approximately 3.7 m) from the camera lens. Now, using the f-number and the focal length of the lens, the depth-of-field can be determined. For purposes of the example, assume that, for the lens in use at an f/8 aperture, the depth-of-field provided by this aperture setting extends over a range of from 5 to 15 feet (approximately 1.5 to 4.5 m) from the camera. Since the depth-of-field extends from a distance slightly in front of the first person to a distance behind the second person, the entire subject lies within the depth-of-field provided by the lens and the photographed image of both people will be in focus. Also, assume that subject motion or camera shake will not cause any noticeable image blur at this shutter speed. Therefore, the exposure settings of 1/100th second for shutter speed and an f/8 aperture would be sufficient to meet the scene requirements and hence provide sufficient system speed necessary to photograph the subject on a cloudy day. Now, at this point, assume that instead of using ISO (ASA) speed 100 film, ISO (ASA) speed 400 film is to be used. This latter film only requires ¼ of the available light needed by the ISO (ASA) 100 film to provide the same exposure density on a negative. This allows use of faster shutter speeds or decreased lens apertures. Specifically, if the exposure settings defined by the ISO/ANSI exposure standards were to be simple-mindedly followed as occurs in automated cameras known in the art, then, if the shutter speed were kept constant at 1/100th second, quadrupling the available film speed would necessitate that the lens aperture be decreased by two stops, i.e. from f/8 to f/16. At an f/16 lens aperture, the resulting depth-of-field would increase from 5 to 15 feet to illustratively 3 to 30 feet (approximately 0.9 to 9 m). Though the depth-of-field has dramatically increased to well beyond that required by the scene to obtain an ISO standard exposure, the additional depth-of-field is simply not necessary for this scene. Inasmuch as the scene requirements would all be met at a shutter speed of 1/100th second and an f/8 lens aperture, advancing the lens aperture by two stops to f/16 to obtain additional depth-of-field will not yield a noticeable improvement in image quality in this photographic situation. The extra system speed, being the difference in log exposure between that which is currently available and that which the scene actually requires, as dictated typically by the ISO/ANSI exposure standards, amounts to two stops in this situation. Since image quality is affected by a variety of parameters, only one of which is depth-of-field, the two stops of extra system speed can be used in another way, one that is likely in this case to actually improve image quality. For example, if, on the one hand, the ISO (ASA) 400 speed film exhibits a noticeable quality improvement with over-exposure, e.g. decreasing graininess with increased sharpness and color rendition, then the 1/100th second shutter speed and the f/8 aperture settings could be used to retain the required depth-of-field but the film would be intentionally over-exposed by two stops to improve image quality over that which would result from an ISO normal exposure. If, on the other hand, the film does not exhibit a quality improvement with over-exposure, then the two stops of extra system speed could be used, as described below, in a different manner to improve image quality, such as by illustratively using a faster shutter time in order to further reduce image blur attributable to camera shake.

In essence, rather than merely providing those exposure settings, as occurs in the art, that yield an ISO normal exposure (i.e. intensity multiplied by exposure time), our inventive process specifically relies on (a) determining the initial exposure parameters (including exposure settings and, where appropriate, flash parameters; all of which are hereinafter collectively referred to as being "exposure parameters") necessary to provide a baseline, typically an ISO normal exposure, of a scene to be photographed; (b) ascertaining corresponding exposure parameters that actually meet the scene requirements, such as, e.g., camera shake and required depth-of-field, for the selected display size and, as described in detail below, a focal length photographing mode then in use; (c) assessing, in response to differences between the initial and corresponding exposure parameters, whether any extra system speed exists and, if so, the amount of extra system speed that is available for use in photographing the scene; and (d) finally, where possible, consuming that extra system speed in a pre-defined manner—specifically using a prioritized incremental scheme—to vary the baseline exposure parameters in order to provide an exposure of the scene, for the selected display size and focal length photographing mode, that has a level of quality which is at least equal to and, in many instances, significantly improved over that which would be obtained using the initial, i.e. ISO normal exposure, settings. Our inventive process handles ambient, fill and full flash lighting conditions. The specific manner through which the extra system speed is utilized to improve image quality is described in detail below in conjunction with the operational diagrams depicted in FIGS. 3–14. Thus, in stark contrast to that which occurs in automated cameras known in the art, our inventive system violates the ISO/ANSI exposure standards, where necessary, to set exposure parameters (including though not limited to lens aperture and shutter speed and, where appropriate, flash parameters) at values that, for the selected display size and the focal length photographing mode, actually improve image quality over that resulting from use of the ISO/ANSI exposure standards and resulting ISO normal exposure values.

Now, consider two additional examples that illustrate situations where extra system speed exists. Assume for both of these examples that 135 format ISO (ASA) speed 100 print film is being exposed to form negatives. Also assume, that $3\frac{1}{2}''$ by $5''$ (approximately 8.9 cm by 12.8 cm) standard sized prints will be produced from these negatives With a blur circle criteria on a negative of $0.002''$ (approximately 0.0051 cm).

For the first of these two examples, assume that a 50 mm lens is being used to capture an image of a brightly sunlit scene that has a shallow depth-of-field. Specifically, the primary subject is located 8 feet (approximately 2.4 m) and a background subject is located 13 feet (approximately 4 m) from the lens. The primary and background light levels are both 1000 foot-lamberts. Here, extra system speed will arise from the shallow depth-of-field requirements of the scene over the depth-of-field provided by the ISO lens aperture setting associated with the "sunny 16 rule of thumb". In particular, the slowest usable shutter speed to avoid image blur attributable to camera shake for a given lens is often taken in the art, through use of a standard rule of thumb, to be equal to the reciprocal of the focal length of the lens. As such, a 100 mm lens would require a shutter speed equal to or faster than 1/100th second, a 200 mm lens would necessitate a shutter speed equal to or faster than 1/200th second and so on for other lenses. Accordingly, the slowest shutter speed that can be used here is 1/50th second. Since a photographer may just barely be able to hold a hand-held camera perfectly still for 1/50th second, this shutter speed is often multiplied by a safety factor, i.e. a camera shake factor, to safely increase the shutter speed to a value that is not likely to be susceptible to noticeable camera shake. Using an illustrative camera shake factor of 0.83, the shutter speed can be calculated as 0.83 times the reciprocal of the focal length of the lens or $0.83(1/50)=1/60$ second. Given the desired scene thickness and well-known depth-of-field calculations, an f/8 lens aperture will provide sufficient depth-of-field to cover the primary and background subjects in the scene. Note that the "sunny 16 rule of thumb" would necessitate use of an f/16 lens aperture which, in turn, would provide excessive depth-of-field for this scene. The extra depth-of-field would be unnecessary and would not likely improve image quality over that obtainable through use of an f/8 aperture. From the ISO/ANSI exposure standards, specifically that embodied in equation (1) discussed hereinbelow, the shutter speed of 1/60 second and an f/8 aperture would result in an ISO normal exposure for a scene that provides 150 foot-lamberts of illumination. However, 1000 foot-lamberts actually exist in the current scene. Accordingly, the extra system speed can be calculated as the log of the ratio in scene illumination between that which is available and that which is required to produce an ISO normal exposure, i.e. here $\log(1000/150) = 0.82/0.3 = 2\frac{2}{3}$ stops of extra system speed. This extra system speed can be used in any one or more of a number of ways, as discussed in detail below, to improve image quality such as, for example, to further increase the shutter speed in an effort to further reduce the likelihood that image blur resulting from camera shake will occur in photographing the current scene.

For the second of these two examples, assume a 35 mm lens is being used with a focal plane shutter and ISO (ASA) speed 400 film to capture an image taken with full flash illumination. Here, the subject is located 4 feet (approximately 1.2 m) from the camera lens. Ambient scene lumination is typically 1 foot-lambert. A flash unit having a guide number of 64 is used. The lens being used has a depth number (as defined below in detail) of 32. In this example, extra system speed arises from having extra flash power, i.e. producing excess depth-of-illumination, than that needed to meet the depth-of-field requirements of the scene. Specifically, with full flash photography, as explained in detail below, a lens aperture setting should ordinarily be selected that provides a depth-of-field that matches the depth-of-illumination provided by the flash unit. In this regard, selecting a lens aperture that provides a depth-of-field that is too narrow will not capture the entire subject thickness with equal sharpness throughout the subject. Alternatively, selecting a lens aperture that provides a depth-of-field that is greater than the depth-of-illumination provided by the flash unit will waste system speed. In this instance, portions of the background of the image would be in sharp focus due to the depth-of-field provided by the lens; however, due to insufficient flash illumination, these portions will simply be black. As such, the excessive depth-of-field provided by the lens would be wasted. Given the depth number of 32, a lens aperture setting that provides depth-of-field equal to depth-of-illumination for a subject located at 4 feet is simply given, as explained in detail below, as the value of the depth number divided by the subject distance, i.e. 32/4=f/8. However, the guide number is 64 which would necessitate a lens aperture setting for an ISO normal exposure given by the value of the guide number divided by the subject distance, i.e. 64/4=f/16. Accordingly the amount of extra system speed that is available here is the log of a ratio of the exposures which equals the log of the ratio of the square of the lens aperture settings, i.e. $\log(16/8)^2 = 2$ extra stops of system speed. Given this guide number, automated cameras known in the art would needlessly increase the lens aperture setting to f/16 which would generally yield little, if any, improvement in image quality for the current scene being photographed with full flash illumination. However, through our inventive method, image quality can be noticeably improved by utilizing the available extra system speed in any one or more of a number of other ways—rather than just providing additional depth-of-field, as discussed in detail below, such as spreading or bouncing the flash illumination to provide more even scene illumination and minimize well known "red-eye" effect, intentionally over-exposing the film—as appropriate, or even throttling down the flash power as appropriate.

Having discussed three typical photographic situations where extra system speed exists—which collectively and generally represent the majority of favorable conditions under which photographs are typically taken, let us now address the illustrative photographic situation where no extra system speed exists. Assume that ISO (ASA) 25 speed film (such as EKTAR 25 film manufactured by Eastman Kodak Company which also owns the registered trademark "EKTAR") is being used to photograph a scene at 250 foot-lamberts with a 100 mm lens. Using an ANSI exposure standard, given by, for example, the "sunny 16 rule"—specifically described in ANSI standard "American National Standard for Photography—Photographic Exposure Guide ANSI 2.7-1986", the exposure settings for this film and light level would be a shutter speed of 1/25th second and a lens aperture setting of f/8. Unfortunately, these settings would be totally unusable owing to the high likelihood that the entire resulting image would be blurred by camera shake. Specifically, a professional, let alone an amateur, photographer would not be able to steadily hold a hand-held camera with a 100 mm lens for as long as 1/25th second. Accordingly, while the shutter was open, the photographer would, at some point, be likely to shake the camera and impart noticeable and objectionable image blur to and throughout the entire photograph. As such, the shutter speed must be increased to a value at which camera shake does not cause noticeable image blur. Accordingly, a shutter speed of at least illustratively 1/100th second would likely be chosen. In this regard, as noted above, the slowest usable shutter speed to avoid image blur attributable to camera shake for a given lens is often taken in the art, through use of a standard rule of thumb, to be equal to the reciprocal of the focal length of the lens. Accordingly, selecting a shutter speed of 1/100th of a second, where 1/25th second is required to yield a proper exposure, would necessitate that the lens aperture be increased by two stops from f/8 to f/4 to obtain a constant level of exposure on the film. Now, with these settings—1/100th second for shutter speed and an f/4 lens aperture, the exposure requirements of the scene have been met. As to the depth-of-field, assume that a background portion of the scene, e.g. Niagara Falls, exists at a large distance from the camera, i.e. at so-called "infinity", and a foreground portion, e.g. a person of interest, exists at only 6 feet (approximately 1.8 m) from the camera. An f/4 lens aperture will simply not provide sufficient depth-of-field to cover the entire scene. In fact, the proper depth-of-field may only be satisfied through use of an f/22 or smaller lens aperture—which would necessitate use of a very long shutter time. This means that five more stops of system speed (from f/4 to f/22) are required to meet the scene requirements in this situation. Consequently, insufficient system speed would exist; in fact, in this case, the extra system speed would be a negative five stops. Unfortunately, with ISO (ASA) 25 speed film, use of a wide lens aperture on a lens with a relatively large focal length runs the very serious risk of causing camera shake induced image blur which, in turn, would ruin the entire image. In view of this, the shutter speed must remain at 1/100 second thereby effectively limiting the lens aperture sizes to that which provide a relatively shallow depth-of-field. Consequently, given the negative extra system speed in this situation and the attendant inability to improve all attributes of the picture, our inventive process optimizes the most important single attribute in the picture: sharpness of the foreground subject. This is accomplished by selecting a shutter speed that prevents image blur. In this manner, our process assures that the foreground of the scene will be in-focus even though the background will be out-of-focus and thus blurred. Moreover, if the film being used produces a reasonably good quality image when under-exposed, our inventive process might, depending upon the actual exposure characteristics of the film, tradeoff some exposure, by selecting a slightly smaller lens aperture size, such as by a half stop, in order to obtain a slightly increased depth-of-field which incrementally improves the overall image quality. Even though as here the scene requirements are more demanding than the photographic system (here including, for example, the film, camera lens, lens focal length, lens aperture and shutter speed) can meet, our inventive process nevertheless selects those photographic parameters which assure that the more important image attributes, such as the foreground subject being in-focus, are met even if the quality of secondary image attributes degrades in order to still provide a more pleasing picture than that obtainable using the ISO normal exposure values. Fortunately, this example is an extreme condition, with the vast majority of pictures being taken under far more favorable conditions, such as any of the three typical conditions discussed above.

Furthermore, our inventive process is ideally (though not exclusively) suited for use with a film that possesses a relatively broad latitude with respect to exposure, and particularly a film which has a strong exposure dependent quality characteristic and exhibits increased quality with over-exposure. Through the synergy obtainable between our inventive process and the response of the film, our inventive process selects appropriate exposure settings (and, where appropriate flash parameters)—regardless of the ISO/ANSI exposure standards—that, to the extent possible, meet the scene requirements and substantially deliver the best quality image that the film is capable of providing, which overall, due to the inherent limitations of these standards, will yield a noticeable improvement in quality over that resulting from using the ISO normal exposure values. As shown in FIGS. 3-14 and discussed in detail below, our process relies on manipulating data which is readily available to the photographic system regarding the film, the current scene, the selected display size and the camera, lens and flash unit through a network of "experiential" (knowledge) based rules that are implemented in relatively simple, inter-related and pre-defined processing operations using a microcomputer system in order to automatically select the proper exposure settings and, where appropriate, flash parameters. In view of the relative ease and cost-effectiveness with which these operations can be implemented for real-time operation within a camera, use of these operations is clearly preferred over performing a time consuming multi-dimensional optimization of relatively complex equations that predict, inter alia, saturation, modulation transfer, granularity and density characteristics that will occur in a photographed image.

C. Affect on Image Quality Attributable to Non-standard Display Sizes

With the above description of extra system speed in mind, we will now turn our discussion to the affect on image quality that generally results from the use of non-standard display sizes.

To determine a lens aperture size that meets scene requirements, that aperture size must, at a minimum and as discussed above, impart sufficient depth-of-field to a resulting photograph to clearly capture the entire thickness of a subject. Not only is the determination of a suitable lens aperture size governed by the near and far subject distances (whether based on, e.g., actual subject distance measurements—as is the case in the automatic exposure control system described in U.S. Pat. No. 5,049,916 issued Sep. 17, 1991 to W. R. O'Such et al which is commonly assigned to the present assignee hereof and which is incorporated by reference herein—this patent is hereinafter referred to as the O'Such '916 patent), but the determination is also a function of the so-called blur circle criteria. In essence, as is well known, for a given lens aperture size, the blur circle criteria effectively defines a range of near to far subject distances, i.e. a permissible subject thickness and the location thereof from the lens, for which a photographed image of that subject, when held at a standard viewing distance, will appear sharp to a human observer. Hence, with a known value of the blur circle criteria and actual subject distance measurements, a lens aperture setting can be determined that will capture an image of the scene with tolerable amounts of blur over the entire subject, thereby producing an image that will appear, at a standard viewing distance, to be clear and sharply focused.

In designing cameras, the blur circle is conventionally taken as a fixed value with reference to a photographic negative, typically 0.002" (approximately 0.005 cm) on the negative for amateur cameras and 0.001" (approximately 0.0025 cm) on the negative for professional cameras. Inasmuch as the blur circle is dimensioned relative to a negative, then, for a given value of the blur circle on the negative, as the image is increasingly enlarged, the associated image blur circle on the print increases in size. For standard sized 3½" by 5" prints taken on type 135 film using an amateur camera, the image on the negative is typically enlarged through a reproduction magnification ratio of approximately 3.9-4×. This, in turn, produces a 0.008" (approximately 0.020 cm) blur circle on the print. Alternatively, for a 0.001" blur circle on the negative, the resulting blur circle on this standard sized print would be 0.004" (approximately 0.010 cm). Image blur of this magnitude, e.g. whether 0.008" or less, is generally not visible to a human observer when this print is held at a nominal viewing distance of, for example, 10" (25.4 cm) or so.

Photographic prints formed through the use of increased reproduction magnification ratios contain increased blur. These prints can be formed through any one of a number of different photographic modes, such as a user deciding subsequent to image capture but prior to photo-finishing to have an image captured on a negative enlarged to any of a wide variety of increased display sizes, or through the possible advent of non-standard focal length photographing modes, i.e. pseudo-panoramic and/or pseudo-telephoto photography, which permit a photographer to decide, at the time of image capture, to instruct a subsequent photo-finishing operation to selectively magnify a particular portion of an image captured on a negative during enlargement to achieve a panoramic- or telephoto-like effect.

Clearly, as the reproduction magnification ratio increases for a common viewing distance, then to maintain the same size blur circle and hence image sharpness on the print, the blur circle criteria for the negative must decrease accordingly with any increase in the reproduction magnification ratio. However, in actuality, this simply does not occur inasmuch as the blur circle on the negative is taken to be a fixed number during camera design—therefore, at a common viewing distance, prints formed through use of increasingly larger reproduction magnifications contain correspondingly increased amounts of blur.

Furthermore, image blur is not only a function of the reproduction magnification ratio but is also a function of the perceived sharpness of the image on that print, the latter being governed by the distance through which a print is viewed (i.e. the "viewing distance"). In this regard, if an individual was to hold different sized reflection prints of the same image at viewing distances that linearly changed in the exact same manner with changes in a diagonal dimension of these prints, then, owing to the spatial frequency response and integration performed by a human eye, any increase in blur inherent in a large print would be fully compensated by an identical increase in the viewing distance through which that print were to be held and hence would not be visually apparent. In essence, a doubling of the print size (from e.g. a standard 3½" by 5" print to a 7" by 10" print) requires that a human observer hold the larger print at a distance twice as far to generate the same amount of perceptible image blur on both images. However, we have found that, for a given image, human observers do not hold such prints at these distances and, thus, are apt to perceive differing amounts of blur with different sized prints of the same image.

As with most imaging systems, the system described in the O'Such '916 patent assumes that an output image will be viewed on a single standard display size, e.g. a 3½" by 5" (approximately 8.9 cm by 12.7 cm) photographic print, and at a standard viewing distance therefrom. The exposure settings are then optimized using parameter values that are based upon this assumption. However, in practice, photographic images are not enlarged to just one standard display size nor, as noted above, are all reflection prints viewed at a single common distance.

With this in mind, changes in either the reproduction magnification ratio or the viewing distance, for a constant lens aperture setting, will adversely affect perceived image blur on the print. In this regard, if the lens aperture setting is not varied, i.e. to an appropriately smaller opening, to eliminate any perceived increase in image blur that would otherwise result from an increase in the reproduction magnification ratio or change in the viewing distance, then the optimizing system described in the O'Such '916 patent may yield sub-optimal exposure settings which might artificially limit the quality improvements that could be attained by this system.

In accordance with our present inventive teachings, we have first discovered a perceptual relationship between viewing distance and display size which permits us to accurately quantify the affect on image blur on a displayed image (e.g. specifically a print), and hence on the blur circle criteria for a corresponding negative, that will result from a change in the display size of that image. Contrary to what one skilled in the art might think and as discussed below, changes in viewing distance are not simply scaled to (i.e. a linear function of) changes in the display size. Furthermore, we have developed a so-called "display size factor" (DSF), as discussed in detail below, which characterizes changes in blur circle and focal length based on independent changes in the reproduction magnification ratio and the perceptual viewing distance for a desired change, specified at the time of image capture, in the display size and/or the reproduction magnification ratio. Next, we have judiciously incorporated this factor into the optimizing system described in the O'Such '916 patent to yield exposure (and, where appropriate, flash) parameter settings that are optimized not only to the scene requirements and film quality characteristics but also to the specific display size and/or focal length photographing mode selected by a photographer at the time of image capture. Lastly, in accordance with our inventive teachings, display size and/or focal length photographing mode data, for each captured image, is also stored, at the time of image capture, directly on the film and subsequently exchanged with a photo-printer in order to properly set the reproduction magnification ratio for each such frame, during its enlargement, to the specific ratio for which the exposure parameter settings were optimized. Through use of our inventive teachings, we can attain a further improvement in the quality of the resulting displayed image over that achieved by the optimizing system described in the O'Such '916 patent and clearly well beyond that which would result from strict adherence to the ISO/ANSI exposure standards.

D. Hardware Description

Figure 2:
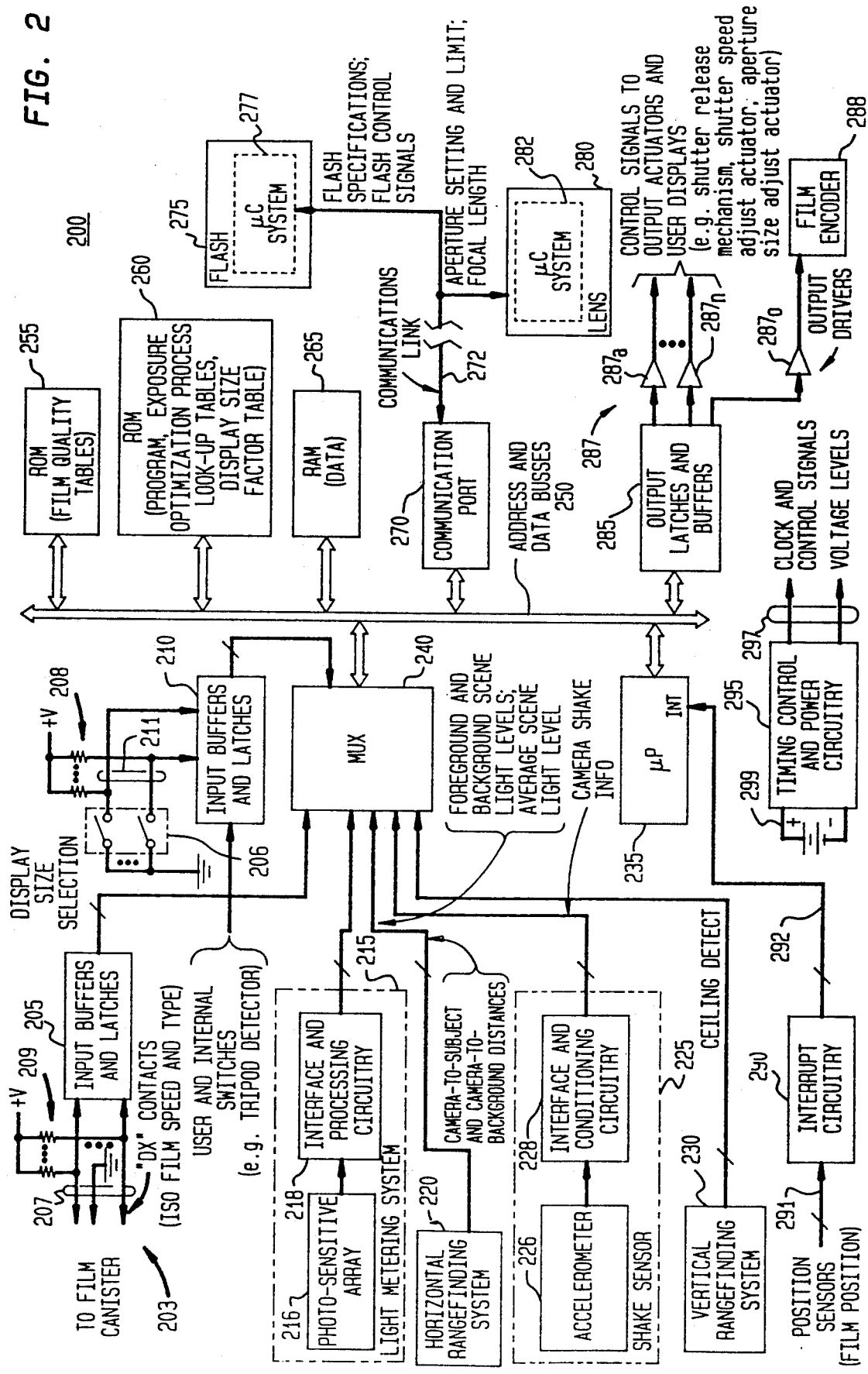
FIG. 2 depicts a high level hardware block diagram of a preferred embodiment of the circuitry that implements our inventive exposure control process in a photographic camera.

Now, with this above discussion in mind, FIG. 2 shows a high level hardware block diagram of a preferred embodiment of the circuitry that implements our inventive process in a photographic camera. Any film format and nearly any, if not all, cameras, that employ a fixed focal length lens, a zoom lens and/or any one of a number of inter-changeable lenses, and an internal or an external-detachable flash unit (or even no flash unit for simplified cameras designed for use in ambient light situations), can be used with our inventive process. Nevertheless, for purposes of illustration and to simplify the following discussion, the process and its implementing hardware will now be specifically discussed in the context of use with a 35 mm camera having interchangeable lenses and an external-detachable flash unit. The required functionality inherent in the camera, lenses and flash unit will also be discussed. Appropriate mention will be also made of each severable portion of the process and the beneficial affect achievable through use of that portion in an appropriate camera.

Specifically, as shown in FIG. 2, circuitry 200 is formed of a microcomputer system (also referred to herein as the "camera microcomputer" system) that basically contains microprocessor 235, multiplexor 240, read only memories (ROMs) 255 and 260, random access memory (RAM) 265, communication port 270, and output latches and buffers 285; all inter-connected through address and data busses 250. This system also contains interrupt circuitry 290 and timing, control and power circuitry 295. In addition, specialized input circuitry is connected to the microcomputer system and is formed of input buffers and latches 205 and 210, light metering system 215, horizontal rangefinding system 220, shake sensor 225 and vertical rangefinding system 230. Output latches and buffers 285 provide various digital control signals through drivers 287 (collectively formed of individual output drivers $287_a, \ldots, 287_o$) to control various output actuators and user displays (not specifically shown but well-known) as well as film encoder 288, all situated within the camera. Consistent with design considerations well-known in the art, the specific implementation of circuitry 200 can vary widely from that shown in FIG. 2 without adversely impacting the performance of our inventive process.

ROM 255 stores a number of pre-defined tables that provide film quality vs. exposure parameters for a variety of films of different speeds and types that can be used with the camera. During execution of our process by the microcomputer system, one of these tables is selected and then accessed, using the amount of available extra system speed (either positive or negative) and as described in detail below, to determine, in a current photographic situation, whether resulting image quality can be improved through intentional under- or overexposure and the variation in exposure required therefor.

ROM 260 stores a computer program which governs the operation of the entire camera microcomputer system as well as implementing our inventive process, depicted in FIGS. 3-14 and discussed in detail below. In addition, the program may also contain suitable routines to control the operation of various automated camera functions apart from automatic exposure control, such as illustratively automatic load and film re-winding operations, that are not relevant to the invention and hence will not be discussed herein. ROM 260 also stores various look-up tables used by our inventive optimization process, including one containing a number of pre-defined values for the display size factor, as discussed in detail below. RAM 265 provides a temporary store for data that occurs during execution of the program residing in ROM 260.

Communication port 270 enables the camera microcomputer system, specifically including microprocessor 235, to communicate, over communication link 272, with companion microcomputer systems 277 and 282 respectively located within flash unit 275 and lens 280. As noted above, both the lens and the flash unit are detachable from the camera. A photographer can mount any one of a variety of compatible lenses, of differing focal lengths—either fixed focal length or zoom lenses, to the camera. Likewise, any one of a variety of different compatible flash units, having differing so-called guide numbers, can also be mounted to the camera. Inasmuch as the photographic characteristics vary from lens to lens and from flash unit to flash unit, the microcomputer system situated in each lens or flash unit stores pre-defined constants which respectively specify the photographic properties of that lens or flash unit: specifically, for each lens, stored lens specifications include, for example, focal length and maximum and minimum lens aperture values; and for each flash unit, stored flash specifications include illustratively guide number, flash shutter speed and minimum flash synchronization (sync) speed. Link 272, which can be either bit-serial or preferably parallel, is well-known in the art and is typically formed of appropriate wiring that is internal to the camera body and which terminates at appropriate pins or a well-known connector that matingly engages with similar pins or connectors on the particular lens and flash units as they are mour'ed to the camera body. During execution of our inventive process, the camera microcomputer system interrogates the companion microcomputer systems over link 272 to obtain the values of each of the parameters, as defined below, that collectively forms the lens and flash specifications. In addition, communication port 270 also supplies various control signals to the microcomputer system within flash unit 275 in order to set a flash spread angle, set the duration of the flash and to fire the flash unit. The flash unit contains appropriate actuators and associated circuits (well-known and not shown) to perform these operations. The flash unit can also contain vertical rangefinding system 230, discussed in detail below, for use in direct and indirect flash exposures for detecting the presence of a reflective surface and accordingly changing the light output of the flash unit to vary the exposure. Such a flash unit is disclosed in co-pending United States Patent Application entitled "Flash Systems Incorporating Indirect Reflecting Surface Detector" filed Dec. 26, 1989, assigned Ser. No. 07/457,081 and which is owned by the present assignee and is incorporated by reference herein.

Output latches and buffers 285 are set by microprocessor 235 to supply appropriate digital output signals, through output drivers $287_a \ldots 287_n$, to various actuators (for example solenoids, linear motors and/or stepper motors) or displays to invoke a desired photographic operation, such as illustratively setting the shutter speed, adjusting the lens aperture and/or releasing the shutter, and to provide suitable status and exposure information for display to the photographer using a display (also well-known and not shown) visible through the viewfinder and/or flush mounted on a external surface of the camera body. In addition, buffers 285 also supply appropriate output signals, through output driver $287_o$, to film encoder 288. When actuated by microprocessor 235, this encoder prints data on the film and in the vicinity of the frame. This data can be a pre-defined code, which specifies the desired size to which an image on that frame is to be enlarged during a subsequent photo-finishing operation, or just the desired display size and the desired reproduction magnification ratio themselves. In particular, this data is subsequently read by a photo-printer which, in turn, suitably changes its reproduction magnification ratio, during enlargement, as well as accompanying exposure parameters (if needed) to yield a photographic print in a size previously selected by a photographer through use of switches 206 (discussed in detail below) as well as to depict the desired focal length photographing mode. Any one of several different types of film writers known in the art can be used for film encoder 288. For example, a light emitting diode (LED) based optical film writer such as that shown in U.S. Pat. No. 5,003,329 (issued to T. Itabashi on Mar. 26, 1991) may be used, though the resulting display size data produced by this particular optical encoder would need to be written in the vicinity of but outside of the frame which will store the captured image rather than within the frame (as taught therein).

Interrupt circuitry 290 is used in conjunction with a well-known position sensor to determine the current aperture setting of the lens. This sensor (not specifically shown) generates a pulse each time an aperture ring on the lens is rotated through an incremental amount, such as half an f-stop, to vary the size of the lens aperture. Similar pulses are also provided through a second position sensor (also not shown) as the optical elements within the lens are axially moved to effect focusing. Each such pulse is routed, via separate leads within leads 291, to interrupt circuitry 290 which generates a suitable interrupt pulse, via lines 292, to microprocessor 235. These sensors can be located either within the lens with the pulses being routed over electrical connections associated therewith or within the camera body with suitable mechanical linkages running between the lens and the sensors. In response to each interrupt pulse, microprocessor 235 temporarily suspends normal program processing and then executes an appropriate interrupt service routine to update a current count of the corresponding position pulses to track the current aperture and focus settings for the lens. Inasmuch as the sensors themselves, their operation and their mechanical configuration are well-known in the art, they will not be discussed any further herein. Other inputs (not specifically shown), such as those related to the occurrence of well-known pre-defined fault and/or limit conditions associated with operation of the camera, can also be applied, via circuitry 290, to generate appropriate interrupts to the microprocessor and elicit proper responses therefrom.

Timing, control and power circuitry 295 generates and supplies, over leads 297, appropriate clocking and control signals and voltage levels that are needed to control and power the operation of the camera microcomputer system and its associated circuits. Power is supplied to circuitry 295 through battery 299.

The remaining discussion regarding FIG. 2 will address the various scene and film sensors and user switches that collectively provide input values to the camera microcomputer system for use by our inventive process. These sensors are well-known in the art and can be implemented in any one of a number of diverse ways. The specific implementation of each of these sensors does not form part of our invention. Accordingly, to simplify the following discussion, each of these sensors will be primarily discussed from the standpoint of its main functional attributes.

Specifically, contacts 203, connected to input buffers and latches 205 through leads 207, abut against pre-defined metallic patterns, i.e. the well-known "DX" code, situated on the outside of a film canister loaded into the camera and, from the inter-connection of the patterns, read the "DX" code associated with the film contained within the canister. This code is first stored within buffers and latches 205 and is then are applied through associated leads to an input of multiplexor 240 for subsequent use by microprocessor 235. The "DX" code provides the ISO (ASA) film speed and film type (e.g. reversal or negative type) for the film. Resistors 209 serve as "pull-up" resistors to provide appropriate high logic levels for open circuit contacts.

Input latches and buffers 210 store the current state of various user switches, such as knob settings, and switches internal to the camera, such as limit switches and a tripod detector, and apply the state information, via corresponding leads, to an input of multiplexor 240 for subsequent use by microprocessor 235. In that regard, input switch 206, illustratively a binary-coded multi-position switch, is connected, through leads 211 and pull-up resistors 208, to input buffers and latches 210. Prior to capturing an image, a photographer sets this particular switch to correspond to the display size at which this image is to be subsequently enlarged during photo-finishing (e.g. standard 3½" by 5", or 8" by 10"—approximately 9 cm by 13 cm, and 20 by 33 cm, respectively; or any of number of other pre-defined print sizes. A separate additional switch, essentially identical to switch 206 (and not shown to simplify the drawing), may also be incorporated into circuitry 200 and connected to buffers and latches 205 in a like manner as is switch 206. This additional ("focal length photographing mode") switch can be used by the photographer to set the focal length photographic mode of the camera for the particular image being captured to one of several pre-defined modes. These modes would illustratively include, for use with a normal 50 mm lens: standard focal-length, pseudo-telephoto (with a finite effective telephoto focal length of, e.g., 110 mm) or pseudo-panoramic (with a finite effective wide angle focal length of, e.g., 35 mm). As described below, the setting of switch 206 (as well as that of the "focal length photographing mode" switch) is read by microprocessor 235, through buffers 210, and used to access a particular value of the DISPLAY_SIZE_FACTOR from a corresponding look-up table stored within ROM 260. This value is then used, within our inventive process and as described in detail below, to determine appropriate values of exposure (and, where necessary, flash) parameters to properly capture an image with optimum quality for the size and focal length photographing mode at which the image will be ultimately displayed. Furthermore, this setting(s) is also supplied by the microprocessor to film encoder 288 which, in turn, prints this setting(s) on the film and in the vicinity of the frame which will hold the captured image.

Light metering system 215, containing photo-sensitive array 216 connected to interface and processing circuitry 218, provides digital data representing the lumination, either seen through a separate viewfinder or through the lens, of the foreground and background portions of a current scene as well as the average scene lumination. Array 216 is typically a pixel based array sensor, such as a charge coupled device (CCD) sensor. Circuitry 218 processes the intensity values from pre-defined pixel regions in the scene to determine the lumination of a foreground portion of the scene in order to yield "foreground light level" and the remaining portions of the scene, which are assumed to be background, in order to yield "background light level" and applies the resultant values over corresponding leads to an input to multiplexor 240. The foreground and background portions of the scene are the same as those identified as such by horizontal rangefinding system 220. Circuitry 218 averages the intensities for a pre-defined number of pixels distributed throughout the array to yield a value for the average scene light level.

Horizontal rangefinding system 220, which can rely on use of, for example, a well known through-the-lens (TTL) phase detection system, determines the subject-to-camera distances for various portions of the scene and applies digital data representing these distances over corresponding leads to an input of multiplexor 240. The foreground is assumed as that portion of the scene where the measured subject-to-camera distance is the least; while the remaining areas in the scene are taken as containing the background.

Shake sensor 225 provides digital data representing the amount of instantaneous camera shake that is occurring. This sensor is illustratively formed of accelerometer 226 connected to interface and conditioning circuitry 228. Circuitry 228 provides well-known buffering, filtering and scaling functions. The output of shake sensor 225 is applied, as camera shake information, over corresponding leads as an input to multiplexor 240 for subsequent use by microprocessor 235. Other appropriate sensors, such as a CCD based image sensor, which is able to detect movement in a scene, and its accompanying circuitry could be readily substituted for accelerometer 216 and circuitry 218.

Our inventive process also takes into consideration whether a surface (a "bounce surface") exists from which a flash of light can be bounced. If the camera is being held horizontally, this surface is typically a ceiling. Alternatively, if the camera is being held vertically, this surface is typically a wall. As such, circuitry 200 contains vertical rangefinding system 230, which can illustratively be a simple well known infra-red triangulation auto-focusing system, that provides an appropriate logic level (ceiling detect signal) indicative of the existence of an appropriate bounce surface. The rangefinder is situated in the camera such that its measurement transducer projects a beam(s) directed upward from the top of the camera. Depending upon cost and camera sophistication, the vertical rangefinding system could provide either binary (YES|NO) type information, i.e. does a suitable bounce surface exist or not, or an actual distance measured from the top of the flash unit to the surface. Such distance information can be used for extremely precise exposure determination.

Multiplexor 240, operating under the control of microprocessor 235 and the control program stored within ROM 260, selects digital data from that generated by circuits 205, 210, 215, 220, 225 or 230 and routes that data to busses 250 for subsequent processing by the microprocessor.

E. Process Description

Having described a preferred embodiment of the circuitry used to implement our inventive process, the discussion will now turn to addressing the process itself as shown in FIGS. 3-14. As noted above, our process relies on using knowledge based rules gained from statistical experiential data collected from historical analyses of a substantial number of photographs taken under varying conditions. These rules are embedded within our process into discrete processes and steps in terms of input parameters, forcing functions and output parameters, in order to quantify and manipulate individual aspects of the overall exposure control process. These processes and steps, in turn, are inter-related within our inventive process to yield a unified, substantially all encompassing, knowledge based, automatic exposure control process that endeavors, where possible, to replicate the performance of an expert photographer in situations where images of improved quality can be obtained beyond that resulting through use of ISO normal exposure settings.

The specific detailed manner in which our inventive process is implemented in software for execution within the camera microprocessor system is a matter of design choice by one skilled in the art given the cost-benefit tradeoffs, such as processor cost and sophistication, that are inherent in the design of an automated camera. Inasmuch as any one of a wide variety of software designs will effectively implement our process and all such designs and accompanying low level code are readily apparent to anyone skilled in the art given the information presented in FIGS. 3-14, then, for simplification, the depiction of our inventive process in these figures and its accompanying discussion will remain at a relatively high level.

To facilitate understanding, our inventive process is depicted in FIGS. 3-14 in a series of high level operational diagrams that provide a top-down view of the process from general processes to specific steps that form each such process. Each process or step, represented by a circle containing a succinct description of that process or step, pulls data from a specific category of input photographic parameters; with the name of the specific category being shown enclosed within a box. Each such category contains one or more individual parameters. Where a category containing more than one parameter is associated with a process or step, the specific individual parameter in that category and which is applied to or produced by that step is also shown. Two classes of parameters are used: so-called "primitives" which are basic data values designated (both in the drawings and the ensuing discussion) by upper case (capital) letters and "non-primitives", designated (also in both in the drawings and the ensuing discussion) by lower case letters, which are each formed of a group of primitives. Each process shown enclosed within a "bold" circle is itself a primitive step in that no reference is needed to any lower level operational diagrams in order to fully comprehend the operation of that specific process.

Figure 3:
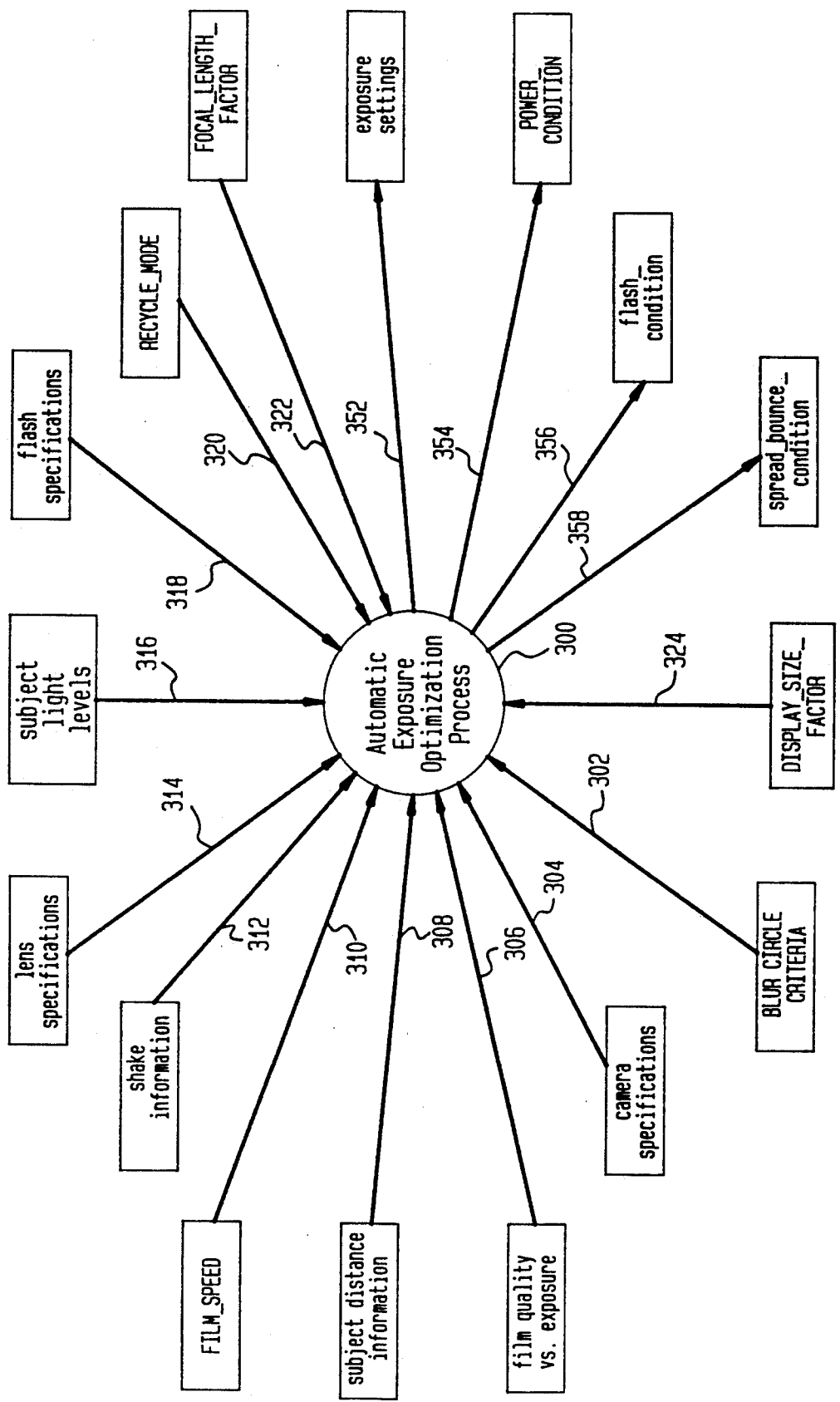
FIG. 3 depicts the categories of input and output parameters associated with our inventive exposure control process 300.

With this in mind, FIG. 3 depicts an overall operational diagram of the input and output parameters associated with our inventive exposure control process 300. Specifically, as represented by lines 302, 304, 306, 308, 310, 312, 314, 316, 318, 320, 322 and 324, the categories of input parameters applied to the process are respectively: BLUR_CIRCLE_CRITERIA, camera specifications, film quality vs. exposure information, subject distance information, FILM_SPEED, shake information, lens specifications, subject light levels flash specifications, RECYCLE_MODE, FOCAL_LENGTH_FACTOR and DISPLAY_SIZE_FACTOR. Using these inputs, process 300 produces, as represented by lines 352, 354, 356 and 358, four categories of output parameters: exposure settings, POWER_CONDITION, flash_condition, and spread_bounce_condition.

Each of these categories will now be defined, as follows, with each such category being specifically numbered for ease of reference.

INPUT CATEGORIES

1. BLUR_CIRCLE_CRITERIA

The BLUR_CIRCLE_CRITERIA, also known as the so-called "circle of confusion", is defined as the diameter of a permissible blur circle, measured in mils (thousandths of an inch), that exists on a negative. If the diameter of the blur circle is sufficiently small, such as 2 mills (0.002 inch or approximately 0.005 cm), the resulting image smear that exists within this circle will not be perceived by a viewer in a reasonable size enlarged print (typically 4× size) that is produced from the negative. For amateur cameras, this parameter may be a standard size, nominally 0.002"; while, for professional cameras requiring increased image sharpness, a 0.001" nominal blur circle may be used instead. The standard value of the BLUR_CIRCLE_CRITERIA is then adjusted through use of the DISPLAY_SIZE_FACTOR (which, as discussed in detail below, includes both the affects of independent changes in the reproduction magnification ratio and viewing distance) to reflect perceptually determined image blur inherent in a user selected display size. The resulting adjusted value (i.e. the ADJUSTED_BLUR_CIRCLE_CRITERIA) is then used, in lieu of the standard value, throughout the remainder of the optimization process. Consequently, for an increased display size, this adjustment will reduce the adjusted value of the blur circle and, in turn, decrease the shutter speed and increase the lens aperture settings accordingly to compensate for and substantially prevent any increased image blur, which would otherwise result in a photographed print of this size, from occurring. Opposite variations in the adjusted value of the blur circle and the shutter speed and lens aperture settings would occur for a decreased display size.

2. Camera Specifications

The camera specifications include the following parameters: K_FACTOR, shutter type and camera limits, all of which are defined as follows.

a. K_FACTOR

The K_FACTOR is a well-known empirical constant that is used in the ISO/ANSI speed calculations. Specifically, the value of this constant is given by the following ISO standard metering equation, as specified in the above-cited ANSI 3.49-1987 standard:

$$K = \frac{L \cdot S \cdot T}{A^2} \qquad (1)$$

where:
K = the K_FACTOR;
L = the scene luminance, measured in foot-lamberts;
S = the ISO (ASA) film speed of the film currently in use;
T = the time during which the shutter is open; and
A = the lens aperture, as measured in f-number.

To conform this equation to the "sunny 16" rule, the value of the K_FACTOR is taken as approximately 3.91. The value of the K_FACTOR may be altered, as appropriate, to account for lens transmittance, lens flare or other camera specific light losses.

b. shutter type

The shutter type designates whether the shutter that is available for use in the camera is either PROGRAMMABLE or CONVENTIONAL. A programmable shutter is one in which the times to open and close the shutter, and the time during which the shutter is open as well as the size of the shutter opening can be independently varied, either electronically or mechanically. Accordingly, a sophisticated programmable shutter can be successively set to each one of a number of multiple independently variable lens aperture sizes during a single exposure. A simple programmable shutter, such as a slow opening shutter, may also be used. For a slow opening shutter, different apertures for flash and ambient portions of a single exposure are obtained by delaying a flash triggering signal until a specified shutter opening diameter has been reached, so as to provide a flash aperture, with the shutter continuing to open until a desired ambient aperture is obtained. In a conventional shutter, the time during which the shutter remains open can vary, but only one aperture size is available during a single exposure.

In addition, though not specifically utilized in our process shown in subsequent operational diagrams, the shutter type can also specify the specific configuration of the shutter that is available for current use, i.e. whether the shutter is a focal plane shutter or a leaf shutter, or whether both a focal plane shutter and a leaf shutter are available in the camera for current use during a common exposure. A small measure of exposure control, particularly in flash situations, beyond that obtainable by our inventive process shown in the operational diagrams can be achieved by readily modifying the appropriate steps in our process to account for the shutter speed synchronization limitations and the differing exposure affect(s) of the available shutter configuration(s).

c. camera limits

The camera limits contain the shutter speed limits which are defined to be the MAXIMUM_SHUTTER_SPEED (i.e. the slowest shutter speed at which the shutter can operate) and the MINIMUM_SHUTTER_SPEED (i.e. the fastest shutter speed at which the shutter can operate) for the specific shutter contained within the camera.

3. Film Quality Vs. Exposure Information

This category contains a set of empirically defined tables of exposure characteristics for the different film types that can be used in the camera; one table exists for each different film type. These tables are stored within ROM 255 shown in FIG. 2. Each table provides a profile, in terms of stops of extra system speed, that: (a) delineates the amount of extra system speed, in stops, from the total amount of extra system speed which is available (applied as an input value to the table), that is to be used to intentionally change the exposure of the film from the ISO normal settings in order to produce an improvement in image quality, and (b) provides as an output value the amount of extra system speed that still remains for use by other techniques, as described below, to further improve image quality beyond over-exposure. In those situations where the input value for the extra system speed that is applied to the table is a negative value and the film provides an acceptable quality image with intentional under-exposure, then the resulting output extra system speed value produced by the table is typically less negative than the input value thereby facilitating the use of other techniques to improve image quality, such as use of a wider lens aperture for providing an expanded depth-of-field to cover additional subject thickness. An illustrative table is shown in Table 1 below:

TABLE 1

| ILLUSTRATIVE FILM QUALITY vs. EXPOSURE TABLE ||
|---|---|
| Extra System Speed In | Extra System Speed Out |
| −4 | −3.5 |
| −2 | −1.5 |
| −.5 | 0 |
| .5 | 0 |
| 1.0 | 0 |
| 2.0 | 0 |
| 3.0 | 1.0 |

The numerical difference between an input and its associated output value for any entry in the table specifies the amount of extra system speed that is to be consumed by intentionally changing the exposure of the film, by under- or over-exposure, from the ISO normal values. Since reversal film has a rather narrow exposure latitude, then nearly any deviation from ISO normal exposures for this film would tend to degrade resulting image quality. As such, intentional over- or under-exposure would not be used with such a film. Furthermore, the film quality vs. exposure table for reversal film would generally show no differences between the values of the extra system speed in and out. Accordingly, extra system speed would be used in different ways than intentionally over- or under-exposing the film in order to improve resulting image quality.

4. Subject Distance Information

This category, depicted in FIG. 3, consists of two parameters: PRIMARY_SUBJECT_DISTANCE and BACKGROUND_SUBJECT_DISTANCE which respectively specify the distances from the camera to the foreground and background portions of the image being photographed. These distances are supplied, as discussed above, from horizontal rangefinding system 220 shown in FIG. 2.

5. FILM_SPEED

This category, shown in FIG. 3, consists of only one parameter, namely the ISO (ASA) speed of the film currently in use. The value of this parameter is read, as discussed above, from the "DX" contacts situated on the external surface of a film canister.

6. Shake Information

This category contains two parameters: the STANDARD_SHAKE_FRACTION and the BLUR_FROM_SHAKE which relate to image blur.

a. STANDARD_SHAKE_FRACTION

The STANDARD_SHAKE_FRACTION is defined as the allowable fraction of the ADJUSTED_BLUR_CIRCLE_CRITERIA that can result from camera shake. The value of this parameter will generally vary among different camera types and sizes and is set during camera manufacture based upon the camera shake that is expected to be generated by typical users of the camera. A very light camera, such as a disposable camera, which is very susceptible to camera shake would require a relatively small value for the STANDARD_SHAKE_FRACTION. Alternatively, a relatively solid and heavy camera, such as a professional 35 mm camera, would is far less prone to camera shake would have a significantly larger value for the STANDARD_SHAKE_FRACTION. Furthermore, the value of this parameter could be set by a photographer through a potentiometer or other user accessible control. In this way, the parameter could be adjusted to conform to the ability of that specific individual to steadily hold the camera.

b. BLUR_FROM_SHAKE

The BLUR_FROM_SHAKE is the measured amount of camera shake that is actually occurring while an exposure is being made. As discussed above, this shake amount is measured and supplied to the camera microcomputer system by shake sensor 225 shown in FIG. 2.

To reduce implementation cost, shake sensor 225 and processing of all shake information or a portion thereof (such as real-time measurements of BLUR_FROM_SHAKE and its associated processing), as described in detail below, could be eliminated from our inventive process at the cost of a lessened degree of improved image quality attainable through the remainder of this process.

7. Lens Specifications

The lens specifications, noted in FIG. 3 and supplied to the camera microcomputer system by microcomputer system 282 depicted in FIG. 2 and located within the specific lens that is mounted to the camera, include the following parameters: aperture limits and FOCAL_LENGTH, both of which are defined as follows.

a. aperture limits

The aperture limits contain the lens aperture size limits, defined as the MINIMUM_APERTURE and MAXIMUM_APERTURE for the specific lens mounted to the camera and respectively equal the smallest (the maximum f-number, i.e. the value of parameter MAXIMUM_F_NUMBER) and largest aperture openings (the minimum f-number, i.e. the value of parameter MINIMUM_F_NUMBER), that this lens can provide.

b FOCAL_LENGTH

The FOCAL_LENGTH is merely the numeric value in millimeters of the focal length of this lens. If the lens is a zoom lens, then this value is the focal length to which the lens is currently set.

8. Subject Light Levels

This category consists of two parameters: the PRIMARY_SUBJECT_LIGHT_LEVEL and the BACKGROUND_LIGHT_LEVEL which, measured through light metering system 215 as shown in FIG. 2 and discussed above, provides the intensity of lumination of the foreground and background portions of the scene that is currently being photographed.

9. Flash Specifications

The flash specifications, noted in FIG. 3, include the following parameters: AMBIENT_FILL_APERTURE, FLASH_SHUTTER_SPEED, FLASH_FALL_OFF_LIMIT, TRIP_POINT, MINIMUM_FLASH_SYNC_SPEED, FILL_FLASH_COMPENSATION_FACTOR, energy_saving_flash, spread bounce information, depth number information and GUIDE_NUMBER; all of which are defined as follows.

a. AMBIENT_FILL_APERTURE

The value of this parameter, a limit point, defines the maximum size of the lens aperture that can be used to fill in the ambient lighting, i.e. the lens aperture size that is available to build up the background light level, as the shutter remains open after a full flash has been fired. This value is not necessarily the lens aperture size that is needed to fully bring up the ambient lighting in a full flash situation, but rather is the maximum lens aperture size that is currently available for use with full flash. In certain photographic situations, such as in a moonlit or very low-light scene, the ambient lighting may be so low that the AMBIENT_FILL_APERTURE value is simply insufficient, absent a very long time exposure, to properly and completely bring up the ambient lighting.

b. FLASH_SHUTTER_SPEED

The value of the FLASH_SHUTTER_SPEED parameter is a default shutter speed that is chosen for use in photographing a current scene using a flash exposure.

c. FLASH_FALL_OFF_LIMIT

The FLASH_FALL_OFF_LIMIT parameter specifies a range of distances from the camera at which the flash illumination eliminates detail from the image. Specifically, if the subject is too close to the camera, the flash illumination will wash out the subject and over-expose the film, thereby eliminating any sharpness of the subject from the image. Alternatively, if t' e subject is too far from the camera, then the intensity of the flash, which falls off as the inverse square of the distance to the subject, will simply be insufficient to illuminate and differentiate the subject from the background. At these distances, the subject will blend into the background and image detail will be lost. Inasmuch as flash illumination can not properly illuminate objects located outside the range of subject-to-camera distances specified by the FLASH_FALL_OFF_LIMIT, the numeric range of this parameter provides a limit on the depth-of-field needed for use in flash photography which correlates depth-of-field to depth-of-illumination.

d. TRIP_POINT

The value of the TRIP_POINT parameter is a constant which specifies the maximum overall scene lumination at which a full flash exposure is made. The overall scene lumination, which is generally an average value across the entire scene, can be obtained from light metering system 215 shown in FIG. 2 or from a separate light sensor built into the camera.

e. MINIMUM_FLASH_SYNC_SPEED

The value of the MINIMUM_FLASH_SYNC_SPEED parameter is a constant dictated by camera design that specifies the shortest shutter speed at which a flash unit can be synchronized to the shutter.

f. FILL_FLASH_COMPENSATION_FACTOR

The value of the FILL_FLASH_COMPENSATION_FACTOR parameter is an empirical constant that provides a limit on the amount of fill flash that will be used in a photographic situation. Fill flash illumination is designed to balance the illumination in scenes having high lighting contrasts, such as daylight photography where the primary subject is situated in a shadow. However, if excess fill flash illumination were projected onto the primary subject, then the scene lighting would effectively reverse with the primary subject being bright and the background in the scene becoming excessively dark due to flash fall-off and hence insufficient background scene illumination.

g. energy_saving_flash

This category merely consists of one parameter that specifies whether the flash unit has the ability to fire its flash tube with only a portion of total energy that can be stored in a storage capacitor located within the unit.

h. spread bounce information

This category provides parameters related to the availability and use of bounce and spread flash illumination and contains the following categories of parameters and individual parameters: ceiling_exist, BOUNCE_CUTOFF and the spread table. Similar to the use of shake sensor 225 shown in FIG. 2, vertical rangefinding system 230 along with all the processing of bounce information, as described in detail below, could be eliminated from our inventive process at the cost of a lessened improvement in overall image quality produced by the remainder of our process. Alternatively, the portion of the inventive process, as described below, that utilizes spread bounce information could be severed from the remainder of the process and be incorporated into cameras to automatically utilize bounce illumination where, based upon scene characteristics alone, doing so will improve image quality.

1. ceiling_exist:

The category merely contains one parameter that digitally specifies (YES|NO) whether a surface exists from which flash illumination can be bounced. As discussed above, vertical rangefinding system 230 shown in FIG. 2, detects the presence of such a surface and provides a suitable indication thereof to the camera microprocessor system. Clearly, if an appropriate surface does not exist or insufficient flash power exists to produce effective bounce illumination, then flash power and extra system speed should not be used for bounce illumination; otherwise, flash power would simply be wasted and no visibly noticeable improvement in image quality would result. Consequently, the extra system speed and flash power should be used differently, such as through a direct flash with spread illumination, in order to improve image quality.

2. BOUNCE_CUTOFF:

The value of this parameter is a numeric limit point which specifies, in log E terms, the minimum amount of the extra system speed (typically 0.9) that is required for use in bounce photography. If an amount of extra system speed exists in a photographic situation but is insufficient for bounce photography, then bounce photography will not be used due to the inability to noticeably improve the quality of the photographed image.

3. spread table:

This is a table of values that relates available extra system speed to: appropriate SPREAD_ANGLE—angle over which flash illumination could be spread across the scene, amount of direct flash illumination in terms of the extra system speed (SPREAD_AMOUNT) that could be used for spread illumination and the remaining extra system speed that is available (such as for intentional over-exposure) after spread flash illumination is invoked.

Spread direct flash illumination is used where a ceiling does not exist or where the value of the BOUNCE_CUTOFF parameter can not be met by the available extra system speed but where sufficient extra system speed exists to support spreading direct flash illumination across the scene. Using spread flash illumination in this situation would produce a pleasing image which has a higher overall quality than if no flash illumination were used at all.

i. depth number information

This category consists of two parameters: DEPTH_NUMBER and DEPTH_NUMBER_FOCAL_LENGTH.

The portion of the inventive process, as described below, that processes depth number information could be severed from the remainder of the process and be incorporated into cameras to automatically improve image quality. In that regard, use of this portion of the process, as described in detail below, would set the lens aperture in flash photography to a value that for a given subject distance provides a depth-of-field that matches the available flash depth-of-illumination. To the extent that extra system speed exists once such a lens aperture setting is chosen, then that extra system speed could be utilized, for example, to bounce or spread the flash illumination, rather than using non-spread direct flash illumination, thereby more evenly illuminating the entire scene and improving image quality over that provided by using ISO normal exposure settings. Here, the lens aperture would not, in the first instance, merely be stopped down since doing so would be likely to needlessly increase the depth-of-field.

1. DEPTH_NUMBER:

This parameter permits the present invention to be used in conjunction with flash photography.

Where the value of the DEPTH_NUMBER parameter for the lens currently in use equals the value of the GUIDE_NUMBER for a flash unit currently in use, then the value of the DEPTH_NUMBER parameter equals the product of the lens aperture, measured in stops of f-number, and the primary subject distance, as measured from a flash unit mounted to the camera, at which the depth-of-field produced by the lens will match the depth-of-illumination provided by the flash unit. For a given value of DEPTH_NUMBER, a multitude of pairs of corresponding values for lens aperture settings and subject distances can be determined at which depth-of-field will match the depth-of-illumination. As will be shown below, the value of the DEPTH_NUMBER parameter is calculated based on depth-of-field and depth-of-illumination requirements, but not film speed. Accordingly, since DEPTH_NUMBER is only dependent upon optical characteristics, the same DEPTH_NUMBER may be used for any film speed as long as the same lens is used. If a flash unit having a GUIDE_NUMBER value equal to the value of the DEPTH_NUMBER is used, then, in a photographic system having continuous auto-focusing and continuous lens aperture control (continuous rather than quantized variations in the lens aperture size), an ISO normal exposure can be obtained throughout the entire flash range. Alternatively, extra system speed will likely be present in those situations where the GUIDE_NUMBER exceeds the DEPTH_NUMBER and hence can be used to improve image quality beyond that obtainable through use of the ISO/ANSI exposure standards.

The most efficient use of system speed occurs whenever the depth-of-field matches the depth-of-illumination. In this regard, if subject thickness extends beyond the available depth-of-illumination provided by the flash unit, then that portion of the subject which is situated outside the far limit of the depth-of-illumination will be insufficiently illuminated and hence will not need to be in-focus in the photographed image. This depth-of-illumination limitation, in turn, reduces the depth-of-field required of the lens. Alternatively, in those situations where depth-of-field is less than depth-of-illumination, the lens will provide an insufficient depth-of-field to fully cover the entire subject thickness that is capable of being properly illuminated by the flash unit. As such, that subject will not be sharply photographed from end-to-end.

For the situation where the values of DEPTH_NUMBER and GUIDE_NUMBER are equal, DEPTH_NUMBER can be derived as follows. First, the hyperfocal distance for a given lens aperture, i.e. the closest distance at which an image appears sharp when a lens is focused at infinity or equivalently the closest distance at which a lens can be focused and an object located at infinity will appear sharp, is given as follows by equation (2)—which is well known:

$$H = \frac{F^2}{(f) \cdot (bc)} \quad (2)$$

where:
H = the hyperfocal distance;
F = the focal length of the lens in use;
f = the lens aperture size measured in f-number; and
bc = the blur circle diameter on the negative.

From use of equation (2), the near and far depth-of-field limits can be calculated using well known equations (3) and (4), as follows:

$$D_+ = \frac{H \cdot d}{H - (d - F)} \quad (3)$$

$$D_- = \frac{H \cdot d}{H + (d - F)} \quad (4)$$

where:
$D_+$ = the far depth-of-field limit;
$D_-$ = the near depth-of-field limit; and
d = the distance at which the lens is focused.
The term (d − F) is only significant in those situations, such as close-up photography, where d < 10F.

The exposure fall-off as a function of distance (d) from a flash unit is given by the following well known equation:

$$\Delta E = \log_{10}(d_2/d_1)^2 \quad (5)$$

This equation states that as the ratio of the distances from the flash unit to a subject doubles (e.g. $d_2 = 8$ feet (approximately 2.4 m) and $d_1 = 4$ feet (approximately 1.22 m)), then the exposure difference becomes 0.6 or two stops. In addition, hereinafter all logarithms (logs) are to the base "10" unless specifically indicated otherwise. Given equation (5), the far and near depth-of-illumination exposure factors, $C_+$ and $C_-$, can be calculated using equations (6) and (7) as follows:

$$C_+ = \sqrt{10 \; (+\Delta E)} \quad (6)$$

$$C_- = \sqrt{10 \; (-\Delta E)} \quad (7)$$

Given these equations, the corresponding near and far depth-of-illumination limits, $D_N$ and $D_F$, are given by equations (8) and (9) as follows:

$$D_N = (d_s)(C_-) \quad (8)$$

$$D_F = (d_s)(C_+) \quad (9)$$

where: $d_s$ = the distance from the subject to the flash unit.

For example, for a ±1 stop variation in exposure around a subject located 8 feet (approximately 2.4 m) from a flash unit, the resulting depth-of-illumination extends from (8)(0.708) = 5.7 feet (approximately 1.7 m) to (8)(1.41) = 11.3 feet (approximately 3.4 m) from the unit. As such, all objects located within this range will receive an amount of illumination within one stop of that of the subject.

With these equations, a mathematical expression can be derived for DEPTH_NUMBER using either the near or far depth-of-field limit. If the near or far depth-of-field limit is selected, then the near or far depth-of-illumination exposure factor is selected, respectively. Inasmuch as it is desirable to utilize a depth-of-field which covers the entire range of depth-of-illumination and perceptual experiments, which we have conducted, have indicated that the absolute value of the exposure occurring at the far depth-of-illumination limit appears greater than that which occurs at the near depth-of-illumination limit, the expression for DEPTH_NUMBER will now be derived using the far depth-of-field limit as specified by equation (3). First, equation (3) can be simplified to equation (10) as follows by assuming that "close-up" images are not being taken:

$$D_+ = \frac{H \cdot d}{H - d} \quad (10)$$

Multiplying the top and bottom of this fraction by (1/H)/(1/H), then substituting for H the expression $F^2/(f)(bc)$, followed by multiplying the resulting fraction by $1/[(f)(bc)/(f)(bc)]$ results in:

$$D_+ = \frac{d}{1 - \frac{[d \cdot f \cdot bc]}{F^2}} \quad (11)$$

Since (d)(f) equals the GUIDE_NUMBER (abbreviated GN and discussed in detail below), equation (11) can be written as:

$$D_+ = \frac{d}{1 - \frac{GN \cdot bc}{F^2}} \quad (12)$$

Since far depth-of-illumination equals $(C_+)(d)$, then by making this substitution and equating far depth-of-field to far depth-of-illumination equation (13) results as follows:

$$(C_+)(d) = \frac{d}{1 - \frac{GN \cdot bc}{F^2}} \quad (13)$$

Through simple manipulation of equation (13), the following formula for GUIDE_NUMBER as given by equation (14) results:

$$GN = \frac{(C_+ - 1)}{C_+} \cdot \frac{F^2}{bc} \quad (14)$$

Since the minimum value of GUIDE_NUMBER should equal the value of DEPTH_NUMBER to assure that far depth-of-illumination limit matches the far depth-of-field limit, then, after dividing equation (14) by 12 to convert inches to feet, equation (15) for DEPTH_NUMBER results as follows:

$$\text{DEPTH\_NUMBER}_{(f)} = \frac{\frac{(C_+ - 1)}{C_+} \cdot \frac{F^2}{bc}}{12} \quad (15)$$

where: F = the lens focal length (in inches).

As an example, for a 35 mm lens, a far end depth-of-illumination exposure limit of 0.45 log E (=1.68 for a ±1.5 stop difference) and a blur circle on the negative of 0.002 inches (approximately 0.0051 cm), the value of the DEPTH_NUMBER parameter given by equation (15) equals "32". Accordingly, a camera using this lens along with a flash unit having a GUIDE_NUMBER equaling "32" will provide matched depth-of-field and depth-of-illumination as long the product of the value of F_NUMBER and the subject distance equals "32". As one can appreciate, the value of DEPTH_NUMBER only needs to be calculated once for a particular lens focal length. Thereafter, the value of DEPTH_NUMBER can be used to select lens aperture sizes based upon subject distances which provides matched depth-of-field and depth-of-illumination. However, the value of DEPTH_NUMBER would need to be re-calculated if the depth-of-illumination exposure limits were to change or a different blur circle on the negative were to be used. As indicated by equation (16), the value of DEPTH_NUMBER can be easily calculated for lenses of different focal lengths, with the same blur circle diameter and far depth-of-illumination limit, as follows:

$$\text{DEPTH\_NUMBER}_2 = \text{DEPTH\_NUMBER}_1 \cdot \frac{(F_2)^2}{(F_1)^2} \quad (16)$$

where:
DEPTH_NUMBER$_1$ = a DEPTH_NUMBER value for lens having focal length value $F_1$; and
DEPTH_NUMBER$_2$ = a DEPTH_NUMBER value for lens having focal length value $F_2$.

2. DEPTH_NUMBER_FOCAL_LENGTH:

This value of the DEPTH$_{13}$ NUMBER_FOCAL_LENGTH parameter is the FOCAL_LENGTH at which the current value of the DEPTH_NUMBER was determined.

j. GUIDE_NUMBER

This parameter, which is well known in the art, specifies, as given by equation (17) below, the product of subject distance $(d_s)$ and lens aperture (FLASH_F_NUMBER) for full flash illumination which for a specified ISO (ASA) film speed, such as illustratively ISO (ASA) 100 speed film, will result in an ISO normal exposure:

$$GN_{(ISO\ 100)} = d_s \cdot \text{FLASH\_F\_NUMBER} \quad (17)$$

The GUIDE_NUMBER value, for a specific film speed such as ISO (ASA) 100 speed, will vary from flash unit to flash unit depending upon the amount of light energy produced by the specific flash unit, and thus provides a measure of the output power provided by the flash unit.

The values of either the DEPTH_NUMBER of GUIDE_NUMBER can be used to select a lens aperture (FLASH_F_NUMBER) given a subject distance. Unlike DEPTH_NUMBER which is used to select a lens aperture setting based upon optical characteristics—exposure limits, lens focal length and blur circle diameter, GUIDE_NUMBER is used to select this setting based upon the output power provided by the flash unit. In those flash situations where the value of GUIDE_NUMBER for the specific flash unit in use exceeds the DEPTH_NUMBER for the lens currently in use, extra system speed will likely exist, as illustrated above.

10. RECYCLE_MODE

This category, shown in FIG. 3, contains one parameter which assumes either one of two digital values (NORMAL | FAST) depending upon the rate at which the flash unit currently in use is able to recycle itself for the next exposure. The value of this parameter can be obtained either through a user-settable switch located on the camera, or preferably, as a constant supplied by the microcomputer system within the flash unit.

11. FOCAL_LENGTH_FACTOR

This category contains one parameter, k, that when multiplied by the reciprocal of the FOCAL_LENGTH, specifies, as given by equation (18) below, the slowest shutter speed that can be used for a given lens to eliminate any noticeable affects of camera shake on a resulting image:

$$\text{SLOWEST SHUTTER SPEED} = k/\text{FOCAL\_LENGTH} \quad (18)$$

The value of the parameter, k, is initially a constant empirically determined during camera design with a value smaller than 1.0, but is subsequently adjusted (typically downward for increasing display sizes), through use of the DISPLAY_SIZE_FACTOR, to account for the affects of differing levels of optical image blur that would otherwise occur at correspondingly different reproduction magnification ratios. This, in turn, for increased display sizes, sets the slowest shutter speed to increasingly faster (numerically lower) values.

In this regard, the reproduction magnification ratio determines the extent to which desired information content and accompanying image blur are equally enlarged onto a print. Hence, parameter k, like the BLUR_CIRCLE_CRITERIA, must be scaled, through as discussed below multiplication by the DISPLAY_SIZE_FACTOR, such that similar levels of optical image blur result from systems that produce similarly sized prints from different standard reproduction magnification ratios.

12. DISPLAY_SIZE_FACTOR

This category contains one parameter, specifically a multiplicative factor, that varies both the standard values of the BLUR_CIRCLE_CRITERIA and the FOCAL_LENGTH_FACTOR for an expected amount of perceived image blur that would generally be associated with a selected display size. Since the reproduction magnification ratio and display size can independently vary—such as through the use of pseudo-panoramic or pseudo-telephoto (non-standard focal length photographing modes) which selectively vary the reproduction magnification ratio but not the display size—and adversely affect the perceived blur circle on the print, the value of the FOCAL_LENGTH_FACTOR exhibits an independent variation with changes in either the reproduction magnification ratio or the viewing distance, the latter being an empirically based function of the display size.

In particular, we have found that, contrary to conventional wisdom, human observers do not view prints at distances that are linearly related to display size. In this regard, we have determined through empirical-based perceptual measurements of eye-to-display separation, that the average viewing distance, for hand-held prints of varying sizes, can be characterized by the equation (19) as follows:

$$V_d = 3.64 + 11.34[\log_{10}(D)] \quad (19)$$

where:

$V_d$ = the viewing distance (eye-to-display separation, as specified in inches); and $D$ = the diagonal dimension of the print (display), in inches.

Thus, as one can see, based upon equation (19), the viewing distance, on the average, is a logarithmic function of display size (D). For example, for a non-standard 4" by 5" print (approximately 10.2 cm by 12.7 cm) and a standard 8" by 10" print (approximately 20.3 cm by 25.4 cm), the diagonals are respectively $(4^2+5^2)^{\frac{1}{2}} = 6.4"$ (approximately 16.3 cm) and $(8^2+10^2)^{\frac{1}{2}} = 12.8"$ (approximately 32.5 cm). Substituting these diagonal values into equation (19) yields corresponding viewing distances of 12.8" and 16.2" (approximately 32.5 cm and 41.2 cm, respectively). Thus, although the print size has doubled in this example, the Viewing distance has only increased by approximately 21%—a rate that is insufficient to completely negate the effect of the doubling of the reproduction magnification ratio. As noted above, in order to fully offset the effect of the increased blur attributable to a doubling of the reproduction magnification, the viewing distance would need to be doubled.

Given the need to compensate for the affect of viewing distance on perceptual blur circle, an independent affect also exists for changes in the reproduction magnification ratio. In this regard, consider an illustrative example of a photographic system through which a 4" by 5" print may be generated from either a full-frame rendition of an original film frame or from a pseudo-focal-length (i.e. pseudo-telephoto) photographing mode in which a range smaller than the normal full frame will be enlarged and printed on photographic paper. The viewing distances of both of the resulting prints is the same since the physical dimensions of the prints are equal; however, the pseudo-telephoto mode employs a reproduction magnification ratio that is higher than that required for the 4" by 5" print. As a result, the apparent image blur will be magnified in proportion to the level of pseudo-telephoto magnification. In particular, if a standard reproduction magnification ratio of 4.0× if required for a 4" by 5" print from a standard film frame and a non-standard reproduction magnification of 8.0× is required to produce a 4" by 5" print with the pseudo-telephoto mode, then a print generated through the pseudo-telephoto mode will exhibit twice the amount of optical image blur as will an image enlarged through the standard reproduction ratio.

Hence, we now define the DISPLAY_SIZE_FACTOR (DSF) by equation (20) as follows:

$$\text{DISPLAY\_SIZE\_FACTOR} = \left[\left[\frac{M_S}{M_N}\right]\left[\frac{V_{DN}}{V_{DS}}\right]\right]^x \quad (20)$$

where:

$M_S$ = standard reproduction magnification ratio;

$M_N$ = non-standard reproduction magnification ratio;

$V_{DS}$ = viewing distance for the standard display size; and $V_{DN}$ = viewing distance for the non-standard display size.

$X$ = 1.0 based on geometrical optics and a smaller value in those cases, i.e. extremely large display sizes, where well-known approximations inherent in geometrical optics are no longer valid.

By defining the DSF in this fashion, this parameter can quantitatively accommodate the independent selection of any display size and any reproduction magnification ratio.

As an example, the DSF for an 8" by 10" print from a full frame image on type 135 film is calculated by first determining the reproduction magnification ratios. For a standard 3½" by 5" print, the reproduction magnification ratio ($M_S$) is 3.9; while an 8" by 10" print requires a reproduction magnification ratio ($M_N$) of 8.9. Through use of equation (19) above, the viewing distances for these prints are $(3.64+11.34[\log(6.1)]) = 12.5"$ (approximately 31.8 cm) and $(3.64+11.34[\log(12.8)]) = 16.2"$ (approximately 41.2 cm). Substituting these values into equation (20) above results in a DSF of $[3.9/8.9][16.2/12.5] = 0.57$.

In use, a specific value of the DSF is initially determined for each unique combination of reproduction magnification ratio and display size and stored within the DISPLAY_SIZE_FACTOR table situated within ROM 260 (see FIG. 2). Thereafter, prior to image capture, microprocessor 235 reads the setting of both the display size switch 206 and the "focal length mode" switch (if the camera is equipped with the latter), as set by the photographer, applies these settings as an address to this table and then undertakes a table look-up operation. The resulting value of the DISPLAY_SIZE_FACTOR, applicable to the display size and focal length photographing mode selected by the photographer, and generated by the table is then used throughout our inventive optimization process, as shown in FIGS. 3A–14 and described in detail below, to correctly adjust the standard values of the BLUR_CIRCLE_CRITERIA and the FOCAL_LENGTH_FACTOR and thereby, make the most efficient use of available system speed in determining proper exposure (and, where suitable, flash) parameter values for the particular image then being captured given both the specific display size and the focal length photographing mode through which that image will be ultimately displayed.

OUTPUT CATEGORIES

13. Exposure Settings

This category contains the following parameters: SHUTTER_SPEED, F_NUMBER and the FLASH_F_NUMBER, that are needed to drive the camera to produce a proper exposure of the current scene.

a. SHUTTER_SPEED

The value of the SHUTTER_SPEED parameter specifies the speed, in seconds, of the shutter needed for the current exposure.

b. F_NUMBER

The value of the F_NUMBER parameter specifies the size of the lens aperture, in stops, that is needed for a current exposure in ambient lighting conditions.

c. FLASH_F_NUMBER

The value of the FLASH_F_NUMBER parameter specifies the size of the lens aperture, in stops, that is needed for a current flash exposure.

14. POWER_CONDITION

This category contains one numeric parameter that specifies the amount of flash output power that is to be produced after which the flash unit is to quench itself. For example, if an energy savings flash unit were available and a given scene only required one-half of the total available output illuminance provided by the flash unit, then the value of the POWER_CONDITION parameter would be 0.5. The value of this parameter would be provided by the camera microcomputer system to the flash microcomputer system prior to firing the flash unit. In a relatively simple flash unit, the value of this parameter would specify when a so-called "ready" light situated on the flash unit would energize thereby indicating that the flash unit is ready to be re-fired and is temporarily extinguishing any further charging of a storage capacitor located therein.

15. flash_condition

This category contains one digital parameter that merely specifies (YES|NO) whether or not flash illumination is to be used at all in photographing a current scene. The flash unit is always available for use; however, its use is governed by the need for supplemental lighting as determined by our inventive process 300.

16. spread_bounce_condition

This category contains three parameters: SPREAD_AMOUNT, SPREAD_ANGLE and BOUNCE_AMOUNT. These parameters specify the specific manner in which flash illumination is to be used.

a. SPREAD_AMOUNT

As noted above, the value of parameter SPREAD_AMOUNT specifies the amount of extra system speed that can be utilized for spread flash illumination in photographing a current scene.

b. SPREAD_ANGLE

As noted above, the value of parameter SPREAD_ANGLE defines the angle over which direct full flash illumination is to be spread across a scene currently being photographed.

c. BOUNCE_AMOUNT

The value of the BOUNCE_AMOUNT parameter defines the amount of extra system speed that can be utilized for bounce flash illumination in photographing a current scene.

The values for the parameters for the POWER_CONDITION, flash_condition and spread_bounce_condition categories collectively define the configuration in which the flash unit is to operate.

This now concludes the overall description of the input parameters applied to our inventive process and the output parameters generated thereby. The discussion will now address the specifics of our inventive process as shown in FIGS. 3A–14. Additional parameters and categories thereof will be defined, as the need arises, during the course of the ensuing discussion.

Figure 3A:
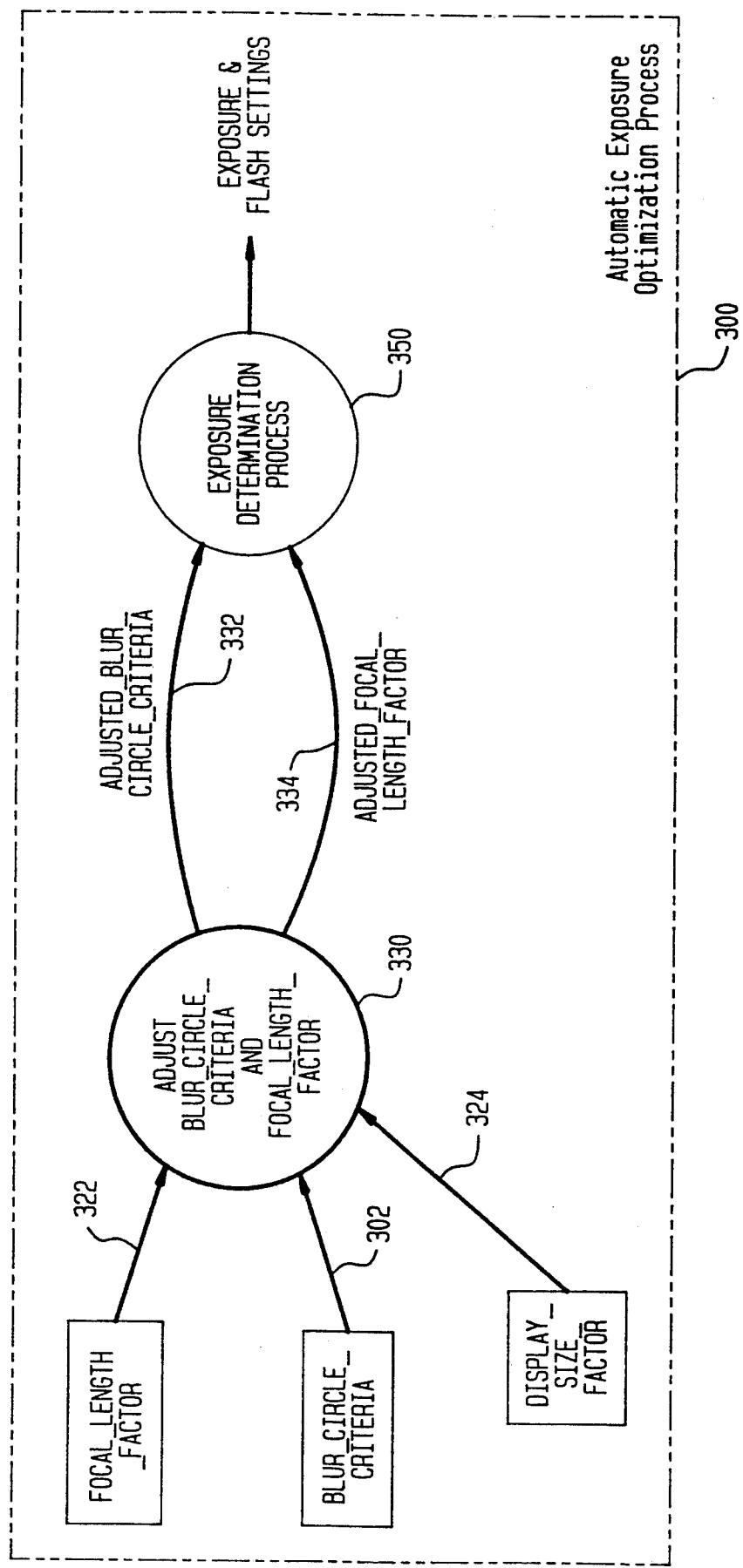
FIG. 3A depicts a high level operational diagram of our inventive process 300 shown in FIG. 3.

FIG. 3A depicts a high level operational diagram of our inventive automatic exposure optimization process 300 shown in FIG. 3. As shown, the process contains primitive process 330 followed by exposure determination process 350. Upon entry into process 300, process 330 is first performed to adjust the nominal values of the BLUR_CIRCLE_CRITERIA and the FOCAL_LENGTH_FACTOR using the DSF associated with the current image being captured. In this regard, as described above, just prior to image capture, the camera microprocessor reads the current settings of the display size and focal length photographing mode switches and, based upon those settings, performs a table look-up operation into the DSF table stored in ROM 260 (see FIG. 2) to yield a value of this factor that is appropriate to the present image being captured and the manner through which this image will be displayed. The resulting DSF value is applied, as represented through line 324 (as shown in FIG. 3A), along with the standard values of the BLUR_CIRCLE_CRITERIA and the FOCAL_LENGTH_FACTOR as represented by respective lines 302 and 322, as input to process 330. This process is formed of the following routine expressed in high level functional programming terms:

```
INPUT: DISPLAY_SIZE_FACTOR
INPUT: BLUR_CIRCLE_CRITERIA
INPUT: FOCAL_LENGTH_FACTOR
OUTPUT: ADJUSTED_BLUR_CIRCLE_CRITERIA
OUTPUT: ADJUSTED_FOCAL_LENGTH_FACTOR
ADJUSTED_BLUR_CIRCLE_CRITERIA =
     (BLUR_CIRCLE_CRITERIA) •
     DISPLAY_SIZE_FACTOR)
ADJUSTED_FOCAL_LENGTH_FACTOR =
```

-continued (FOCAL_LENGTH_FACTOR)•
(DISPLAY_SIZE_FACTOR)

The resulting adjusted values are then used as inputs, as represented by lines 332 and 334, in exposure determination process 350, which, in turn, determines the optimum exposure (and, where appropriate, flash) parameter settings.

A high level operational diagram of exposure determination process 350 is shown in FIG. 4. As shown, this process contains six basic processes 410, 420, 430, 440, 450 and 460, of which two processes, specifically processes 410 and 440 represented by darkened circles are primitives.

Essentially, to produce a photographed image, process 350 relies on first determining in processes 410 and 420 the type of scene lighting, i.e. ambient or full or fill flash, that is to be used to capture this image. Based upon the selected type of scene lighting, process 350 then determines in processes 430, 440 or 450, the base-line values (typically the ISO normal exposure settings) of the exposure settings and flash parameters appropriate to that lighting type. These parameters include both the exposure settings and, if flash illumination is to be used, various output flash parameters to properly set and control the flash unit. Once these parameters are determined, process 460: (a) determines, based in part upon scene requirements, whether and how much extra system speed exists in the current photographic situation, (b) then specifies the manner through which the extra system speed can best be used to improve the quality of the resulting photographed image beyond that obtainable through the base-line exposure settings, and (c) modifies the previously determined base-line exposure settings and output flash parameters to utilize as much as possible of the extra system speed in order to improve the quality of the photographed image beyond that obtainable by the ISO normal exposure settings.

Specifically, process 410 utilizes the subject light levels and flash specifications, as represented by lines 316 and 318, to determine if a full flash exposure is to be made. In particular, process 410 compares the lumination of the primary subject against the value of the TRIP_POINT parameter. If the primary subject is too dark, i.e. has an intensity less than the TRIP_POINT parameter, then full flash is to be used; otherwise, it is not used. This process is formed of the following routine expressed in high level functional programming terms:

```
INPUT: TRIP_POINT
INPUT: subject light levels
OUTPUT: full_flash_condition
IF_PRIMARY_SUBJECT_LIGHT_LEVEL < TRIP_POINT
  THEN: full_flash_condition = YES
  ELSE: full_flash_condition = NO
ENDIF
```

The value of the output parameter, full_flash_condition, merely specifies whether a full flash is to be used in the current exposure.

In the event a full flash is not to be used (i.e. full_flash_condition="NO"), then as represented by line 414, process 420 is performed to determine if a fill flash should be used instead. This process, described in detail below in conjunction with FIGS. 5 and 6, determines whether a fill flash is to be used, sets the value of the parameter fill_flash_condition to either "YES" or "NO" based upon whether a fill flash is to be used or not, and, if fill flash is to be used, calculates fill flash parameters. To do so, process 420 utilizes the subject light levels, subject distance information, FILM_SPEED, lens specifications and ADJUSTED_FOCAL_LENGTH_FACTOR as represented by lines 316, 308, 310, 314 and 334 along with flash specifications and camera specifications as represented by lines 318 and 304. In particular, from the camera specifications, process 420 utilizes the FILL_FLASH_COMPENSATION_FACTOR parameter, the energy_saving_flash parameter, the GUIDE_NUMBER parameter and the MINIMUM_FLASH_SYNC_SPEED.

Though not specifically delineated in FIG. 4, the fill flash parameters include: the FILL_FLASH_MAXIMUM_APERTURE, the FILL_FLASH_APERTURE and the LIGHTING_RATIO_FACTOR, which are all defined as follows:

17. Fill Flash Parameters a. FILL_FLASH_MAXIMUM_APERTURE

The value of the FILL_FLASH_MAXIMUM_APERTURE parameter is the maximum numerical lens aperture value that is allowable for use in fill flash photography given the fastest available shutter speed that can be currently used in the camera.

b. FILL_FLASH_APERTURE

The value of the FILL_FLASH_APERTURE parameter is the initial value of the lens aperture value that is needed to utilize fill flash to capture the current scene.

c. LIGHTING_RATIO_FACTOR

The value of the LIGHTING_RATIO_FACTOR parameter is taken to be the square root of the ratio of the background to primary subject luminances in the current scene being photographed.

If fill flash is to be used (i.e. fill_flash_condition="YES" as represented by lines 422), then the values of the fill flash parameters are applied, as represented by line 424, as input to process 430. This process, as described in detail below in conjunction with FIG. 7, determines the baseline (initial) values of the exposure settings using the camera specifications, flash specifications —specifically energy_saving_flash and FILL_FLASH_COMPENSATION_FACTOR; lens specifications; subject light levels and FILM_SPEED as represented by lines 304, 318, 314, 316 and 310. The resulting fill flash based exposure settings along with the POWER_CONDITION and positive ("YES") fill_flash_condition are applied, as represented by lines 434, 354 and 422, as input to extra system speed process 460 to determine if extra system speed exists in the present photographic situation and, if so, how this extra system speed should best be used to improve resulting image quality.

Now, alternatively, in the event that ambient scene lighting is to be used, in which case both the full_flash_condition and fill_flash_condition are both "NO", then as represented by lines 422 that emanates from process 420, process 440 is performed to determine the baseline values of the exposure settings for ambient lighting. Process 440 determines the ambient exposure settings, i.e. F_NUMBER and SHUTTER_SPEED, using the FILM_SPEED, the camera specifications—specifically the K_FACTOR; the subject light levels—specifically the PRIMARY_SUBJEC- T—LIGHT—LEVEL; the lens specifications—specifically the FOCAL—LENGTH, and the ADJUSTED—FOCAL—LENGTH—FACTOR, as represented by lines 310, 304, 316, 314 and 334. Here, the fastest shutter speed is chosen based on the focal length of the lens and an appropriate factor to minimize the affects of camera shake. Then, given the shutter speed, a lens aperture size, as measured in F—NUMBER, is chosen to provide a baseline exposure. This process is formed of the following routine expressed in high level functional programming terms:

```
INPUT: subject light levels
INPUT: fill—flash—condition
INPUT: FILM—SPEED
INPUT: camera specifications
INPUT: ADJUSTED—FOCAL—LENGTH—FACTOR
INPUT: lens specifications
OUTPUT: F—NUMBER
OUTPUT: SHUTTER—SPEED
IF fill—flash—condition = NO
  THEN: SHUTTER—SPEED =
    ADJUSTED—FOCAL—LENGTH—FACTOR •
    (1/FOCAL—LENGTH)
    F—NUMBER = [(SHUTTER—SPEED • FILM—SPEED
    • PRIMARY—SUBJECT—LIGHT—LEVEL)
    /(K—FACTOR)]$^{.5}$
ENDIF
```

Once these ambient exposure settings are determined, process 460 is performed, using these exposure settings, i.e. here F—NUMBER and SHUTTER—SPEED, as represented by corresponding lines 444 and 448, to determine if extra system speed exists in the present photographic situation and, if so, how this extra system speed should best be used to improve resulting image quality.

Alternatively, if a full flash is to be used (i.e. full—flash—condition="YES"), then, as represented by line 412, process 450 is performed to determine the baseline values of the exposure settings for full flash lighting. Process 450, as described below in detail in conjunction with FIGS. 8–10, determines the full flash exposure settings, i.e. FLASH—F—NUMBER and SHUTTER—SPEED, using the camera specifications; lens specifications; FILM—SPEED; subject light levels; ADJUSTED—BLUR—CIRCLE—CRITERIA; flash specifications and subject distance information, as represented by corresponding lines 304, 314, 310, 316, 332, 318 and 308. The resulting FLASH—F—NUMBER and the positive full—flash—condition are applied, as represented by lines 458 and 412, as input to extra system speed process 460 to determine if extra system speed exists in the current photographic situation and, if so, how this extra system speed should best be used to improve resulting image quality. The SHUTTER—SPEED of the camera is set to that determined by process 460.

Process 460, as described in detail below in conjunction with FIGS. 11–14, first determines if extra system speed exists and, if so, the amount of the extra system speed that is available for the current photographic situation. This process utilizes the following parameters as inputs: flash specifications—specifically spread bounce information, GUIDE—NUMBER and energy—saving—flash, as collectively represented by lines 318; camera specifications—specifically shutter type and shutter speed limits, as collectively represented by lines 304; lens specifications—specifically FOCAL—LENGTH and aperture limits, as collectively represented by lines 314; RECYCLE—MODE; film quality vs. exposure; ADJUSTED—BLUR—CIRCLE—CRITERIA; shake information, ADJUSTED—FOCAL—LENGTH—FACTOR, and subject distance information as represented by corresponding lines 320, 306, 332, 312, 334 and 308. In addition, if a full flash exposure is to be made, process 460 also utilizes FLASH—F—NUMBER and full—flash—condition provided by process 450, as represented by lines 458 and 412. Alternatively, if ambient lighting is to be used, then process 460 utilizes the baseline values of the F—NUMBER and SHUTTER—SPEED parameters provided by process 440, as represented by corresponding lines 444 and 448. Lastly, in the event a fill flash exposure is to be made, then alternatively process 460 also utilizes the fill—flash—condition and baseline exposure settings provided by processes 420 and 430, as represented by corresponding lines 422 and 434. Once process 460 has determined the amount of the extra system speed that currently exists, this process modifies the exposure settings and flash parameters in a manner, as described in detail below, that best utilizes the available extra system speed to improve image quality, particularly in view of the specific display size and focal length photographing mode selected by the photographer for the image currently being captured. As such, process 460 generates appropriate values for the spread—bounce—condition, POWER—CONDITION, flash—condition and exposure settings parameter categories, as represented by lines 358, 354, 356 and 352. The value of these parameters are then used to drive the camera and flash unit accordingly. The parameters that are specifically needed to drive the flash unit are transmitted, over link 272 as shown in FIG. 2, by the camera microcomputer system to flash microcomputer system 277 to control the flash unit accordingly.

FIG. 5 depicts an operational diagram of fill flash usage determination process 420 shown in FIG. 4. As described above, this process determines, based upon scene and system parameters, if fill flash can be used to improve the quality of the image resulting from photographing the current scene. As shown, process 420 is composed of three steps—two of which are primitive steps: determination of lighting contrast step 510, determination of fill—flash—improvement—condition step 520 and determination of fill—flash—condition step 530. Upon entry into process 420, lighting contrast is determined through step 510 as being either high or normal based upon the difference between the PRIMARY—SUBJECT—LIGHT—LEVEL and the BACKGROUND—SUBJECT—LIGHT—LEVEL. Both of these levels are applied to step 510 as represented by lines 316. If the difference is sufficiently high, i.e. the primary subject is 0.3 log E brighter than the background subject, then high contrast occurs; otherwise normal contrast occurs. This step is formed of the following routine expressed in high level functional programming terms:

```
INPUT: subject light levels
OUTPUT: lighting contrast
IF [(ln(PRIMARY—SUBJECT—LIGHT—LEVEL) −
     ln(BACKGROUND—LIGHT—LEVEL)) / ln(10)] < 0.3
THEN: lighting contrast = HIGH
ELSE: lighting contrast = NORMAL
ENDIF
```

Step 520 determines whether a sufficient improvement in image quality will result if fill flash is used. This step, as described in detail below in conjunction with FIG. 6, bases its determination using the following parameters as input: subject light levels as represented by line 316; flash specifications—specifically FILL_FLASH_COMPENSATION_FACTOR, energy_saving_flash, GUIDE_NUMBER, and MINIMUM_FLASH_SYNC_SPEED, as collectively represented by lines 318; subject distance information, lens specifications; camera specifications; ADJUSTED_FOCAL_LENGTH_FACTOR and FILM_SPEED as respectively represented by lines 308, 314, 304, 334 and 310. Step 520 produces two categories of parameters: fill flash parameters and fill_flash_improvement_condition, as represented by lines 424 and 524, respectively. As noted above, the fill flash parameter category contains the FILL_FLASH_MAXIMUM_APERTURE, FILL_FLASH_APERTURE and LIGHTING_RATIO_FACTOR parameters. The fill_flash_improvement_condition category is defined as follows:

18. fill_flash_improvement_condition

This category contains one digital parameter that merely specifies (YES|NO) whether or not a gain in lighting contrast is likely to occur through use of a fill flash exposure.

If an improvement in image quality, specifically through an improved lighting contrast, can be obtained by a fill flash exposure, then step 530 appropriately sets the fill_flash_condition output parameter as represented by line 422 to "YES". This step is formed of the following routine expressed in high level functional programming terms:

```
INPUT: lighting contrast
INPUT: fill_flash_improvement_condition
OUTPUT: fill_flash_condition
IF (lighting contrast = HIGH) and
    (fill_flash_improvement_condition = YES)
THEN: fill_flash_condition = YES
ELSE: fill_flash_condition = NO
ENDIF
```

An operational diagram of fill flash improvement condition determination step 520 is depicted in FIG. 6. As described above, this step determines, based upon scene and system parameters, if a sufficient improvement in image quality will result if fill flash is used. Step 520 is composed of four primitive steps: calculation of fill flash aperture limits step 610, calculation of fill flash aperture step 620, calculation of ambient lighting ratio factor step 630 and calculation of fill_flash_improvement_condition step 640. Upon entry into step 520, both steps 610 and 620 are performed. Step 610 calculates maximum and minimum scene dependent limit values of the lens aperture based on the maximum and minimum shutter speeds that can be used with flash illumination and current scene parameters. If an actual lens aperture size is determined that exceeds the limit values, then the camera is not able to use a particular shutter speed for that actual aperture limit that will properly expose the background. The resulting lens aperture values are compared against the physical limits of the lens currently in use and, if necessary, clipped by the appropriate physical limit. In particular, step 610 utilizes the following categories of input parameters: ADJUSTED_FOCAL_LENGTH_FACTOR, subject light levels—particularly the BACKGROUND_LIGHT_LEVEL parameter, FILM_SPEED, flash specifications—specifically the MINIMUM_FLASH_SYNC_SPEED parameter, as represented by corresponding lines 334, 316, 310 and 318; camera specifications—specifically the K_FACTOR and shutter speed limits, and the lens specifications—specifically the aperture limits and the FOCAL_LENGTH, as represented by respective lines 304 and 314. The output parameters produced by step 610, as represented by lines 424, are the FILL_FLASH_MAXIMUM_APERTURE and the FILL_FLASH_MINIMUM_APERTURE. Step 610 is formed of the following routine expressed in high level functional programming terms:

```
INPUT: subject light levels
INPUT: FILM_SPEED
INPUT: camera specifications
INPUT: lens specifications
INPUT: ADJUSTED_FOCAL_LENGTH_FACTOR
OUTPUT: FILL_FLASH_MAXIMUM_APERTURE
OUTPUT: FILL_FLASH_MINIMUM_APERTURE
MAXIMUM_USABLE_SHUTTER_SPEED =
    (1/FOCAL_LENGTH) •
    ADJUSTED_FOCAL_LENGTH_FACTOR
FILL_FLASH_MAXIMUM_APERTURE =
    √(MAXIMUM_USABLE_SHUTTER_SPEED •
    FILM_SPEED • BACKGROUND_LIGHT_
    LEVEL / K_FACTOR)
FILL_FLASH_MINIMUM_APERTURE =
    √(MINIMUM—FLASH_SYNC_SPEED • FILM_
    SPEED
    • BACKGROUND_LIGHT_LEVEL / K_
    FACTOR)
IF FILL_FLASH_MAXIMUM_APERTURE >
    MAXIMUM_APERTURE
  THEN: FILL_FLASH_MAXIMUM_APERTURE =
    MAXIMUM_APERTURE
ENDIF
    IF FILL_FLASH_MINIMUM_APERTURE <
    MINIMUM_APERTURE
    THEN: FILL_FLASH_MINIMUM_APERTURE =
MINIMUM_APERTURE
    ENDIF
```

Step 620, when performed, calculates the lens aperture setting for fill flash. This lens aperture setting is determined as that which is required to yield a baseline (typically ISO normal) exposure, at the primary subject distance, under flash conditions. Specifically, this step utilizes the following categories of input parameters: camera specifications —specifically shutter speed limits, subject-distance information—specifically PRIMARY_SUBJECT_DISTANCE, flash specifications—specifically GUIDE_NUMBER, and lens specifications—specifically aperture limits, as represented by corresponding lines 304, 308, 318 and 314. As represented by lines 424 and 624, the outputs produced by step 620 are the FILL_FLASH_APERTURE and the aperture_limit_condition, with the latter being defined as follows:

19. aperture_limit_condition

This category contains one digital parameter that merely specifies (YES|NO) whether or not an aperture limit was exceeded by the calculated value for the FILL_FLASH_APERTURE.

Step 620 is formed of the following routine expressed in high level functional programming terms:

```
INPUT: subject distance information
```

```
INPUT: flash specifications
INPUT: camera specifications
INPUT: lens specifications
OUTPUT: FILL_FLASH_APERTURE
OUTPUT: aperture_limit_condition
aperture_limit_condition = NO
FILL_FLASH_APERTURE = GUIDE_NUMBER /
                      PRIMARY_SUBJECT_DISTANCE
IF FILL_FLASH_APERTURE > MAXIMUM_APERTURE
  THEN: aperture_limit_condition = YES
  ENDIF
IF FILL_FLASH_APERTURE < MINIMUM_APERTURE
  THEN: aperture_limit_condition = YES
  ENDIF
```

Step 630 determines a value of the ratio between the intensities of the primary subject and background subject light levels that can be used to modify the lens aperture settings. This ratio specifies the lighting difference in the scene and the amount of exposure improvement, in terms of f-stops, that can be made. Fill flash exposures are used where the scene background (or distant primary subject) is brighter than the scene foreground (or near primary subject). In these situations, the light which is produced by the flash unit and falls on the foreground is significantly greater than that which falls on the background (as a function of the difference between the reciprocal of the squares of the corresponding subject-to-camera distances) and hence reduces the lighting contrast in the scene. Fill flash is not used where the primary subject is brighter than the background; otherwise, the primary subject will become excessively bright and the background will be excessively darkened. Step 630 is formed of the following routine expressed in high level functional programming terms:

```
INPUT: subject light levels
OUTPUT: LIGHTING_RATIO_FACTOR
LIGHTING_RATIO_FACTOR =
   √(BACKGROUND_SUBJECT_LIGHT_LEVEL /
     PRIMARY_SUBJECT_LIGHT_LEVEL)
```

Next, step 640 determines whether the calculated lens aperture value for fill flash will produce an improvement in the lighting ratio in the photographed image of the current scene. If an improvement will occur, then as described above, fill flash is used. If no such improvement will result, then ambient lighting, rather than fill flash, is used in producing an exposure of the current scene. In particular, step 640 utilizes the following categories of input parameters: camera specifications—specifically shutter type, FILL_FLASH_MAXIMUM_APERTURE, FILL_FLASH_MINIMUM_APERTURE, aperture_limit_condition, FILL_FLASH_APERTURE, LIGHTING_RATIO_FACTOR, and flash specifications—specifically energy_saving_flash and FILL_FLASH_COMPENSATION_FACTOR, as represented by lines 304, 424, 624 and 318. As represented by line 524, the output produced by step 640 is the fill_flash_improvement_condition parameter. Step 640 is formed of the following routine expressed in high level functional programming terms:

```
INPUT: FILL_FLASH_MAXIMUM_APERTURE
INPUT: FILL_FLASH_MINIMUM_APERTURE
INPUT: FILL_FLASH_APERTURE
INPUT: LIGHTING_RATIO_FACTOR
INPUT: flash specifications
INPUT: camera specifications
INPUT: aperture_limit_condition
OUTPUT: fill_flash_improvement_condition
IF (FILL_FLASH_APERTURE • LIGHTING_RATIO_FACTOR)
      > FILL_FLASH_MINIMUM_APERTURE
  THEN:
    IF (FILL_FLASH_APERTURE /
         (LIGHTING_RATIO_FACTOR •
         FILL_FLASH_COMPENSATION_FACTOR))
       < FILL_FLASH_MAXIMUM_APERTURE
      THEN: fill_flash_improvement_condition = YES
      ELSE: IF energy_saving_flash = YES
        THEN:
          fill_flash_improvement_condition
          = YES
        ENDIF
      ELSE: IF shutter type = PROGRAMMABLE
        THEN:
          fill_flash_improvement_condition
          = YES
        ENDIF
      ELSE: fill_flash_improvement_condition = NO
    ENDIF
  ELSE: fill_flash_improvement_condition = NO
  ENDIF
IF (aperture_limit_condition = YES) and
   (energy_saving_flash = NO)
  THEN: fill_flash_improvement_condition = NO
  ENDIF
```

As specifically indicated above, step 640 determines, through the first IF test, whether sufficient light is produced by the flash unit to reduce the lighting contrast for and properly expose primary subjects that are located at relatively far distances from the camera. If insufficient light exists to sufficiently reduce the contrast associated with these subjects, then use of fill flash will not noticeably improve image quality and should not be used. As such, the fill_flash_improvement_condition parameter will be set to "NO". Viewed in another way, if, due to the lighting contrasts in the scene, a shutter speed has been selected for use with fill flash which is faster than the maximum speed at which the shutter can be synchronized to the flash unit, i.e. the scene contains excessive contrast that can not be noticeably improved by fill flash, then fill flash can not be used. Now, if the contrast of distant primary subjects can be noticeably reduced, then step 640, using the second IF test, determines whether fill flash will impart an excessive amount of light onto those primary subjects located at relatively close distances from the camera which, in turn, will effectively reverse the lighting contrast in the photograph of the scene, i.e. these near subjects will become bright and the background dark, and adversely affect image quality. Accordingly, if the available light lies within a range that will provide a noticeable improvement in image quality, then the fill_flash_improvement_condition parameter is set to "YES" and fill flash will be used; otherwise, subject to two exceptions, fill flash will not be used. Specifically with respect to these exceptions, if excessive light exists, then fill flash can still be used, if an energy saving flash is available, by throttling down the energy used to fire the flash unit or, if a programmable shutter is available, by using a different shutter opening for the flash exposure than that used in ambient lighting. As such, once step 640 has been performed, a determination has been made that fill flash is or is not to be used. If fill flash is to be used, then the baseline exposure settings for fill flash need to be calculated.

FIG. 7 depicts an operational diagram of fill flash exposure calculation process 430. As discussed above, process 430 determines the baseline values of the exposure settings to photograph the current scene using fill flash. As shown, process 430 contains three primitive steps: reduction of fill flash power step 710, setting fill flash aperture step 720 and calculation of fill flash shutter speed step 730. Upon entry into process 430, step 710 is first performed. In the event an energy saving flash unit is being used and scene lighting contrast is such that a fill flash exposure at maximum flash power could produce a fill flash picture with a reversed contrast, step 710 determines the reduction in flash power that should be used to provide a proper fill flash exposure, i.e. a pleasing fill flash photographed image. This step utilizes the following inputs: fill_flash_condition, flash specifications—specifically energy_saving_flash and FILL_FLASH_COMPENSATION_FACTOR, and the fill flash parameters, as represented by lines 422, 318 and 424, to modify (update), as appropriate, the fill flash parameters based upon the amount of reduced flash power that is to be used. The values for the updated fill flash parameters and the POWER_CONDITION are provided, as represented by lines 714 and 354, as output from step 710. Step 710 is formed of the following routine expressed in high level functional programming terms:

---
INPUT: flash specifications
INPUT: FILL_FLASH_COMPENSATION_FACTOR
INPUT: fill_flash_condition
UPDATE: fill flash parameters
OUTPUT: POWER_CONDITION
IF fill_flash_condition = YES
 THEN: IF (FILL_FLASH_APERTURE /
    (LIGHTING_RATIO_FACTOR •
    FILL_FLASH_COMPENSATION_FACTOR)) >
    FILL_FLASH_MAXIMUM_APERTURE
 THEN:
    IF energy_saving_flash = YES
    THEN:
      POWER_CONDITION =
        (LIGHTING_RATIO_FACTOR •
        FILL_FLASH_COMPENSATION_FACTOR •
        FILL_FLASH_MAXIMUM_APERTURE /
        FILL_FLASH_APERTURE)$^2$
      FILL_FLASH_APERTURE =
        FILL_FLASH_MAXIMUM_APERTURE
    ENDIF
 ENDIF
ENDIF
---

Once the fill flash parameters have been updated by step 710 to reflect a reduction in flash power, step 720 is performed. This latter step sets the appropriate lens aperture setting, clipped by the aperture limits of the lens in use, in view of the reduction in flash power that is to be used for a fill flash exposure or the availability of a programmable shutter. This step utilizes the following inputs: fill flash parameters, FILL_FLASH_COMPENSATION_FACTOR, camera specifications—specifically shutter type, fill_flash_condition, and lens specifications—specifically aperture limits, as represented by lines 714, 318, 304, 422 and 314. Step 720 produces, as output: the F_NUMBER of the lens aperture that is to be used for a baseline fill flash exposure and applies this value to step 730, via line 724, and via line 434, to extra system speed calculation and use process 460 shown in FIG. 4. If a programmable lens aperture exists, then two different lens apertures can be used: one for flash and another for ambient lighting and the associated f-numbers therefor to capture a near primary subject would be different. Alternatively, if a conventional shutter is being used or a programmable shutter is in use but the primary subject is situated too far from the camera, then these two lens aperture settings would be the same. Specifically, step 720, shown in FIG. 7, is formed of the following routine expressed in high level functional programming terms:

---
INPUT: camera specifications
INPUT: fill flash parameters
INPUT: FILL_FLASH_COMPENSATION_FACTOR
INPUT: fill_flash_condition
INPUT: lens specifications
OUTPUT: F_NUMBER
OUTPUT: exposure settings
IF shutter type = PROGRAMMABLE
 THEN: IF (FILL_FLASH_APERTURE /
    (LIGHTING_RATIO_FACTOR •
    FILL_FLASH_COMPENSATION_FACTOR))
    > FILL_FLASH_MAXIMUM_APERTURE
  THEN: F_NUMBER =
      FILL_FLASH_MAXIMUM_APERTURE
      FLASH_F_NUMBER =
      FILL_FLASH_APERTURE
  ELSE: F_NUMBER = FILL_FLASH_APERTURE
      FLASH_F_NUMBER = FILL_FLASH_
      APERTURE
 ENDIF
ELSE: IF shutter type = CONVENTIONAL
  THEN: F_NUMBER = FILL_FLASH_APERTURE
      FLASH_F_NUMBER = FILL_FLASH_
      APERTURE
 ENDIF
ENDIF
IF F_NUMBER > MAXIMUM_F_NUMBER
 THEN: F_NUMBER = MAXIMUM_F_NUMBER
ENDIF
IF F_NUMBER < MINIMUM_F_NUMBER
 THEN: F_NUMBER = MINIMUM_F_NUMBER
ENDIF
IF FLASH_F_NUMBER > MAXIMUM_F_NUMBER
 THEN: FLASH_F_NUMBER = MAXIMUM_F_NUMBER
ENDIF
IF FLASH_F_NUMBER < MINIMUM_F_NUMBER
 THEN: FLASH_F_NUMBER = MINIMUM_F_NUMBER
ENDIF
---

Once the lens aperture has been appropriately set by step 720, step 730 is performed to calculate the shutter speed needed to properly expose the background in the current scene, thereby yielding the baseline fill flash exposure. This latter step utilizes the following inputs: camera specifications—specifically K_FACTOR, subject light levels—specifically BACKGROUND_LIGHT_LEVEL, FILM_SPEED, F_NUMBER, and fill_flash_condition, as represented by lines 304, 316, 310, 724 and 422. The output of step 730, as represented by line 434, is the latest exposure settings, specifically including the value for SHUTTER_SPEED. This step is formed of the following routine expressed in high level functional programming terms:

---
INPUT: camera specifications
INPUT: subject light levels
INPUT: FILM_SPEED
INPUT: fill_flash_condition
INPUT: F_NUMBER
OUTPUT: exposure settings
IF fill_flash_condition = YES
 THEN: SHUTTER_SPEED = (K_FACTOR • F_NUMBER$^2$)
    / (BACKGROUND_LIGHT_LEVEL • FILM_SPEED)

```
                        -continued
ENDIF
```

FIG. 8 depicts an operational diagram of full flash exposure determination process 450 shown in FIG. 4. Process 450, as discussed above, determines the baseline values of the exposure settings for full flash lighting. As shown, process 450 contains three steps —one of which is a primitive step: altering depth number focal length step 810, determining standard flash exposure step 820 and correcting flash exposure for background subject step 830. Upon entry into process 450, step 810 is first performed. This step merely adjusts the DEPTH_NUMBER for the actual focal length of the lens currently in use relative to the focal length at which the DEPTH_NUMBER was originally determined. Accordingly, step 810 utilizes two inputs: flash specifications—specifically depth number information, and lens specifications—specifically FOCAL_LENGTH, as represented by corresponding lines 318 and 314. The output from step 810 is the ADJUSTED_DEPTH_NUMBER, as represented by line 814. This step is formed of the following routine expressed in high level functional programming terms:

```
INPUT: lens specifications
INPUT: flash specifications
OUTPUT: ADJUSTED_DEPTH_NUMBER
ADJUSTED_DEPTH_NUMBER = DEPTH_NUMBER •
    (FOCAL_LENGTH / DEPTH_NUMBER_
    FOCAL_LENGTH)²
```

Once the value of the ADJUSTED_DEPTH_NUMBER has been calculated by step 810, step 820 is performed to first determine the lens aperture setting needed for a normal baseline full flash exposure. Wherever possible, the baseline full flash exposure provides matched depth-of-field and depth-of-illumination and at least an ISO normal exposure. Step 820 also increases the background exposure, to the extent realistically possible for the current scene being photographed, by varying this lens aperture setting—even if the background will not be in focus. This reduces the lighting contrast in the scene which advantageously prevents the near primary subject in the scene from becoming "washed out", i.e. over-exposed, by the flash and also provides an increased exposure tolerance during printing nd hence reduced printing failures. As represented by lines 304, 814, 316, 412, 310, 308, 318 and 314, step 820 utilizes the following inputs: camera specifications—specifically K_FACTOR and shutter type; ADJUSTED_DEPTH_NUMBER; subject light levels; full_flash_condition; FILM_SPEED; subject distance information; flash specifications—specifically AMBIENT_FILL_APERTURE, FLASH_SHUTTER_SPEED and GUIDE_NUMBER; and lens specification—specifically aperture limits. This step produces as output the values of: AMBIENT_APERTURE, FLASH_F_NUMBER, and exposure settings—specifically F_NUMBER and SHUTTER_SPEED, as represented by lines 828, 824 and 352, with the AMBIENT_APERTURE parameter being defined as follows.

20. AMBIENT_APERTURE

The value of this parameter specifies the setting of the lens aperture that is to be used to provide a remaining ambient exposure for a slow opening shutter.

Once an appropriate lens aperture setting has been calculated by step 820 to increase the background exposure, step 830 is performed to re-assess the depth-of-field requirements for the scene and appropriately change the lens aperture setting based upon the re-assessed, i.e. new, depth-of-field requirements. Specifically, as the background illumination increases in a flash exposure, the background becomes visually more apparent and hence increasingly more important to the overall image. This necessarily requires that the background be brought into sharp focus. As such, the scene requirements now dictate an increased depth-of-field to assure that the background comes into focus. In this regard, if a lens aperture setting was initially chosen to provide increased background illumination but at the expense of the background being out of focus, then, owing to the new depth-of-field requirements, that lens aperture setting must be changed to one that provides, to the extent realistically possible, increased depth-of-field. In performing these operations, step 830 utilizes, as represented by lines 824, 828, 318, 308, 332, 310, 316, 314, and 304, the following inputs: FLASH_F_NUMBER; AMBIENT_APERTURE; flash specifications—specifically FLASH_SHUTTER_SPEED, FLASH_FALL_OFF_LIMIT and GUIDE_NUMBER; subject distance information; ADJUSTED_BLUR_CIRCLE_CRITERIA; FILM_SPEED; subject light levels; lens specifications—specifically aperture limits and FOCAL_LENGTH; and camera specifications—specifically K_FACTOR. As represented by line 468, the output produced by step 830 is the FLASH_F_NUMBER parameter.

FIG. 9 depicts an operational diagram of standard flash exposure determination step 820 shown in FIG. 8. As discussed above, this step determines a lens aperture setting needed for a baseline full flash exposure, and, if realistically possible, increases the background exposure by varying the lens aperture setting. This step is formed of two separate primitive steps: determining aperture for normal exposure with full flash step 910 and setting remaining exposure for full flash step 920. Step 910 determines the appropriate lens aperture setting to yield the baseline exposure for full flash illumination. Specifically, if the output power of the flash unit, i.e. the value of the GUIDE_NUMBER, is more than that which is required by the scene, i.e. as specified by the value of the ADJUSTED_DEPTH_NUMBER, than the lens aperture setting (here the FLASH_F_NUMBER) is determined by this step using the value c? the ADJUSTED_DEPTH_NUMBER; otherwise, all the available flash power is used and the lens aperture is based upon the value of the GUIDE_NUMBER. The lens aperture value is clipped, if necessary, by the aperture limits. As represented by lines 814, 314, 308, 318 and 412, step 910 utilizes as input: ADJUSTED_DEPTH_NUMBER; lens specifications—specifically aperture limits; subject distance information; flash specifications—specifically GUIDE_NUMBER; and the full_flash_condition. The output produced by this step is the FLASH_F_NUMBER, as represented by lines 824 and 914. Step 910 is formed of the following routine expressed in high level functional programming terms:

```
INPUT: ADJUSTED_DEPTH_NUMBER
INPUT: flash specifications
INPUT: subject distance information
INPUT: lens specifications
INPUT: full_flash_condition
OUTPUT: FLASH_F_NUMBER
IF full_flash_condition = YES
   THEN:
      IF GUIDE_NUMBER > ADJUSTED_DEPTH_
      NUMBER
         THEN:
            FLASH_F_NUMBER = ADJUSTED_DEPTH_
            NUMBER
            / PRIMARY_SUBJECT_DISTANCE
         ELSE:
            FLASH_F_NUMBER = GUIDE_NUMBER
            / PRIMARY_SUBJECT_DISTANCE
      ENDIF
      IF FLASH_F_NUMBER < MAXIMUM_APERTURE
      THEN: FLASH_F_NUMBER = MAXIMUM_
      APERTURE
      ELSE: IF FLASH_F_NUMBER > MINIMUM_
      APERTURE
            THEN: FLASH_F_NUMBER =
               MINIMUM_APERTURE
            ENDIF
      ENDIF
ENDIF
```

Once the baseline lens aperture setting (here FLASH_F_NUMBER) for a full flash exposure is determined through step 910, then step 920 is performed to appropriately vary the lens aperture setting to provide background fill. Specifically, if a programmable shutter is available, then a different lens aperture setting is used for the ambient aperture in order to provide ambient fill; otherwise, the ambient aperture is the same as the lens aperture setting selected for use with full flash illumination. As represented by lines 914, 316, 310, 304 and 318, step 920 utilizes the following inputs: FLASH_F_NUMBER; subject light levels, FILM_SPEED, camera specifications—specifically K_FACTOR and shutter type; and flash specifications—specifically AMBIENT_FILL_APERTURE and FLASH_SHUTTER_SPEED. As output, step 920 produces, as represented by lines 828 and 352: AMBIENT_APERTURE, and exposure settings—specifically F_NUMBER and SHUTTER_SPEED. Step 920 is formed of the following routine expressed in high level functional programming terms:

```
INPUT: camera specifications
INPUT: flash specifications
INPUT: FLASH_F_NUMBER
INPUT: FILM_SPEED
INPUT: subject light levels
OUTPUT: AMBIENT_APERTURE
OUTPUT: F_NUMBER
OUTPUT: SHUTTER_SPEED
IF shutter type = PROGRAMMABLE
   THEN:
      SHUTTER_SPEED = FLASH_SHUTTER_SPEED
      AMBIENT_APERTURE √((FLASH_SHUTTER_
      SPEED
         • FILM_SPEED • BACKGROUND_LIGHT_
         LEVEL)
         / K_FACTOR)
      IF_AMBIENT_APERTURE < AMBIENT_FILL_
      APERTURE
         THEN: AMBIENT_APERTURE =
            AMBIENT_FILL_APERTURE
         ENDIF
      F_NUMBER = AMBIENT_FILL_APERTURE
   ELSE:
      SHUTTER_SPEED = FLASH_SHUTTER_SPEED
      AMBIENT_APERTURE = FLASH_F_NUMBER
      F_NUMBER = FLASH_F_NUMBER
ENDIF
```

FIG. 10 depicts an operational diagram of background subject flash exposure correction step 830 shown in FIG. 8. As discussed above, this step is used in full flash exposures after the baseline lens aperture setting has been adjusted to provide background fill, to re-assess the depth-of-field requirements of the scene and appropriately adjust the lens aperture setting in an effort to achieve the required depth-of-field. This step, as shown in FIG. 10, is formed of three primitive steps: calculating log E differences between primary and background subjects step 1010, determining depth-of-field for flash step 1020 and adjusting flash exposure step 1030.

Step 1010 calculates the difference in exposure, in terms of log E, between the primary subject and the background exposures of the scene as they would result from the flash and ambient fill illumination. To do so, step 1010 first determines the value of parameter FLASH_LOG_E_DIFFERENCE, which we define as the log E exposure difference between the primary subject and background attributable solely to flash fall-off. Next, the value of parameter AMBIENT_LOG_E_DIFFERENCE is determined. We define the AMBIENT_LOG_E_DIFFERENCE parameter to be the difference in the lighting levels between that of the primary subject and the background attributable to an ambient fill. Thereafter, a lens aperture setting, in terms of f-number, i.e. NORMAL_EXP_F_NUMBER, is determined for an ambient fill exposure to yield a baseline non-flash exposure (typically a ISO normal) value. Given this lens aperture setting and the AMBIENT_APERTURE setting, the amount of fill flash, i.e. the value of parameter AMBIENT_FILL_LOG_E_DIFFERENCE, is determined. With these exposure differences, step 1010 then determines the overall lighting difference between the primary and background subjects. As represented by lines 310, 318, 304, 316, 308, 824 and 828, the inputs applied to step 1010 are: FILM_SPEED; flash specifications—specifically FLASH_SHUTTER_SPEED; camera specifications—K_FACTOR; subject light levels; subject distance information; FLASH_F_NUMBER; and AMBIENT_APERTURE. The output parameter produced by step 1010, as represented by line 1014, is OVERALL_LOG_E_DIFFERENCE, which we define as follows.

21. OVERALL_LOG_E_DIFFERENCE

The value of this parameter is the total overall lighting difference, measured in terms of log E, between the primary subject and the background.

Step 1010 is formed of the following routine expressed in high level functional programming terms:

```
INPUT: subject light levels
INPUT: subject distance information
INPUT: FLASH_F_NUMBER
INPUT: AMBIENT_APERTURE
INPUT: flash specifications
INPUT: FILM_SPEED
INPUT: camera specifications
OUTPUT: OVERALL_LOG_E_DIFFERENCE
FLASH_LOG_E_DIFFERENCE =
```

-continued

```
        log[(PRIMARY_SUBJECT_DISTANCE
                / BACKGROUND_SUBJECT_DISTANCE)²]
AMBIENT_LOG_E_DIFFERENCE =
        log(BACKGROUND_SUBJECT_LIGHT_LEVEL
                / PRIMARY_SUBJECT_LIGHT_LEVEL)
NORMAL_EXP_F_NUMBER = √((FLASH_SHUTTER_
SPEED •
        FILM_SPEED • PRIMARY_LIGHT_LEVEL) /
                (K_FACTOR))
AMBIENT_FILL_LOG_E_DIFFERENCE =
        log[(NORMAL_EXP_F_NUMBER /
                AMBIENT_APERTURE)²]
OVERALL_LOG_E_DIFFERENCE =
        AMBIENT_LOG_E_DIFFERENCE +
        log(EXP(FLASH_LOG_E_DIFFERENCE) +
EXP(AMBIENT_FILL_LOG_E_DIFFERENCE)).
```

Step 1020 calculates the depth-of-field that is required in full flash situations to meet the scene requirements where background fill is to occur. Specifically, as shown by lines 332, 314 and 308, this step utilizes as input: ADJUSTED_BLUR_CIRCLE_CRITERIA; lens specifications—specifically the FOCAL_LENGTH; and subject distance information. The output provided by step 1020, as represented by line 1024, is a DEPTH_OF_FIELD_APERTURE parameter, which we define as:

22. DEPTH_OF_FIELD_APERTURE

The value of this parameter is the lens aperture setting that is necessary to meet the depth-of-field requirements in the scene.

Step 1020 is formed of the following routine expressed in high level functional programming terms:

```
INPUT: subject distance information
INPUT: lens specifications
INPUT: ADJUSTED_BLUR_CIRCLE_CRITERIA
OUTPUT: DEPTH_OF_FIELD_APERTURE
DEPTH_OF_FIELD_APERTURE =
        [BACKGROUND_SUBJECT_DISTANCE •
        FOCAL_LENGTH²
                - PRIMARY_SUBJECT_DISTANCE •
                FOCAL_LENGTH²]
        / [ADJUSTED_BLUR_CIRCLE_CRITERIA • 25.4
                • PRIMARY_SUBJECT_DISTANCE
                • BACKGROUND_SUBJECT_
                DISTANCE • 304.8]
```

Given the required depth-of-field calculated by step 1020 for the current scene being photographed and the resulting overall primary subject to background exposure difference as determined by step 1010, step is then performed to appropriately adjust the lens aperture setting for use with a full flash in an attempt to meet this depth-of-field requirement. In essence, if the background will possess an exposure level that is greater than the flash fall-off limit, then the depth-of-field is increased, up to the limits of the available output power of the flash, to meet the scene requirements. Specifically, step 1030 first determines whether the background will still be significantly darker, in view of the flash fall-off, than the primary subject. If it is darker, then the calculated lens aperture value is not changed from its prior value determined in step 1010 for full flash illumination. Alternatively, if the exposure difference is less than the flash fall-off limit, then a test is made to determine whether sufficient flash power exists to meet the depth-of-field requirements in the scene. If sufficient power exists, then the flash aperture value (i.e. the lens aperture setting used for flash exposure) is accordingly changed to a value that satisfies the depth-of-field requirements of the scene. If insufficient flash power exists, the lens aperture value is calculated to be that which utilizes all the available power even though the resulting increase in depth-of-field provided by the calculated lens aperture value is insufficient to fully satisfy the scene requirements. Appropriate checks are then made of the resulting lens aperture value against the physical maximum and minimum limits of the lens aperture, with the calculated lens aperture being set to a corresponding limit value, if necessary. As represented by lines 318, 1014, 1024, 308 and 314, step 1030 utilizes the following as input: flash specifications—FLASH_FALL_OFF_LIMIT and GUIDE_NUMBER; OVERALL_LOG_E_DIFFERENCE; DEPTH_OF_FIELD_APERTURE; subject distance information; and lens specifications—specifically aperture limits. The output from step 1030 is the latest value of the FLASH_F_NUMBER, as represented by line 468. Step 1030 is formed of the following routine expressed in high level functional programming terms:

```
INPUT: OVERALL_LOG_E_DIFFERENCE
INPUT: flash specifications
INPUT: GUIDE_NUMBER
INPUT: DEPTH_OF_FIELD_APERTURE
INPUT: subject distance information
INPUT: lens specifications
OUTPUT: FLASH_F_NUMBER
IF OVERALL_LOG_E_DIFFERENCE < -
                FLASH_FALL_OFF_LIMIT
    THEN: FLASH_F_NUMBER = FLASH_F_NUMBER
    ELSE:
            IF (DEPTH_OF_FIELD_APERTURE •
                    PRIMARY_SUBJECT_DISTANCE) <
                    GUIDE_NUMBER
                THEN: FLASH_F_NUMBER =
                        DEPTH_OF_FIELD_APERTURE
                ENDIF
            ELSE: FLASH_F_NUMBER = GUIDE_NUMBER
                        / PRIMARY_SUBJECT_DISTANCE
    ENDIF
IF FLASH_F_NUMBER < MINIMUM_F_NUMBER
    THEN: FLASH_F_NUMBER = MINIMUM_F_NUMBER
    ELSE:
            IF FLASH_F_NUMBER > MAXIMUM_F_
                    NUMBER
                THEN: FLASH_F_NUMBER = MAXIMUM_F_
                        NUMBER
            ENDIF
ENDIF
```

Now, at this point in exposure determination process 350 as shown in FIG. 4, process 410, and either process 450 or process 420 and either process 430 or 440 have been fully performed. As such, the appropriate lighting has been selected, i.e. ambient illumination, fill or full flash illumination, and proper baseline exposure settings and flash parameters have been determined for the current scene. Furthermore, where full flash illumination is being used, as fully described above, these baseline exposure settings include variations, where necessary, from the ISO standard exposure values in order to meet the depth-of-field requirements of the scene. Given these baseline exposure values, process 460 is now performed. This particular process, as noted above: (a) determines, based in part upon scene requirements and the selected display size and focal length photographing mode, whether and how much extra system speed exists in the current photographic situation, (b) specifies a prioritized incremental manner through which the extra system speed can best be used to improve the quality of the resulting photographed image beyond that obtainable through the base-line exposure settings, and then (c) modifies the previously determined base-line exposure settings and output flash parameters using this manner in order to utilize as much as possible of the extra system speed in improving the quality of the photographed image, particularly for the selected display size and focal length photographing mode, beyond that obtainable by the ISO normal exposure settings.

A high level operational diagram of extra system speed calculation and usage process 460 is shown in FIG. 11. As shown, this process is formed of three high level steps, only one of which is performed in any given photographic situation based upon the selected scene lighting. In this regard, process 460 contains extra speed ambient step 1110 which is performed if ambient lighting has been selected, extra speed fill flash step 1120 which is performed if fill flash has been selected, and extra speed full flash step 1130 which is performed if full flash has been selected. Though the input values applied to each of these steps varies based upon the specific step, each of these steps produces updated output values for the appropriate exposure settings—i.e. SHUTTER_SPEED, and/or F_NUMBER and where appropriate FLASH_F_NUMBER.

Extra speed ambient step 1110 utilizes, as represented by lines 312, 306, 308, 412, 434, 422, 334, 332, 314, 332 and 304, the following as input: shake information; film quality vs. exposure; subject distance information; full_flash_condition; exposure settings—specifically F_NUMBER and SHUTTER_SPEED; fill_flash_condition; ADJUSTED_FOCAL_LENGTH_FACTOR; ADJUSTED_BLUR_CIRCLE_CRITERIA; lens specifications—specifically FOCAL_LENGTH and aperture limits; and camera specifications—specifically shutter speed limits. As discussed below in detail in conjunction with FIG. 12, this step updates the flash_condition, as represented by line 356, as "NO", where appropriate, determines whether extra system speed exists in an ambient lighting situation and appropriately varies the exposure settings, as represented by line 352 and specifically (though not shown) SHUTTER_SPEED and F_NUMBER, to consume as much of that extra system speed as possible in an effort to improve resulting image quality.

Extra speed fill flash step 1120 utilizes, as represented by lines 304, 334, 422, 314, 434 and 306, the following as input: camera specifications—specifically shutter speed limits; ADJUSTED_FOCAL_LENGTH_FACTOR; fill_flash_condition; lens specifications—specifically FOCAL_LENGTH; exposure settings and film quality vs. exposure. As discussed below in detail in conjunction with FIG. 13, this step updates the flash_condition, as represented by line 356, as "YES", determines whether extra system speed exists in a fill flash lighting situation and appropriately varies the exposure settings, as represented by line 352 and specifically SHUTTER_SPEED, to consume as much of that extra system speed as possible in an effort to improve resulting image quality.

Extra speed full flash step 1130 utilizes, as represented by lines 308, 412, 318, 458, 304, 320, 306 and 314, the following as input: subject distance information; full_flash_condition; flash specifications—specifically energy_saving_flash and spread bounce information; FLASH_F_NUMBER; camera specifications—specifically shutter type; RECYCLE_MODE; film quality vs. exposure; and lens specifications—specifically aperture limits. As discussed below in detail in conjunction with FIG. 12, this step updates the flash_condition, as represented by line 356, as "YES", determines whether extra system speed exists in a full flash lighting situation and appropriately varies the exposure settings, as represented by line 352 and specifically FLASH_F_NUMBER and F_NUMBER, and flash parameters, as represented by lines 354 and 358 and specifically POWER_CONDITION and spread_bounce_condition, to consume as much of that extra system speed as possible in an effort to improve resulting image quality. If extra system speed still remains, it is then consumed, after accounting for that which was implicitly consumed in intentional over-exposure of the film, by reducing the lens aperture (here FLASH_F_NUMBER) setting to impart additional depth-of-field to the resulting image.

Figure 12:
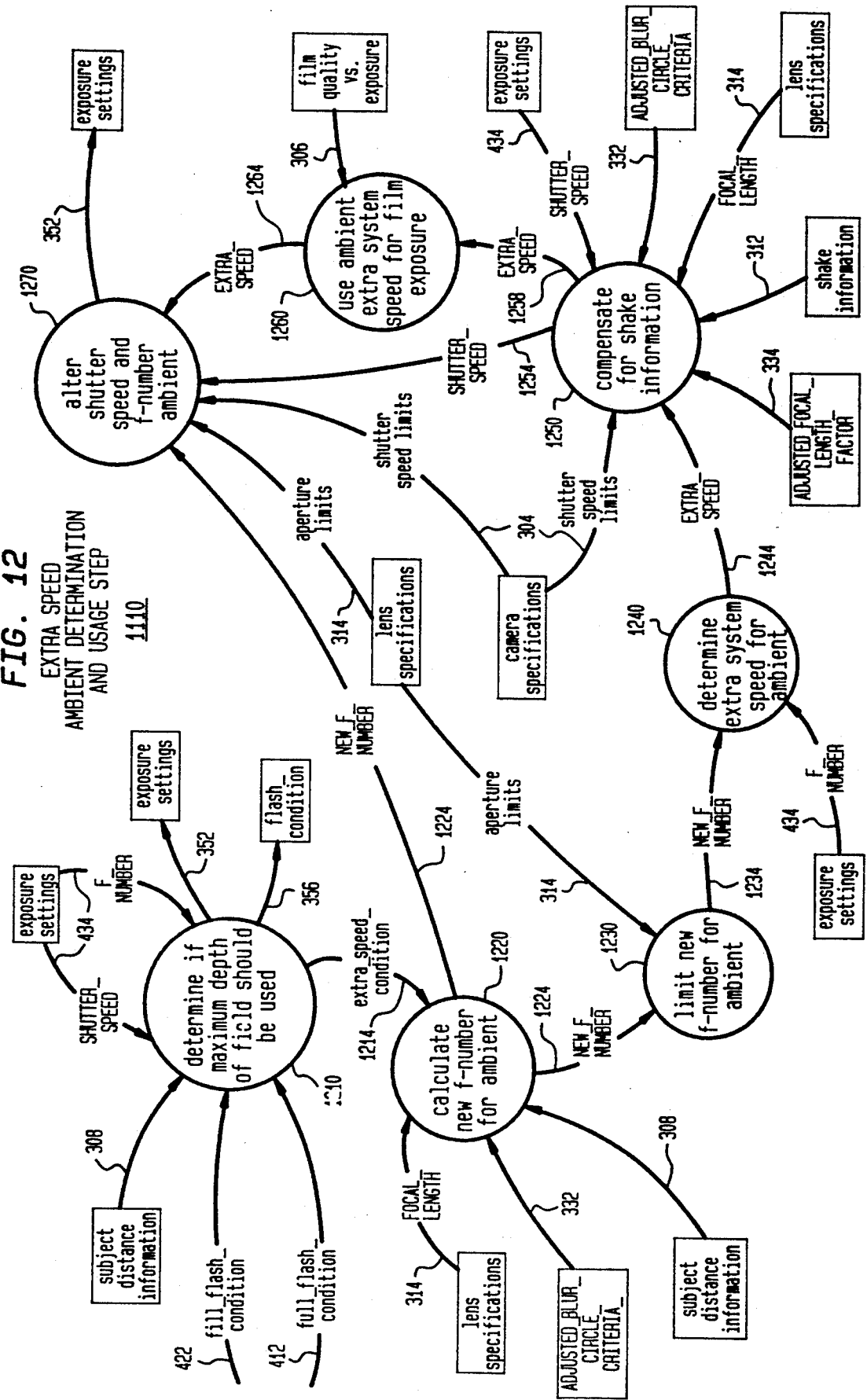
FIG. 12 depicts an operational diagram of extra speed ambient determination and usage step 1110 shown in FIG. 11.

An operational diagram of extra speed ambient determination and usage step 1110 is shown in FIG. 12. As shown, this step consists of seven primitive steps, all of which are performed to determine whether extra system speed exists in an ambient lighting situation and how that extra system speed, to the extent any exists, can best be used to vary the exposure settings and improve image quality. These seven steps include: determining if maximum depth-of-field should be used step 1210, calculating new f-number for ambient lighting step 1220, limiting the new ambient f-number step 1230, determining the amount of extra speed in ambient lighting step 140, compensating for shake information step 1250, using the extra speed for film exposure step 1260, and altering the shutter speed and f-number for use in ambient lighting step 1270.

Upon entry into step 1110, step 1210 is first performed. This step determines if the background subject is at a so-called "infinite" distance from the camera and, if so and to provide the largest possible depth-of-field, sets the value of the lens aperture to that which was previously selected as a baseline setting; otherwise, this step recognizes that an extra system speed condition may exist inasmuch as a larger lens aperture setting that provides less depth-of-field than the baseline lens aperture setting could be used instead. Specifically, up to now, for ambient lighting, a baseline shutter speed was selected, through process 440 (see FIG. 4 which was discussed in detail above), to be the slowest shutter speed that reduces camera shake. Given this shutter speed, a baseline lens aperture size was chosen, again through process 440, as that which provides a baseline (e.g. ISO normal) exposure. The baseline lens aperture setting was selected without any regard to the actual depth-of-field requirements of the current scene. Now, if the scene contains a rather thick subject, having a portion located at so-called "infinity", then a large depth-of-field will be required to sharply capture the entire subject. In this case, the value for the lens aperture will simply be set, through step 1210 shown in FIG. 12, to its baseline value inasmuch as this value, which is the smallest aperture setting that can be used to yield a baseline exposure of the current scene, will impart the largest available depth-of-field to the photographed image of this scene. No extra system speed will exist in this case. Alternatively, if the subject is thin, i.e. located closer to the camera than "infinity", then a large depth-of-field may not be necessary. Hence, a larger lens aperture setting, which provides less depth-of-field, than the baseline lens aperture value could be used instead. As such, extra system speed may exist in this situation and, if it exists, could be used in other ways to improve image quality than by merely setting the lens aperture at its baseline value which would provide excessive and unnecessary depth-of-field for the current scene. As such, an extra speed condition will exist. Alternatively, if either a fill or full flash is to be used in lieu of ambient lighting, then execution of step 1210 merely terminates through the first IF statement without, for example, having set the lens aperture to its baseline value that provides maximal depth-of-field. Specifically, step 1210 utilizes, as represented by lines 434, 308, 422 and 412, the following as input: exposure settings—specifically SHUTTER_SPEED and F_NUMBER, subject distance information; fill_flash_condition; and full_flash_condition. As represented by lines 352, 356 and 1214, step 1210 updates and provides the latest values for the exposure settings as output parameters along with the flash_condition and extra_speed_condition; this last category being defined as follows:

23. extra_speed_condition

This category contains one digital parameter that merely specifies (YES|NO) whether or not extra system speed exists.

Step 1210 is formed of the following routine expressed in high level functional programming terms:

```
INPUT: subject distance information
INPUT: fill_flash_condition
INPUT: full_flash_condition
INPUT: exposure settings
UPDATE: exposure settings
UPDATE: flash_condition
OUTPUT: extra_speed_condition
IF (fill_flash_condition = NO) AND
   (full_flash_condition = NO)
THEN: flash_condition = NO
   IF BACKGROUND_SUBJECT_DISTANCE = infinity
   THEN: SHUTTER_SPEED = SHUTTER_SPEED
      F_NUMBER = F_NUMBER
      extra_speed_condition = NO
   ELSE: extra_speed_condition = YES
   ENDIF
ENDIF
```

If an extra speed condition exists, then, as indicated by line 1214, step 1220 is performed. This step calculates a lens aperture setting that meets the actual non-infinite depth-of-field required to sharply capture both the primary and background subjects in the current scene, thereby satisfying the scene requirements. Specifically, as represented by lines 1214, 314, 332 and 308, step 1220 utilizes the following as input: extra_speed_condition, lens specifications—specifically FOCAL_LENGTH ADJUSTED_BLUR_CIRCLE_CRITERIA and subject distance information. As represented by lines 1224, step 1220 produces a new value, i.e. NEW_F_NUMBER, for the lens aperture setting that meets the required depth-of-field in the scene. This step is formed of the following routine expressed in high level functional programming terms:

```
INPUT: extra_speed_condition
INPUT: ADJUSTED_BLUR_CIRCLE_CRITERIA
INPUT: subject distance information
INPUT: lens specifications
OUTPUT: NEW_F_NUMBER
IF extra_speed_condition = YES
   THEN:
      NEW_F_NUMBER =
         [BACKGROUND_SUBJECT_DISTANCE •
         FOCAL_LENGTH²
         − PRIMARY_SUBJECT_DISTANCE • FOCAL_
         LENGTH²]
         / [ADJUSTED_BLUR_CIRCLE_CRITERIA • 25.4
         • PRIMARY_SUBJECT_DISTANCE
         • BACKGROUND_SUBJECT_DISTANCE • 304.8]
ENDIF
```

Once the new lens aperture setting is determined, then step 1230 is performed to check the new lens aperture setting against the physical limits of the lens aperture and, if necessary, clip the new lens aperture value to an appropriate limit value. Step 1230 merely utilizes, as represented by lines 1224 and 314, as input: the NEW_F_NUMBER and the lens specifications—specifically aperture limits. An updated NEW_F_NUMBER is provided as an output value by this step, as represented by line 1234. Step 1230 is formed of the following routine expressed in high level functional programming terms:

```
INPUT: lens specifications
UPDATE: NEW_F_NUMBER
IF NEW_F_NUMBER < MINIMUM_F_NUMBER
   THEN: NEW_F_NUMBER = MINIMUM_F_NUMBER
   ELSE: IF NEW_F_NUMBER > MAXIMUM_F_NUMBER
      THEN: NEW_F_NUMBER = MAXIMUM_F_
         NUMBER
      ENDIF
ENDIF
```

Next, step 1240 is performed to determine the amount of extra system speed that initially exists in the current ambient lighting situation. The extra system speed is calculated, in numerical log exposure terms, as the ratio between the baseline lens aperture value to the new lens aperture setting, i.e. NEW_F_NUMBER, that meets the scene depth-of-field requirement. If extra system speed does exist, then the lens aperture is set to the value of NEW_F_NUMBER which provides a depth-of-field which meets the scene requirements. This, in turn, permits the available extra system speed to be utilized in other ways rather than wasting it on providing unnecessary additional depth-of-field over that needed in the scene; the additional depth-of-field will not noticeably improve image quality, if at all. Specifically, the amount of extra speed is calculated from the speed difference, in logarithmic terms, between the values of the NEW_F_NUMBER and the baseline value for F_NUMBER. As represented by lines 1234 and 434, step 1240 merely utilizes the following inputs: NEW_F_NUMBER and F_NUMBER. As represented by line 1244, step 1240 provides the amount of available extra system speed, EXTRA_SPEED, as an output value. Step 1240 is formed of the following routine expressed in high level functional programming terms:

```
INPUT: NEW_F_NUMBER
INPUT: F_NUMBER
OUTPUT: EXTRA_SPEED
EXTRA_SPEED = 2 • LOG(F_NUMBER / NEW_F_
   NUMBER)
IF EXTRA_SPEED > 0
   THEN: F_NUMBER = NEW_F_NUMBER
   ENDIF
```

Once the amount of extra system speed that is initially available has been provided by step 1240, step 1250 is performed to determine if a faster shutter speed than the corresponding baseline value can be chosen in order to provide increased compensation for camera shake and hence improved image quality. Increased shake compensation is the first and, as we see it, the most important manner through which available extra system speed can be consumed in an ambient lighting situation; using all, or at least a portion of the available, extra speed in this manner takes priority over using available extra system speed to decrease the lens aperture to provide increased depth-of-field. Even though a baseline shutter speed was previously selected, in the manner set forth above, to reduce camera shake, this speed is based on an empirical rule that may be violated by a photographer that has a particularly unsteady hand. Camera shake, to the extent it is noticeable on a photographed image, will ruin that entire image.

The amount through which the shutter speed is increased to provide additional shake compensation is determined by the amount of available extra system speed and the actual measured shake information. Specifically, a new shutter speed, i.e. NEEDED_SHUTTER_SPEED, that is sufficient to compensate for actually occurring camera shake, is determined based upon the ratio of the allowable fraction of the adjusted blur circle criteria attributable to camera shake, i.e. STANDARD_SHAKE_FRACTION, and the actual measured real-time camera shake, i.e. BLUR_FROM_SHAKE. The resulting baseline and new shutter speeds are then compared. If the new shutter speed is faster than the baseline shutter speed, then the shutter speed is set to the new shutter speed. In addition, the available amount of extra system speed is then appropriately reduced by the amount of extra system speed that is needed for utilizing a faster shutter speed. However, as a check, if the remaining amount of extra system speed is negative, then more extra system speed was utilized than is available. Hence, the new shutter speed is set to whatever shutter speed reduces the available extra system speed to zero. Alternatively, if the baseline shutter speed is faster than the new shutter speed—such as would result if the camera happened to be mounted on a tripod and essentially no camera shake was actually measured—then the shutter speed remains at the baseline value, and the amount of available extra system speed is not reduced. The resulting shutter speed is then compared against a physical limit value, i.e. MINIMUM_SHUTTER_SPEED, for the fastest shutter speed that can be used and, if necessary, clipped to that limit value with the available extra system speed then being re-calculated using that limit value. Depending upon the initial amount of available extra system speed and the amount consumed by varying the actual shutter speed, a positive non-zero amount of extra system speed may remain for subsequent use, as described below, in photographing the current scene. Specifically, step 1250 utilizes, as represented by lines 304, 1244, 334, 312, 314, 332 and 434, the following as input: camera specifications—specifically shutter speed limits, EXTRA_SPEED, ADJUSTED_FOCAL_LENGTH_FACTOR, shake information, lens specifications—specifically FOCAL_LENGTH, ADJUSTED_BLUR_CIRCLE_CRITERIA and exposure settings—specifically SHUTTER_SPEED. Step 1250 produces, as represented by lines 1254 and 1258, updated values of SHUTTER_SPEED and EXTRA_SPEED. Step 1250 is formed of the following routine expressed in high level functional programming terms:

---

INPUT: shake information
INPUT: ADJUSTED_FOCAL_LENGTH_FACTOR
INPUT: lens specifications
INPUT: ADJUSTED_BLUR_CIRCLE_CRITERIA
INPUT: camera specifications
UPDATE: EXTRA_SPEED
UPDATE: SHUTTER_SPEED
FRACTION_SHAKE_BLUR = BLUR_FROM_SHAKE
    / ADJUSTED_BLUR_CIRCLE_CRITERIA
NEEDED_SHUTTER_SPEED = (STANDARD_SHAKE_FRACTION
    / FRACTION_SHAKE_BLUR) •
    (1/FOCAL_LENGTH)
    • (ADJUSTED_FOCAL_LENGTH_FACTOR)
IF NEEDED_SHUTTER_SPEED < SHUTTER_SPEED
  THEN: EXTRA_SPEED = EXTRA_SPEED
    - log(SHUTTER_SPEED /
      NEEDED_SHUTTER_SPEED)
    IF EXTRA_SPEED < 0
      THEN: SHUTTER_SPEED = NEEDED_SHUTTER_SPEED
        / ($10^{EXTRA\_SPEED}$)
      EXTRA_SPEED = 0
    ELSE: SHUTTER_SPEED = NEEDED_SHUTTER_SPEED
    ENDIF
ENDIF
IF SHUTTER_SPEED < MINIMUM_SHUTTER_SPEED
  THEN: EXTRA_SPEED = log(MINIMUM_SHUTTER_SPEED
    / SHUTTER_SPEED)
  SHUTTER_SPEED = MINIMUM_SHUTTER_SPEED
ENDIF

---

At this point, a lens aperture has been selected to meet the depth-of-field requirements in the scene. Also, a shutter speed has been chosen that reduces actual camera shake. If extra system speed still remains, step 1260 is performed to account for the extra system speed that was implicitly consumed in having varied the exposure of the specific film in use, based upon the film quality vs. exposure characteristic of the specific film, by intentional over- or under-exposure from the ISO-/ANSI exposure standards. As will be discussed below, the variation comes about from the prior selection of a combination of shutter speed and lens aperture settings that meets the current scene requirements. The amount of extra system speed that is consumed in this step depends upon the specific exposure characteristic of the film. Step 1260 utilizes, as represented by lines 306 and 1258, two inputs: film quality vs. exposure information (specifically tables of pre-defined values) and EXTRA_SPEED. The output produced by this step, as represented by line 1264, is an updated amount of EXTRA_SPEED that still exists. Our inventive process can function with any one of a number of different types of film. As noted above, film type information is read by the camera microcomputer through the "DX" contacts from the film canister. The type information would then be used within step 1260 and similar steps, e.g. steps 1320 and 1440 (as discussed in detail below) to select a particular table of film quality vs. exposure values which applies to the specific type of film currently in use from the different tables stored within ROM 255 (see FIG. 2). Nevertheless, to simplify the following discussion, the camera will hereinafter be assumed to function with only one type of film thereby requiring only one table of film quality vs. exposure values to be stored within ROM 255 and eliminating the need within steps 1260, 1320 and 1440 to select one of a number of different tables based upon film type. With this simplification in mind, step 1260, shown in FIG. 12, is formed of the following routine expressed in high level functional programming terms, with the following film quality vs. exposure table being merely illustrative:

```
INPUT: film quality vs. exposure
UPDATE: EXTRA_SPEED
DEFINE TABLE:
EXTRA_SPEED IN         EXTRA_SPEED OUT
     −4.00                  −3.85
     −0.30                  −0.15
     −0.15                  −0.00
      0.00                   0.00
      0.30                   0.00
      0.60                   0.00
      0.90                   0.30
      1.20                   0.60
      5.00                   4.40
EXTRA_SPEED = TABLE (EXTRA_SPEED)
```

The table contents are linearly interpolated to determine the output values for EXTRA_SPEED given input values intermediate to those shown immediately above.

In understanding the use and meaning of this table, note that once the shutter speed and lens aperture size settings are chosen to meet the scene requirements for the specific film characterized by the table, these settings for the specific film type will cause an intentional two-stop over-exposure of the film from the ISO normal exposure values; this amount of over-exposure is typical of color negative print films. Quality improves, for the specific film defined in the table above, within a range of +2 stops above the ISO normal exposure point. The specific film defined in the table exhibits improved quality with increases in exposure above the ISO normal exposure point. It is possible to design a film that exhibits an even more dramatic quality improvement with over-exposure than that embodied in the table immediately above. Likewise, it is possible to design a film that has a quality vs. exposure profile that is nearly flat over a useful exposure range. Therefore, it is desirable to include the characteristics of the specific film in use in the corresponding quality vs. exposure table that will be used by our inventive process. Accordingly, a different quality vs. exposure table should be stored in the camera microcomputer system for each different corresponding film type that could be used in conjunction with our inventive process in that camera. In this regard, information regarding the exposure latitude of a given film can be automatically obtained in a number of ways, e.g. from a bar code (i.e. a so-called "magazine bar code") situated on the film canister or through information encoded into areas 11 and 12 in the DX contacts also situated on the canister. Consequently, this information (such as areas 11 and 12) would be read by the camera microcomputer and then used to select one of a number of different stored quality vs. exposure tables that is most appropriate to the film then in use. For further details regarding canister-based encoding of exposure information, the reader should refer to: "American National Standard for Photography for 135 Film Size Magazines and Film for 135 Still Picture Cameras" ANSI standard PH 1.14M-1983.

If the extra system speed that exists immediately prior to performing step 1260 lies within a range of +2 stops to −0.5 stop, then this extra system speed has already been incorporated into the lens aperture and shutter speed settings and will manifest itself through a pre-defined amount of intentional over-exposure that will be inherently produced by these settings. Thus, no extra system speed remains. Alternatively, if the available extra system speed is greater than, for example, +2 stops (or expressed in logarithmic exposure terms as 0.6), then the remaining extra system speed which exceeds the extra system speed that has already been effectively incorporated into the lens aperture and shutter speed settings which meets the scene requirements (e.g. as shown in the table 0.3 if the available extra system speed is 0.9 and so on) is then supplied to step 1270 to further alter the shutter speed and/or lens aperture settings in an effort to further improve image quality. For this specific type of print film, image quality can only be improved by a +2 stop over-exposure since any further increases in film exposure would adversely increase image density and complicate the process of subsequently printing an image from the film negative.

Now, at this point, an appropriate lens aperture has been calculated that matches the depth-of-field requirements of the scene and a shutter speed has been selected that reduces the actual measured camera shake, while providing a measure of intentional over- or under-exposure of the film that optimally improves image quality. If, as discussed immediately above, remaining extra system speed still exists, then, step 1270 is performed to utilize all the remaining extra system speed in an attempt, to the extent possible, to further improve image quality. In this regard, rather than consuming the available extra system speed in further increasing the over-exposure of the image beyond two stops which, at this level of exposure, would tend to degrade image quality, step 1270 uses the available extra system speed to further decrease the numerical value of the shutter speed parameter, SHUTTER_SPEED, (i.e. to select a faster shutter speed which decreases the time during which the shutter is open) and/or to further decrease the size of the lens aperture, i.e. increase the numerical value of the F_NUMBER parameter. Decreasing the shutter speed in this fashion provides further compensation against camera shake; decreasing the size of the lens aperture imparts additional depth-of-field beyond that required by the scene to its photographed image. As will be seen, the changes made by step 1270 to the shutter speed and lens aperture settings are limited by the physical limits of respectively the shutter and aperture of the camera and lens. Having extra system speed at this point in step 1110 is not likely to occur often. However, one instance in which it may occur is illustratively exemplified by using a very fast film to photograph a brightly lit object, such as a one-dimensional object, on a bright sunny day.

Step 1270 utilizes, as represented by lines 1224, 314, 304, 1254 and 1264, the following as input: NEW_F_NUMBER, lens specifications—specifically aperture limits, camera specifications—specifically shutter speed limits, SHUTTER_SPEED and EXTRA_SPEED. As output and as represented by line 352, step 1270 produces the latest values for the exposure settings—specifically SHUTTER_SPEED and F_NUMBER. Step 1270 is formed of the following routine expressed in high level functional programming terms:

```
INPUT: EXTRA_SPEED
INPUT: NEW_F_NUMBER
INPUT: lens specifications
```

```
-continued
INPUT: camera specifications
INPUT: SHUTTER_SPEED
OUTPUT: exposure settings
IF EXTRA_SPEED > 0
   THEN: EXTRA_SPEED_APERTURE = .5 • EXTRA_
   SPEED
         EXTRA_SPEED_SHUTTER = .5 • EXTRA_SPEED
   ELSE: EXTRA_SPEED_APERTURE = EXTRA_SPEED
         EXTRA_SPEED_SHUTTER = 0
ENDIF
EXTRA_SPEED = 0
F_NUMBER = 10^(EXTRA_SPEED_APERTURE/2) •
NEW_F_NUMBER
EXTRA_SPEED_APERTURE = 0
IF F_NUMBER > MAXIMUM_APERTURE
   THEN: EXTRA_SPEED_SHUTTER = EXTRA_SPEED_
   SHUTTER
         + 2 • log(F_NUMBER / MAXIMUM_F_NUMBER)
         F_NUMBER = MAXIMUM_APERTURE
   ELSE: IF F_NUMBER < MINIMUM_APERTURE
         THEN: EXTRA_SPEED_SHUTTER =
               EXTRA_SPEED_SHUTTER + 2 •
               log(F_NUMBER / MINIMUM_F_NUMBER)
               F_NUMBER = MINIMUM_APERTURE
         ENDIF
ENDIF
SHUTTER_SPEED = SHUTTER_SPEED / 10^(EXTRA_
SPEED)
EXTRA_SPEED_SHUTTER = 0
IF SHUTTER_SPEED < MINIMUM_SHUTTER_SPEED
   THEN: EXTRA_SPEED_APERTURE =
         log(MINIMUM_SHUTTER_SPEED /
         SHUTTER_SPEED)
         SHUTTER_SPEED = MINIMUM_SHUTTER_
         SPEED
   ELSE: IF SHUTTER_SPEED > MAXIMUM_SHUTTER_
   SPEED
         THEN: EXTRA_SPEED_APERTURE =
               log(MAXIMUM_SHUTTER_SPEED
               / SHUTTER_SPEED)
               SHUTTER_SPEED =
               MAXIMUM_SHUTTER_SPEED
         ENDIF
ENDIF
F_NUMBER = 10^(EXTRA_SPEED_APERTURE/2) • F_NUMBER
IF F_NUMBER > MAXIMUM_APERTURE
   THEN: F_NUMBER = MAXIMUM_APERTURE
   ELSE: IF F_NUMBER < MINIMUM_APERTURE
         F_NUMBER = MINIMUM_APERTURE
         ENDIF
ENDIF
```

Specifically, in the event that the available extra system speed is positive, then step 1270, which is implemented through the routine shown immediately above, first partitions the extra system speed equally between the extra system speed that will be used to increase the value of F_NUMBER, i.e. EXTRA_SPEED_APERTURE, and that which will be used to decrease the value of SHUTTER_SPEED, i.e. EXTRA_SPEED_SHUTTER. Alternatively, if the available extra system speed is negative, then all the extra system speed is allocated to that used for changing the lens aperture setting. Since the parameter EXTRA_SPEED will not be used again during execution of the remainder of this routine, its value is reset to zero. Thereafter, a new lens aperture value is determined based upon the values of EXTRA_SPEED_APERTURE and NEW_F_NUMBER, the latter being the lens aperture value determined through step 1240 (as discussed above) that meets the depth-of-field requirements of the scene. Inasmuch as all the currently available extra system speed for the lens aperture has now been consumed in determining a new F_NUMBER value, the value of parameter EXTRA_SPEED_APERTURE is set to zero. The resulting F_NUMBER value is then checked against the limits of the lens in use. In the event that this value exceeds the maximum available f-number, i.e. MAXIMUM_F_NUMBER, for this lens, i.e. a smaller aperture opening beyond that which the lens can physically provide has been chosen, then the extra system speed that is available for use by the shutter is re-calculated based on the value of the MAXIMUM_F_NUMBER parameter. In this case, since the extra system speed can not be utilized in choosing a smaller lens aperture opening, the extra system speed is effectively allocated to changing the shutter speed. The value of F_NUMBER is then set equal to MAXIMUM_F_NUMBER. Alternatively, in the event that the resulting value for F_NUMBER is less than the minimum available f-number, i.e. MINIMUM_F_NUMBER, for the lens, i.e. a larger aperture opening beyond that which the lens can physically provide has been chosen, then the extra system speed that is available for use by the shutter is re-calculated based on the value of the MINIMUM_F_NUMBER parameter. Here, since the extra system speed can not be utilized in choosing a larger lens aperture opening, the extra system speed is effectively allocated to changing the shutter speed. The value of F_NUMBER is then set equal to MINIMUM_F_NUMBER. This minimum limit condition can arise if a telephoto lens with a large focal length, which requires a very fast shutter speed to effectively compensate for camera shake, is being used with a film that has a relatively slow ISO (ASA) film speed. In any event, once the F_NUMBER has been appropriately set, then the shutter speed is re-calculated based upon the currently available extra system speed, EXTRA_SPEED_SHUTTER, that has been allocated to decreasing the shutter speed. Thereafter, since the parameter EXTRA_SPEED_SHUTTER will not be used again during execution of the remainder of this routine, the value of this parameter is also reset to zero. Similar tests are now performed to determine if the resulting shutter speed exceeds a corresponding minimum (fastest) or maximum (slowest) shutter speed limit. If such a limit condition occurs, then any extra system speed that will now arise, due to use of shutter speed limit in lieu of the actual re-calculated shutter speed, is allocated to further decreasing the lens aperture opening. Thus, as can be seen, if, as the exposure values are changed to utilize available extra system speed, the lens aperture value first encounters one of its corresponding limit values prior to the shutter speed encountering a corresponding limit value, then all the remaining extra system speed is then allocated to changing the shutter speed, and vice versa. Based upon the amount of EXTRA_SPEED_APERTURE that is now available, a new value for the lens aperture is calculated that consumes all this extra system speed. The latest resulting lens aperture value is checked against the physical lens aperture limit values and clipped, if necessary, by the appropriate limit value. If after the shutter speed and lens aperture settings have both been set to appropriate limit values and any extra system speed still remains, the camera, being totally operated at a physical limit condition (smallest aperture opening and fastest shutter speed), is simply unable to utilize the remaining extra system speed.

At this point, step 1270 has suitably adjusted exposure settings, F_NUMBER and SHUTTER_SPEED, to utilize all the remaining extra system speed, up to the physical limits of the lens aperture and/or shutter, in an ambient lighting situation. As such, the latest values for the exposure settings produced by step 1270 are then applied by the camera microcomputer system, through its output circuitry, to appropriately drive the shutter and lens aperture mechanisms of the camera and photograph the current scene using ambient lighting. This concludes execution of the inventive process for use with ambient lighting.

Alternatively, as noted above, extra speed fill flash determination and usage step 1120 is performed in conjunction with fill flash lighting. An operational diagram of extra speed fill flash determination and usage step 1120 is shown in FIG. 13. As noted above, this step updates the flash_condition as "YES", determines whether extra system speed exists in a fill flash lighting situation and appropriately varies the exposure settings (specifically SHUTTER_SPEED) to consume as much of that extra system speed as possible in an effort to improve resulting image quality. As shown, this step consists of three primitive steps, all of which are performed to determine whether extra system speed exists in a fill flash lighting situation and how that extra system speed, to the extent any exists, can best be used to vary the exposure settings and improve image quality. These steps include: determining the amount of extra speed in fill flash lighting step 1310, using the extra speed in fill flash for film exposure step 1320 and decreasing shutter speed for use with fill flash lighting step 1330.

Up to this point and prior to entering step 1310, exposure settings for fill flash have been determined through specifically steps 720 and 730 (see FIG. 7) to provide a lens aperture size and a shutter speed that are required to meet the current scene requirements, i.e. here providing proper exposure of both the primary subject and the background in the current scene. In a fill flash situation, as discussed above, the lens aperture setting determines the relative change in the exposure between the primary subject and the background. The primary subject is illuminated by both the flash, which is a very short duration burst of light, and the ambient lighting; the background is only illuminated by the ambient lighting. Therefore, since an appropriate amount of fill has already been determined, given the differing types of illumination, to appropriately increase the primary subject lighting and properly reduce scene contrast to a desired level and has been manifested in the selection of a proper lens aperture setting, the aperture setting will not be changed thereafter even if extra system speed is present. Any such change will vary the resulting lighting levels between the primary subject and background in the photographed image and adversely affect image quality. However, variations in the shutter speed will not only advantageously preserve the relative difference between these lighting levels but will also permit the overall exposure of the image to be changed. Consequently, with fill flash, only the shutter speed is varied, in the manner that will now be discussed below, to utilize available extra system speed.

In particular and as shown in FIG. 13, upon entry into step 1120, step 1310 is first performed. Step 1310 determines if a slower shutter speed than that previously determined would be acceptable for use with fill flash to photograph the current scene. If a slower shutter speed would be acceptable, then extra system speed exists. Step 1310 then determines the amount of extra system speed that is initially available. Step 1320 is then performed to account for the amount of extra system speed that was implicitly consumed in intentionally under- or over-exposing the specific film in use, given its film quality vs. exposure characteristic, from the ISO/ANSI exposure standards. As noted above, the variation comes about from the prior selection of a combination of shutter speed and lens aperture settings that meets the current scene requirements. If any extra system speed still exists, then step 1330 is performed to select an appropriately faster shutter speed than the acceptable shutter speed in order to utilize all the remaining extra system speed.

Step 1310 utilizes, as represented by lines 334, 304, 434, 422, and 314, the following inputs: ADJUSTED_FOCAL_LENGTH_FACTOR, camera specifications— specifically shutter speed limits, exposure settings, fill_flash_condition, and lens specifications—specifically FOCAL_LENGTH. This step updates, as represented by line 356, the value of flash_condition to "YES" to signify that flash illumination is to be used and produces, as represented by lines 1314 and 1318, the following as output: the acceptable shutter speed that can be used with fill flash, i.e. NEW_SHUTTER_SPEED, and the amount of available extra system speed, i.e. EXTRA_SPEED, that is currently available with the fill flash lighting. Step 1310 is formed of the following routine expressed in high level functional programming terms:

```
INPUT: ADJUSTED_FOCAL_LENGTH_FACTOR
INPUT: camera specifications
INPUT: exposure settings
INPUT: fill_flash_condition
INPUT: lens specifications
UPDATE: flash_condition
OUTPUT: EXTRA_SPEED
OUTPUT: NEW_SHUTTER_SPEED
IF fill_flash_condition = YES
 THEN: flash_condition = YES
       MAXIMUM_USABLE_SHUTTER_SPEED =
           ADJUSTED_FOCAL_LENGTH_FACTOR
           • (1/FOCAL_LENGTH)
       IF MAXIMUM_USABLE_SHUTTER_SPEED >
           MAXIMUM_SHUTTER_SPEED
       THEN: NEW_SHUTTER_SPEED =
           MAXIMUM_SHUTTER_SPEED
       ELSE: NEW_SHUTTER_SPEED =
           MAXIMUM_USABLE_SHUTTER_SPEED
       ENDIF
       EXTRA_SPEED =
           log(NEW_SHUTTER_SPEED /
           SHUTTER_SPEED)
 ELSE: NEW_SHUTTER_SPEED = SHUTTER_SPEED
       EXTRA_SPEED = 0
ENDIF
```

As noted above, step 1310 first determines the slowest (maximum) shutter speed, i.e. MAXIMUM_USABLE_SHUTTER_SPEED, given the focal length of the current lens in use and the ADJUSTED_FOCAL_LENGTH_FACTOR parameter, that is acceptable to photograph the current scene to reduce camera shake. Then, based upon the previously determined shutter speed that meets the scene requirements and the maximum value thereof that can presently be used in fill flash, step 1310 determines if extra system speed exists and the amount, if any, of extra system speed that is initially available. Specifically, once the maximum usable shutter speed is determined, it is compared to the maximum (fastest) shutter speed that can be provided by the camera. The new shutter speed, i.e. NEW_SHUTTER_SPEED, is set to the slower one of these two speeds. The amount of available extra system speed is then determined as the log of the ratio of the new shutter speed to the shutter speed that met the scene requirements. For example, if based upon camera shake considerations, a maximum usable shutter speed is 1/125th of a second could be used and the scene required a shutter speed of 1/250th of a second, then 1/125th of a second would initially be chosen as the new shutter speed and one stop of extra system speed ($\log_{10} 2$) would result.

With the determination of the amount of extra system speed that is currently available with fill flash lighting and the new shutter speed that can be used therewith, step 1320 is performed to account, based upon the film quality vs. exposure characteristic, for the extra system speed that was implicitly consumed, through prior selection of exposure and flash parameters that meet the scene requirements, in having intentionally changed the exposure of the specific film currently in use from the ISO/ANSI exposure standards. The amount of extra system speed that is used here depends upon the specific exposure characteristic of the film. As represented by lines 306 and 1318, step 1320 utilizes two inputs: film quality vs. exposure information (specifically a table of pre-defined values) and EXTRA_SPEED. The output produced by this step, as represented by line 1324, is an updated amount of EXTRA_SPEED that still exists. Step 1320 is formed of the same routine described above for step 1260.

Now, at this point, a new shutter speed has been defined for fill flash that meets the scene requirements while providing a measure of intentional over- or under-exposure of the film to improve image quality. If, as discussed immediately above, extra system speed still exists, then, step 1330 is performed to utilize the remaining extra system speed to decrease the latest value for the shutter speed, i.e. select a faster shutter speed which further decreases the amount of time during which the shutter is open. The resulting value of the shutter speed is checked against the appropriate physical limit values and, if necessary, clipped by a corresponding limit value. Step 1330 utilizes, as represented by lines 1314, 1324 and 304, the following as input: NEW_SHUTTER_SPEED, EXTRA_SPEED, and camera specifications—specifically shutter speed limits. As output and as represented by line 352, step 1330 produces the latest values for the exposure settings—specifically SHUTTER_SPEED. Step 1330 is formed of the following routine expressed in high level functional programming terms:

---

INPUT: camera specifications
INPUT: EXTRA_SPEED
INPUT: NEW_SHUTTER_SPEED
OUTPUT: SHUTTER_SPEED
SHUTTER_SPEED = NEW_SHUTTER_SPEED / ($10^{EXTRA\_SPEED}$)
IF SHUTTER_SPEED > MAXIMUM_SHUTTER_SPEED
 THEN: SHUTTER_SPEED = MAXIMUM_SHUTTER_SPEED
ENDIF
IF SHUTTER_SPEED < MINIMUM_SHUTTER_SPEED
 THEN: SHUTTER_SPEED = MINIMUM_SHUTTER_SPEED
ENDIF

---

At this point, step 1330 has suitably adjusted the shutter speed to utilize all the remaining extra system speed, up to the physical limit of the shutter, in a fill flash lighting situation. The resulting exposure settings, specifically SHUTTER_SPEED, produced by step 1330, along with the lens aperture value determined through step 720 (discussed above in conjunction with FIG. 7) that meets the scene requirements, are applied by the camera microcomputer system, through its output circuitry, to appropriately drive the shutter and lens aperture mechanisms of the camera and photograph the current scene using fill flash. This concludes execution of the inventive process for use with fill flash lighting.

Lastly, if full flash lighting is to be used, then alternatively, as noted above, extra speed full flash determination and usage step 1130 is performed. An operational diagram of extra speed full flash determination and usage step 1130 is shown in FIG. 14. As noted above, step 1130 updates the flash_condition as "YES", determines whether extra system speed exists in a full flash lighting situation and appropriately varies the flash parameters (specifically POWER_CONDITION and spread bounce information) to consume as much of that extra system speed as possible in an effort to improve resulting image quality. If extra system speed still remains after accounting, in accordance with the film quality vs. exposure table, for the extra system speed which was implicitly consumed in having chosen exposure settings and flash parameters that meet the current scene requirements and intentionally varying the exposure of the film in use from the ISO standard exposure, then, as a last resort, the remaining extra system speed is consumed by reducing the lens aperture (here FLASH_F_NUMBER) setting to impart additional depth-of-field to the resulting image—even though the additional depth-of-field may not likely yield a noticeable improvement in image quality.

In this regard, automated cameras known in the art, when used in making flash exposures, disadvantageously and routinely decrease the lens aperture size in response to an increase in film speed. No other exposure settings or flash parameters are generally changed. The additional depth-of-field provided by the lens is simply wasted inasmuch as the flash power and hence the depth-of-illumination provided by the flash unit have both remained constant. As such, changing the film speed in these cameras does not improve the resulting image quality. Similarly, if the GUIDE_NUMBER of a flash unit increases, these automated cameras also routinely decrease the lens aperture size, even if the depth-of-field requirements of a scene have not changed. Here, too, the additional depth-of-field, being beyond that required by the scene, is mostly wasted and will not significantly improve image quality. In contrast to providing additional and wasted depth-of-field as occurs in the art, our inventive process, as described in detail below, first utilizes the extra system speed available through, illustratively, an increase in ISO (ASA) film speed and/or GUIDE NUMBER (the latter attributable to an increase in available output flash power) to change the flash illumination by throttling down the non-spread direct full flash output power in order to conserve flash power thereby permitting a storage capacitor within the flash to rapidly recharge in preparation for the next flash exposure and/or through utilizing either bounce or spread flash in order to minimize "red-eye" and provide more even scene illumination than that obtainable through non-spread direct flash. The lens aperture setting remains at the value that was previously selected to meet matched depth-of-field and depth-of-illumination requirements. Since the lens aperture is not initially stopped down with an increase in GUIDE_NUMBER and/or film speed, the amount of additional exposure that results by maintaining the aperture setting at its prior value provides the available extra system speed. Thereafter, to the extent any extra system speed remains after selecting bounce or spread flash and then after having accounted for that which is implicitly consumed in the intentional over- (or under-) exposure inherent in selecting the exposure settings and flash parameters that meet the current scene requirements, the lens aperture setting is changed to consume all the remaining extra system speed. Since there are now no other remaining uses to which extra system speed can be put that provide a more noticeable improvement(s) in image quality than changing the aperture, the lens aperture setting is changed as a last resort to impart additional depth-of-field to the resulting image, even though doing so will only provide a marginal improvement, if any, in image quality. Using the extra system speed in this prioritized manner (specifically first, throttling flash output power; second, using bounce or spread flash; third, accounting for exposure changes; and fourth and lastly, changing the lens aperture setting) advantageously provides a noticeable improvement in image quality in flash photography over that occurring in automated cameras known in the art.

As shown, step 1130 consists of five primitive steps, all of which are performed to determine whether extra system speed exists in a full flash lighting situation and how that extra system speed, to the extent any exists, can best be used to vary the exposure settings and improve image quality. These steps include: determining extra speed in full flash lighting step 1410, calculating flash output step 1420, calculating flash spread and bounce step 1430, using the extra speed in full flash for film exposure step 1440 and stopping down the lens aperture in full flash step 1450.

Up to this point and prior to entering step 1410, exposure settings for full flash have been determined through specifically steps 910 and 920 (see FIG. 9) and 1030 (see FIG. 10) that, to the extent possible, satisfy the baseline full flash exposure. In particular, the lens aperture setting has been chosen to be that which provides equal depth-of-field and depth-of-illumination for the primary subject distance. The initial shutter speed has been chosen as a default value for use with full flash, i.e. the value of the FLASH_SHUTTER_SPEED parameter.

Upon entry into step 1130, step 1410, as shown in FIG. 14, is first performed. This latter step determines whether flash power exists which exceeds that required by the scene. If so, extra system speed exists. Step 1410 then determines the amount of available extra system speed that initially exists. If extra system speed exists, step 1420 determines the appropriate output (output intensity) power of the flash unit that is needed to meet the scene requirements and then utilizes a portion of, if not all, the extra system speed to appropriately reduce (throttle down) the output power of the flash unit. This permits the storage capacitor within the flash to rapidly re-charge in preparation for the next flash exposure. If any extra system speed remains, then step 1430, in response to the existence of a ceiling or other surface suitable for bounce illumination, utilizes a portion, if not all, of this remaining extra system speed to provide bounce flash. If such a surface does not currently exist, then step 1430 utilizes a portion, if not all, of the remaining extra system speed for spread flash illumination, i.e. increasing the horizontal beam width of a direct full flash illumination. In the event extra system speed still exists, then step 1440 consumes a given amount of the remaining extra system speed by having varied the exposure of the film itself, based upon its exposure characteristic, from the ISO/ANSI exposure standards. As noted above, the variation comes about from the prior selection of a combination of shutter speed and lens aperture settings that meets the current scene requirements. If any extra system speed still exists, then step 1450 is performed to stop down, i.e. reduce, the lens aperture (here FLASH_F_NUMBER) setting to impart additional depth-of-field to the resulting image. Inasmuch as decreasing the lens aperture setting will produce little, if any and likely no, noticeable improvement in image quality, this change only occurs as a last resort after all the other techniques for consuming available extra system speed in a full flash situation have been exhausted.

As noted above, step 1410 determines whether flash power exists which exceeds that required by the scene, and based thereon, the amount of extra system speed that initially exists with full flash lighting. The amount of full flash that is available is given by the value of the GUIDE_NUMBER parameter; while the flash power required by the scene is specified by the value of the DEPTH_NUMBER parameter which equals the product of the FLASH_F_NUMBER and the primary subject distance. The value of the GUIDE_NUMBER also increases with increases in film speed. In essence, if the flash unit provides more optical power than that required by the scene, then extra system speed exists. Step 1410 utilizes, as represented by lines 318, 468, 308 and 412, the following as input: flash specifications—specifically GUIDE_NUMBER, FLASH_F_NUMBER, subject distance information and full_flash_condition. As output, step 1410 updates, as represented by line 356, the value of flash_condition to "YES" thereby signifying that flash illumination is to be used and, as represented by line 1414, produces an initial value for extra system speed, i.e. EXTRA_SPEED. Step 1410 is formed of the following routine expressed in high level functional programming terms:

```
INPUT: flash specifications
INPUT: FLASH_F_NUMBER
INPUT: subject distance information
INPUT: full_flash_condition
OUTPUT: EXTRA_SPEED
OUTPUT: flash_condition
IF full_flash_condition = YES
  THEN: flash_condition = YES
        EXTRA_SPEED = log[(GUIDE_NUMBER
          / (FLASH_F_NUMBER
            • PRIMARY_SUBJECT_DISTANCE))²]
ENDIF
```

Once the initial amount of extra system speed has been provided through step 1410, step 1420 is performed to determine the appropriate output (output intensity) power of the flash unit that is needed to meet the scene requirements and then utilizes a portion, if not all, of the extra system speed to appropriately reduce the output power of the flash unit. The flash output power is appropriately throttled back to that which meets the scene requirements only if the flash unit currently in use is energy saving and operates in a fast recycle mode. Otherwise, the maximum light output of the flash unit (i.e. POWER_CONDITION=1) is used, and no extra system speed is consumed by this step. Step 1420 utilizes, as represented by lines 1414, 318 and 320, the following as input: EXTRA_SPEED, flash specifications—specifically energy_saving_flash, and RECYCLE_MODE. As output, step 1420 updates the value of EXTRA_SPEED, as represented by line 1424, and produces a value, as represented by line 354, for POWER_CONDITION. Step 1420 is formed of the following routine expressed in high level functional programming terms:

```
INPUT: RECYCLE_MODE
INPUT: energy_saving_flash
UPDATE: EXTRA_SPEED
OUTPUT: POWER_CONDITION
IF energy_saving_flash = YES
   THEN: IF RECYCLE_MODE = NORMAL
         THEN: POWER_CONDITION = 1.0
         ENDIF
   ELSE: IF (RECYCLE_MODE = FAST) AND
         (EXTRA_SPEED > 0)
         THEN: POWER_CONDITION = 10^{EXTRA\_SPEED}
               EXTRA_SPEED = 0
         ENDIF
   ELSE: POWER_CONDITION = 1.0
ENDIF
```

In the event extra system speed exists because the flash unit can not be appropriately throttled back, then a determination is made through step 1430 as to whether a portion, if not all, of this extra system speed can be used for bounce flash illumination. Here, if a suitable surface for bounce is detected by vertical rangefinding system 230 (see FIG. 2) situated in the camera and if sufficient positive extra system speed exists—i.e. equal or greater than the value of the BOUNCE_CUTOFF parameter which typically equals +2 or +3 stops, then bounce flash illumination is used. Inasmuch as bounce flash provides more even scene illumination than does spread flash, bounce flash, to the extent it can be used in a current photographic situation, is preferred to spread flash illumination. A suitable bounce flash unit could contain two separate flash tubes and corresponding reflectors. One tube and its reflector would be pointed towards the top of the unit, while the other tube and its reflector would be pointed forward. The former tube would only be energized if a suitable bounce surface exists and sufficient extra system speed was available; the other tube would be used for spread or non-spread direct full flash illumination. Alternatively, the flash unit could contain a single flash tube and a mirrored beam splitter (e.g. a partially silvered mirror) which, for a bounce flash, is selectively inserted in front of the tube to direct a portion of its optical output upward from the top of flash unit and the remainder outward from the front of the flash unit. However, if a suitable surface is not available or the amount of extra system speed that currently exists is insufficient for bounce flash illumination, then a pre-defined amount of the extra system speed, as defined by a table look-up operation into the spread table, is consumed through spread flash illumination, i.e. by changing the horizontal beam width of a direct full flash illumination. Changes in the beam width can be readily accomplished within a flash unit by using a suitable electro-magnetic actuator to position one of several suitable optical diffusers, that each provides a pre-defined spread angle, in front of the flash tube in that unit. The specific implementation of the flash unit is not critical as long as it possesses the capability to selectively direct a known amount of light in a given direction(s). The performance of that flash unit for spread and/or bounce flash, in terms of its directionality and flash output power, would be characterized by the corresponding values stored in an appropriate SPREAD TABLE and the BOUNCE_CUTOFF parameters. To simplify spread flash illumination, three different spread angles could be used: normal, wide$_1$ and wide$_2$. As such, the spread angle of the flash unit can be set to a normal value where spread flash is not to be used, and to increasingly wide angles (e.g. wide$_1$ and wide$_2$) which provide increasingly large spread area coverage though with reduced light levels at each point therein. Through proper selection of a spread angle, direct flash illumination should be spread out beyond the frame captured by the lens in order to provide scene illumination that, through reflections off nearby surfaces and objects onto the scene, attempts to mimic the lighting characteristics provided by bounce flash illumination. The value of the parameter SPREAD_AMOUNT provided by the SPREAD TABLE defines the relative light intensity loss provided by the increased beam angle and measured in terms of log exposure. Step 1430 utilizes, as represented by lines 1424, 318 and 308, the following as input: EXTRA_SPEED, flash specifications —specifically spread bounce information, and subject distance information. This step updates the value of EXTRA_SPEED, as represented by line 1434, and produces appropriate values, as represented by line 358, for spread_bounce_condition. Step 1430 is formed of the following routine expressed in high level functional programming terms, with the following spread table being illustrative:

```
INPUT: EXTRA_SPEED
INPUT: spread bounce information
UPDATE: EXTRA_SPEED
OUTPUT: spread_bounce_condition
DEFINE TABLE:
```

| EXTRA_SPEED IN | SPREAD_AMOUNT | BEAM ANGLE | EXTRA_SPEED OUT |
|---|---|---|---|
| −5.00 | 0.00 | normal | −5.00 |
| −1.50 | 0.00 | normal | −1.50 |
| −1.20 | 0.00 | normal | −1.20 |
| −0.90 | 0.00 | normal | −0.90 |
| −0.60 | 0.00 | normal | −0.60 |
| −0.30 | 0.00 | normal | −0.30 |
| 0.00 | 0.00 | normal | 0.00 |
| 0.30 | 0.30 | wide$_1$ | 0.00 |
| 0.45 | 0.45 | wide$_2$ | 0.00 |
| 0.60 | 0.45 | wide$_2$ | 0.15 |
| 0.90 | 0.45 | wide$_2$ | 0.45 |
| 1.20 | 0.45 | wide$_2$ | 0.75 |
| 1.50 | 0.45 | wide$_2$ | 1.05 |
| 1.80 | 0.45 | wide$_2$ | 1.35 |
| 5.00 | 0.45 | wide$_2$ | 4.55 |

```
IF ceiling_exist = YES
   THEN: IF EXTRA_SPEED > BOUNCE_CUTOFF
         THEN: BOUNCE_AMOUNT = EXTRA_SPEED
               EXTRA_SPEED = EXTRA_SPEED -.9
               IF EXTRA_SPEED < 0
                  THEN: EXTRA_SPEED = 0
               ENDIF
               BOUNCE_AMOUNT = BOUNCE_AMOUNT
                             - EXTRA_SPEED
               SPREAD_AMOUNT = 0
         ELSE: linearly interpolate SPREAD_AMOUNT
               from SPREAD TABLE
         ENDIF
   ELSE: linearly interpolate SPREAD_AMOUNT from
         SPREAD TABLE
ENDIF
```

In lieu of using a flash unit that has a lens which varies the spread angle through one or more fixed amounts, i.e. provides quantized variations in the beam angle, the flash unit could include a lens which can be continuously moved to linearly vary the spread angle between two limits. This linear variation could change proportionally with corresponding variations in the value of the SPREAD_AMOUNT parameter.

With the amount of extra system speed that is currently available with full flash lighting and specifically the amount consumed through spread and bounce flash illumination having now been determined, step 1440 is performed to account for the extra system speed that was implicitly consumed by having chosen exposure settings and flash parameters that meet the current scene requirements but, in accordance, with the film quality vs. exposure characteristics of the present film in use, that results in an exposure that intentionally varies from the ISO/ANSI exposure standards. Step 1440 utilizes, as represented by lines 306 and 1434, two inputs: film quality vs. exposure information (specifically a table of pre-defined values) and EXTRA_SPEED. The output produced by this step, as represented by line 1444, is an updated amount of EXTRA_SPEED that still exists. Step 1440 is formed of the same routine described above for step 1260.

Now, at this point, appropriate flash output power and, where appropriate, spread and bounce flash settings have been selected for full flash that meets the scene requirements while providing a measure of intentional over- or under-exposure of the film to improve image quality. If, as discussed immediately above, extra system speed still exists, then, step 1450 is performed to utilize, as a last resort, all the remaining extra system speed to stop down, i.e. reduce, the lens aperture (here FLASH_F_NUMBER) setting, provided the physical aperture limits of the lens are not exceeded, in order to impart additional depth-of-field to the resulting image. The additional depth-of-field, being in excess of that required to meet the depth-of-illumination, is not likely to provide an improvement in image quality; however, it is the only remaining use to which the remaining extra system speed can now be put. Step 1450 utilizes, as represented by lines 314, 458, 304 and 1444, the following as input: lens specifications—specifically aperture limits, FLASH_F_NUMBER, camera specifications—specifically shutter type, and EXTRA_SPEED. This step produces, as represented by line 352, new values for the exposure settings—specifically F_NUMBER and FLASH_F_NUMBER—as output. Step 1450 is formed of the following routine expressed in high level functional programming terms:

---

INPUT: EXTRA_SPEED
INPUT: camera specifications
INPUT: lens specifications
INPUT: FLASH_F_NUMBER
UPDATE: FLASH_F_NUMBER
OUTPUT: F_NUMBER
FLASH_F_NUMBER = $10^{(EXTRA\_SPEED/2)} \cdot$ FLASH_F_NUMBER
IF FLASH_F_NUMBER > MAXIMUM_F_NUMBER
 THEN: FLASH_F_NUMBER = MAXIMUM_F_NUMBER
ENDIF
IF FLASH_F_NUMBER < MINIMUM_F_NUMBER
 THEN: FLASH_F_NUMBER = MINIMUM_F_NUMBER
ENDIF
IF shutter type ≠ PROGRAMMABLE
 THEN: F_NUMBER = FLASH_F_NUMBER -continued

ENDIF

---

At this point, step 1450 has suitably adjusted the lens aperture to utilize all the remaining extra system speed, up to the physical limits of the lens aperture, in a full flash lighting situation. The resulting exposure settings, specifically F_NUMBER and FLASH_F_NUMBER, produced by step 1450, along with the shutter speed value determined through step 820 (discussed above in conjunction with FIG. 8) that meets the scene requirements, are applied by the camera microcomputer system, through its output circuitry, to appropriately drive the shutter and lens aperture mechanisms of the camera and photograph the current scene using fill flash. This concludes execution of the inventive process for use with full flash lighting.

As noted above, once the exposure settings and, where appropriate, flash parameters have been chosen to consume as much of the available extra system speed as possible in accordance with our inventive process, then the camera microcomputer drives the camera lens aperture and shutter mechanisms and flash unit to provide a resulting exposure with, when necessary, supplemental fill or full flash illumination, all as defined by the exposure settings and, where appropriate, flash parameters for the current scene being photographed, particularly in view of the selected display size and focal length photographing mode therefor.

Thus, as one can see, incorporation of the DISPLAY_SIZE_FACTOR, with its independent variation on the viewing distance and the reproduction magnification ratio, permits our inventive exposure control system to first utilize just the proper amount of system speed to fully compensate for additional image blur that would otherwise result from a user selected non-standard display size and/or a different focal length photographing mode. Once all the scene requirements were met, then any and all additional available extra system speed would be used in a proper incremental prioritized manner, as described above, to further improve image quality above that which would result from strict adherence to the ISO/ANSI standards. Furthermore, by expending system speed to first compensate for additional image blur prior to meeting scene requirements, the resulting exposure (and, where applicable, flash) parameters become more restricted than without such compensation. As a result, should the photographer select a non-standard display size or different focal length mode but then subsequently decide to produce a standard sized print (and/or with a standard focal length mode) from the negative, then the quality of the resulting print will not suffer in any way from this decision—all that will have occurred will be a waste of available extra system speed through a prior choice of exposure (and, where suitable, flash) parameters that were ultimately and simply too restrictive for the current scene, its resulting display size and focal length photographing mode. Accordingly, should the photographer make such a wrong choice at the time of image capture in terms of the display size or in the focal length photographing mode, then, advantageously, no diminution in the quality of the resulting image will occur.

F. Use of Statistical vis-a-vis Actual Measured Input Data, or Adaptive Data for Certain Input Parameters Generally speaking, the question of whether to incorporate a particular automatic control system into a camera involves evaluating a well-known tradeoff between manufacturing cost and product performance. Clearly, our inventive process, in its most sophisticated version as described above, requires relatively sophisticated scene sensors. In this regard, for example, light metering system 215 (see FIG. 2) and horizontal rangefinding system 220 provide distances and accompanying light levels for both the primary subject and background in a current scene. Accordingly, these systems must possess the capability to successfully discriminate between the primary subject and background portions of the scene. To do so, these systems rely on two-point sensors and related processing electronics. Sensing systems that possess this (or a higher) level of sophistication are likely to be relatively expensive. While the cost of such sensors may account for an insignificant portion of the total manufacturing cost of a camera designed for "professional" use, the same is often not the case for a low cost camera designed primarily for widespread amateur use. Cameras of the former type are driven by performance, with cost being very much of a secondary factor; while cameras of the latter type are very sensitive to manufacturing cost. Given this reality, relatively simple mechanisms and control systems are generally used in low cost cameras in lieu of sophisticated sensors and associated electronics.

However, in spite of the cost limitations inherent in manufacturing a low cost camera, our inventive process (or at least a portion(s) of it, as noted below) can still be incorporated in these cameras and used with relatively primitive sensors to yield overall image quality that is still significantly higher than that obtainable with low cost cameras available in the art.

Specifically, rather than relying on actual real-time measurements of various input parameters, such as illustratively subject distance, background distance and even scene brightness, the values of these parameters can alternatively be obtained through table look-up operations into stored statistical data. For example, in a low cost camera that uses a short fixed focal length lens, such as a 35 mm lens focused at, e.g., its hyperfocal distance, there is little, if any noticeable difference in image sharpness for objects located at a camera-to-subject distance of approximately 40 feet (approximately 12.2 m) to so-called infinity. In such a camera, the background could be safely assumed to exist at 40 feet for all images. Given the resulting marginal difference in sharpness between objects situated at 40 feet and at infinity, a simple rangefinder could be used to supply primary subject dista. ce and the background distance set to e.g. 40 feet (approximately 12.2 meters), with little, if any, degradation in image quality resulting from use of our process with an assumed distance. The statistical data could either include a single pre-defined value for a given item, such as 40 feet for background distance, or a number of values with a specific one of these values being selected through use of conditional probabilities. For example, using stored statistics previously gathered through analysis of thousands of different photographed images, certain probabilities can be defined for background distance given a primary subject distance. As such, a single-point output value produced by a simple rangefinding system for primary subject distance could be used by the camera microprocessor to access one, i.e. the most likely, of a number of different possible background distances. Hence, a readily available spot metering system could be substituted for the multi-point metering system specifically described above. Any change in primary subject distance would yield a differing corresponding change in the statistically based background distance. The resulting values for the actual primary subject distance and the statistically based background distance would then be supplied to our inventive process. Similarly, other scene specific data which has been statistically estimated based upon the expected use of the camera could be used in lieu of corresponding real-time measurements of this data. For example, a camera designed for outdoor use may contain a stored value of expected scene brightness. This value would be determined by the manufacturer of the camera using statistical analyses of a sufficiently large number of photographs taken with outdoor lighting and then stored within the camera for subsequent use in choosing optimum exposure settings through our inventive process.

Furthermore, rather than relying on internal camera-based accelerometers to measure shake information, this information could be programmed into the camera, specifically into a ROM, during its manufacture. In this case, the information could be based upon statistical studies conducted by a camera manufacturer rather than actual measured real-time data. Use of such statistical data would eliminate the need for these accelerometers and their associated processing electronics and advantageously reduce the manufacturing cost of the camera.

Alternatively, an assumption(s) could be made regarding scene requirements. As an example and in contrast to that occurring in currently available low cost cameras, the shutter speed in a low cost camera could be selected as equaling the ADJUSTED_FOCAL_LENGTH_FACTOR multiplied by the reciprocal of the FOCAL_LENGTH of the lens currently in use in order to eliminate camera shake. This camera, as would be typical of a camera designed for widespread amateur use, could have a short fixed focal-length lens with a single locked lens aperture size. Cameras of this type are manufactured with the assumption that the depth-of-field required by the vast majority (statistically speaking), e.g. 90–95%, of the scenes which will be photographed will lie within the depth-of-field provided by the single lens aperture. For example, for a 37 mm lens with an f/11 lens aperture, the depth-of-field will extend from 4 feet (approximately 1.22 m) to infinity. Accordingly, for 90–95% of the scenes being photographed, then a simple measurement of primary subject light level will reveal, within a certain margin of error, whether any extra system speed is available and, if so, the appropriate amount of extra system speed that is currently available. If extra system speed is available, then, depending upon the film in use, the shutter speed could be set to intentionally overexpose the film, as appropriate, in order to consume the extra system speed so as to improve image quality. For example, if objects from 4 feet to infinity are in sharp focus using the f/11 lens aperture and the shutter speed has been determined, as set forth above, to eliminate camera shake but the measured subject light level in this scene indicates that for an ISO normal exposure a faster shutter speed than that initially selected could be used instead, then the extra system speed could be used, depending on film type, to keep the shutter speed at its original value in order to provide a stop of over-exposure to improve image quality. A simple circuit could be used within the camera to read the film type through the DX contacts and, for certain pre-defined film types, enable the over-exposure to occur. In contrast, low cost cameras known in the art would simply increase the shutter speed (decrease the amount of time during which the shutter is open) to obtain an ISO normal exposure. Thus, even in relatively simple low cost cameras, determination and use of extra system speed, as broadly taught by our inventive process, could be used to provide a noticeable improvement in image quality.

However, the accuracy inherent in using statistically assumed values and/or other assumptions, whether of input data or scene requirements, is generally less than that associated with using actual measured real-time values. As such, the accuracy inherent in our inventive process for calculating extra system speed and exposure and, where appropriate, flash parameters would, in certain instances, decrease somewhat through use of statistical data and/or scene based assumptions. Nevertheless, the resulting parameters, having values that might be somewhat degraded, would nevertheless significantly improve image quality, via the determination and use of extra system speed, beyond the image quality obtainable using only ISO normal exposures as employed in current low cost cameras.

Thus, as one can now appreciate, various broad teachings of our invention, from a portion to the entire process itself, can be incorporated in cameras that range from being very simple and inexpensive to very sophisticated and costly to in effect "bridge the gap" between these different extremes while providing significant noticeable improvements in image quality obtainable through all these cameras.

Clearly, as manufacturing efficiencies rise over time and the cost of using increasingly sophisticated sensors decreases, the use of statistical data could be replaced, where appropriate during product design and manufacture, by sensors to provide actual measured real-time data so as to permit our inventive process to operate at increasingly higher accuracies and provide images having even further increased overall quality.

Moreover, if sufficient processing power and storage capability could be incorporated into a camera, the camera could not only measure real-time input data but also perform statistical analysis of historical input data particular to its user. By doing so, the camera would effectively "learn" the appropriate values for various salient parameters. In particular, certain statistical data, such as, for example, camera shake information, could in effect become customized to a given user, rather than having been averaged across a typical user community, and would be accessible in much tl: same manner as statistical data stored in the camera during its manufacture. This would skew the performance of the camera towards the characteristics of a given user and/or the scenes which are expected to be photographed by that user. In situations where photographic or other conditions do not permit actual real-time measurements to take place for a given input parameter(s), the stored statistical data could be used instead as default values to increase the rate at which our inventive process could be performed, and/or to increase the resulting accuracy obtained thereby over the accuracy resulting from use of a pre-stored value(s) defined by the manufacturer for this parameter(s).

G. Severability of the Preferred Embodiment

As noted above, various portions of the preferred embodiment of our inventive process can be severed therefrom and incorporated into cameras to provide resulting corresponding improvements in image quality. Illustrative examples of these portions will now be discussed.

Certainly, as previously described, the DEPTH_NUMBER parameter and its use in flash photography to provide an appropriate lens aperture setting given subject distance can be readily incorporated into nearly any commercially available camera. Using this parameter to provide lens aperture settings, rather than the GUIDE_NUMBER parameter, will eliminate unnecessary depth-of-field and allow the photographer latitude to use spread or bounce flash illumination so as to provide more consistent scene illumination than that obtained through non-spread direct full flash—thereby improving image quality over that obtainable through use of the GUIDE_NUMBER based ISO/ANSI exposure standards. Selection and use of spread or bounce flash, in this instance, would be in direct contrast to the methodology employed in automated cameras known in the art which merely relies on stopping down the lens aperture in response to an increase in either the film speed and/or the value of the GUIDE_NUMBER of a flash unit. Inasmuch as merely stopping down the lens aperture would likely result in needlessly imparting additional depth-of-field to a photographed image of a scene beyond that required by the scene, this would, in effect, waste the available extra system speed provided by the film and/or flash unit and would marginally, if at all, improve image quality.

Specifically, the DEPTH_NUMBER could be incorporated into a simple circular numerical index (effectively a circular slide rule) which is affixed to a flash unit to enable a photographer to quickly determine the proper lens aperture given the subject distance. A similar index for GUIDE_NUMBER could also be situated adjacent to and used in conjunction with the DEPTH_NUMBER index. By appropriately adjusting both of these indices for the proper DEPTH_NUMBER and current GUIDE_NUMBER of the flash unit in use, these scales would provide the appropriate lens aperture setting, given a primary subject distance, and indicate whether spread or bounce flash could be used as well as the appropriate spread angle. As such, the determination of extra system speed provided by the differential between the DEPTH_NUMBER and the GUIDE_NUMBER parameters (the latter parameter encompassing increases in either or both flash power and film speed) and its prioritized use would be incorporated into these scales and would essentially be transparent to the photographer.

Another illustrative severable portion of our process involves automatically determining whether fill flash is to be used or not based upon a measurement using, e.g., a single auto-focusing spot on the primary subject, of primary subject distance coupled with a two-point measurement of primary and background light levels.

Furthermore, another illustrative severable portion of the inventive process is the determination of a lens aperture setting based on the far depth-of-field requirement in a scene and, to the extent extra system speed exists in photographing this scene, utilizing a portion (or where appropriate all) of this extra system speed in intentionally over-exposing the film rather than stopping down the lens aperture or increasing the shutter speed. By intentionally over-exposing the film in accordance with its quality vs. exposure characteristic, an improvement in image quality will likely result for most negative print films and particularly for those films that exhibit such a characteristic that is strongly biased towards over-exposure.

In addition, a further illustrative severable portion of our inventive process, that can readily be used in currently available, and particularly inexpensive, cameras, involves selecting an appropriate shutter speed, based upon the reciprocal of the focal length multiplied by the ADJUSTED_FOCAL_LENGTH_FACTOR, to minimize camera shake. Selecting a shutter speed in this manner would be particularly useful in cameras with a zoom lens, where the focal length and hence minimum shutter speed changes as the lens is zoomed. In this case, measurements of actual real-time shake information, i.e. values for the BLUR_FROM_SHAKE parameter, could be eliminated from our inventive process and replaced with suitable pre-defined constant(s) that are set during manufacture and an approximate expected amount of user induced camera shake which the camera is to experience. The camera could store one or several such constants. If multiple constants are stored, the user could select any one of these constants he or she desires in any instance by setting an appropriate user-accessible switch located on the camera.

A further illustrative severable portion of the inventive process and one, as discussed above, that is geared to use in low cost cameras is determining the available extra system speed based solely upon a primary subject light level and, rather than increasing the shutter speed due to a heightened primary subject light level, using the extra system speed to maintain a given shutter speed at a value that is sufficient to eliminate camera shake while intentionally over-exposing the film.

Furthermore, as should now be readily apparent to those skilled in the art, through use of the DISPLAY_SIZE_FACTOR, cameras of virtually any complexity can readily provide excellent quality images, certainly having a quality level higher than that currently occurring, for non-standard display sizes. Inasmuch as the DSF is governed by both the reproduction magnification ratio and the viewing distance, virtually any display size, whether cropped or full-frame, can be accommodated with our inventive method.

Specifically, then, an additional severable feature of our invention that can be used to improve image quality in inexpensive cameras, particularly those using a fixed focus lens but offering the photographer the ability to select a non-standard display size and/or non-standard (i.e. different) focal length photographing mode (e.g. pseudo-telephoto or pseudo-panoramic) during image capture, involves setting the aperture to provide he necessary depth-of-field, for the desired display size and focal length photographing mode, and then increasing the shutter speed, i.e. decreasing the time during which the shutter is open, to compensate for increased image blur that would otherwise result from selection of such a non-standard size and/or a non-standard focal length photographing mode. Specifically, for a standard display size and standard focal length photographing mode (i.e. non-pseudo-telephoto and non-pseudo-panoramic), an initial aperture setting would first be determined that meets the scene requirements by providing sufficient depth-of-field to capture the entire range of subject distances (e.g. 4 feet (approximately 1.2 m) to infinity) without re-focusing the camera lens. Thereafter, an initial shutter speed would be determined, such as illustratively through use the FOCAL_LENGTH_FACTOR to determine a speed based upon the longest time during which the camera can be held steady. Then, if the photographer were to choose a non-standard display size and/or a non-standard focal length photographing mode, the aperture setting would be adjusted to a new setting that, owing to the increased image blur that would otherwise result, maintains the same hyperfocal distance, depth-of-field and hence blur circle on the print between both the standard and selected non-standard sizes and between the standard and selected non-standard focal length photographing modes. Specifically, the maximum lens aperture setting appropriate for the standard display size would be multiplied, prior to image capture, by the inverse of the DSF to obtain the maximum lens aperture setting appropriate for the non-standard display size and non-standard focal length photographing mode. Given this new aperture setting, the shutter speed would then be multiplicatively increased by the value of the DISPLAY_SIZE_FACTOR, to compensate for the increased blur that would otherwise occur in the non-standard display size and non-standard focal length photographing mode. In this manner, both the initial shutter speed and lens aperture setting would essentially define corresponding lower limits (i.e. a slowest usable shutter speed for the current image being captured and a largest lens opening) for the image currently being captured. Through use of this simple technique, an inexpensive camera, which would not possess the sophistication to determine the existence of and incrementally use extra system speed, would nevertheless implicitly use system speed, through more restrictive lens aperture and shutter speed settings, to compensate for increased image blur that would otherwise occur in the print in enlarging an image on a common negative from a standard to a non-standard display size and/or for a non-standard focal length photographing mode. Inasmuch as the resulting exposure settings are more restrictive than those required for a standard sized print, i.e. the former settings would require additional ambient light to produce a normal exposure than the latter, then, of necessity, an accompanying flash unit would then be energized at an increased ambient light level to produce a normal exposure for a non-standard display size and/or a non-standard focal length photographing mode.

In essence, the exposure settings for use in producing a non-standard print in a simple, fixed-focus camera would be readily determined by multiplying the aperture setting for a standard sized (e.g. a 3½" by 5") print photographed through a standard focal length photographing mode by the inverse of the DISPLAY_SIZE_FACTOR associated with the non-standard sized print (and/or for the non-standard focal length photographing mode), and by multiplying the maximum (slowest) hand-held shutter speed used for the standard sized print by the DISPLAY_SIZE_FACTOR to yield an appropriate maximum hand-held shutter speed for use with the non-standard sized print (and/or non-standard focal length photographing mode).

In this regard, consider the following illustrative example set forth in Table 2 below. Here, a typical 3½" by 5" print, photographed through a standard focal length photographing mode, is taken as a standard size. In Case 1, which provides a baseline for a simple fixed-focus camera focused at 8 feet (approximately 2.4 m) and as shown in the table, a lens aperture setting of f/7.3 provides a depth-of-field that extends from 4 feet (approximately 1.2 m) to infinity. Inasmuch, as this camera is likely to be compact and difficult to hold steady over a prolonged interval, a focal length factor is taken to be 0.5. Also, this example assumes use of a film with an ISO (ASA) film speed of 400 and a lens with a 30 mm focal length. Now, as indicated in Case 2 below, assume that a photographer selects use of a pseudo-panoramic focal length photographing mode to yield a non-standard display size of 3½" by 10" (approximately 8.9 cm by 25.4 cm). This would necessitate use of a reproduction magnification ratio of 7.6 rather than 3.9 as for the standard sized print. In order to provide an appropriate lens aperture setting that will maintain the depth-of-field and hence the size of the blur circle, as perceived on both the resulting standard and panoramic sized print, the lens aperture would need to be 7.3 multiplied by the inverse of the DISPLAY_SIZE_FACTOR (i.e. 0.625) or approximately 11.6. Similarly, the maximum hand-held shutter speed would be 0.01666 sec multiplied by 0.625 or approximately 0.0104 sec. Inasmuch as both the shutter speed has been reduced (became faster) and a smaller lens aperture has resulted, the minimum ambient light level needed to produce a normal exposure has correspondingly increased (from 30.96 to 127.28 foot-lamberts). As such, to compensate from the reduced amount of light produced by these restrictive lens aperture and shutter speed settings and hence produce a normal exposure for a 3½" by 10" print, an accompanying flash unit would need to provide supplemental illumination at a higher ambient light level than that needed to produce a standard 3½" by 5" print. We have produced the various resulting values, such as the DISPLAY_SIZE_FACTOR and as set forth in this table (as well as in tables 2 and 3 that follow), by computer implementation of the pertinent formulas set forth above.

TABLE 2

DISPLAY SIZE FACTOR BASED CORRECTION OF MAGNIFICATION INDUCED IMAGE BLUR RESULTING FROM USE OF NON-STANDARD DISPLAY SIZES IN A SIMPLE, FIXED-FOCUS CAMERA
(400 speed film and 30 mm lens, camera focused at 8 feet)

|  | Case 1 (Baseline) | Case 2 |
|---|---|---|
| Standard Print | | |
| Reproduction Magnification Ratio | 3.900 | 3.900 |
| Width Dimension (in.) | 3.500 | 3.500 |
| Length Dimension (in.) | 5.000 | 5.000 |
| Print Diagonal (in.) | 6.103 | 6.103 |
| Viewing Distance (in.) | 12.548 | 12.548 |
| Std. Blur Circle Criteria (in.) | .002 | .002 |
| Std. Focal Length Factor | .500 | .500 |
| Non-Standard Print | | |
| Reproduction Magnification Ratio | 3.900 | 7.600 |
| Width Dimension (in.) | 3.500 | 3.500 |
| Length Dimension (in.) | 5.000 | 10.000 |
| Print Diagonal (in.) | 6.103 | 10.595 |
| Viewing Distance | 12.548 | 15.265 |
| DISPLAY_SIZE_FACTOR | 1.000 | .625 |
| ADJUSTED_BLUR_CIRCLE_CRITERIA (in.) | .00200 | .00125 |
| ADJUSTED_FOCAL_LENGTH_FACTOR | .500 | .312 |
| F_NUMBER of maximum permissible aperture | 7.265 | 11.639 |
| Longest hand-held shutter time (sec.) | .0166 | .0104 |
| Minimum Ambient light level for normal exposure (foot-lamberts) | 30.960 | 127.278 |
| Effective Hyperfocal Distance (ft.) | 8.000 | 8.000 |

Another severable portion of the inventive process involves use of the DISPLAY_SIZE_FACTOR in cameras that employ multiple autofocusing zones in order to permit these cameras to provide, upon subsequent enlargement, images at non-standard sizes and/or at non-standard focal length photographing modes with, in a number of instances, significantly increased quality over that which presently occurs. As described above, depth-of-field is a function of the blur circle and the aperture size. Hence, the inverse of the DSF, when multiplied by the aperture setting of the lens in use, yields an adjusted aperture setting that preserves the blur circle and depth-of-field on a print between non-standard and standard display sizes and between standard and non-standard focal length photographing modes. Accordingly, in cameras known in the art that contain some degree of exposure control (clearly much less sophisticated than that described in connection with FIGS. 3–14 above) and several zones of autofocusing but clearly no subject thickness measurement, the maximum lens aperture, that is appropriate for the specified number of autofocusing zones, is frequently determined during camera design and manufacture as that which imparts a desired depth-of-field in order to provide overlap of the autofocusing zones, thus providing the ability to capture images of subjects at nearly any distances, while maintaining a given pre-defined blur circle limit.

Through inclusion and use of the DSF, these particular cameras can provide increased image quality, to a significant extent, for user selection of a non-standard display size and a non-standard focal length photographing mode. Specifically, the maximum lens aperture value, that is appropriate for the specified number of autofocusing zones, would be an initial value determined during camera design and associated with a standard display size and standard focal length photographing mode but then multiplied, prior to image capture, by the inverse of the DSF. The resulting shutter speed would also be an initial value (typically the maximum hand-held shutter time) multiplied by the DSF. By adjusting the lens aperture and shutter speed settings in this manner, the blur circle on the print will be preserved for non-standard display sizes and non-standard focal length photographing modes. If the maximum lens aperture setting were not changed in this fashion, then the image on a resulting non-standard size print, particularly for relatively thick subjects or subjects located at a distance near the intersection of adjacent autofocusing zones, may appear blurred due to increasing image blur for non-standard display sizes and/or non-standard focal length photographing modes that require increased reproduction magnification ratios. In essence, the use of the DSF in such a camera will effectively impart a program shift of the exposure settings that is appropriate for a desired non-standard display size and non-standard focal length photographing mode. While these known cameras do not measure subject thickness and hence are incapable of determining a lens aperture setting that actually satisfies the scene requirements (in contrast with that which occurs with our invention), nevertheless adjusting the maximum lens aperture and the shutter speed, based upon use of the DSF, will still yield significant improvements in image quality by compensating for increased image blur that would otherwise occur when enlarging a photographed image to a non-standard display size or through a reproduction magnification ratio associated with a non-standard focal length photographing mode.

In this regard, since autofocusing requirements are generally based on the most restrictive (wide-open) lens aperture setting, the inverse of the DSF when multiplied by the limiting lens aperture value for a standard sized (e.g. a 3½" by 5") print, taken under a standard focal length photographing mode, yields a new lens aperture value for the non-standard sized print and/or print taken through a non-standard focal length photographing mode that maintains the original hyperfocal distance, and hence the original depth-of-field (also abbreviated hereinafter as "dof") which provides intersection of adjacent autofocusing zones. If a standard autofocusing program is designed to provide dof overlap (to accommodate thick subjects) at the intersection of adjacent zones (which is typical for most cameras), the new aperture setting for the non-standard display size and/or non-standard focal length photographing mode will maintain this same overlap.

To obtain a full understanding of use of the DSF for correcting magnification-induced image blur in cameras that employ multiple autofocusing zones—but not the exposure optimization process set forth above, consider the following illustrative examples provided in Tables 3 and 4 below.

With respect to Table 3, here, again a 3½" by 5" print, taken with a standard focal length photographing mode, is taken as a standard display size. This table assumes use of a film with an ISO (ASA) film speed of 100 and a lens with a 50 mm focal length. The first three cases in this table consider pictures taken with a standard focal length photographing mode but enlarged to increasingly larger display sizes, while the fourth case addresses a image enlarged into a standard sized print but through a pseudo-telephoto mode.

In Case 1, which provides a baseline for an autofocusing camera, the camera typically has a conventional active infra-red autofocusing system capable of measuring distances up to approximately 20 feet (approximately 6.1 m) and provides five separate autofocusing zones. As indicated, a lens aperture of approximately f/4 is required to obtain a hyperfocal distance of 40 feet (approximately 12.2 m). With the camera being focused at each "focus point", the dof extends to the adjacent values noted as "switch points". For example, with this camera focused at 8 feet (approximately 2.4 m), the dof extends from 6.66 to 10 feet. This camera provides no overlap between adjacent autofocusing zones; hence, the Cross-over DOF ratio is 1.0. Owing to ranging distance limitations, the farthest useful switch point is 20 feet (approximately 6.1 m); hence, the farthest focus point is 40 feet. Inasmuch as this camera is likely to be relatively large and easy to hold steady (at least more so than the illustrative camera described for the example set forth in Table 2 above), the standard focal length factor is set to 1.0. Now, consider Case 2, which utilizes the same camera to capture an image that will be subsequently enlarged to a 5" by 7" (approximately 12.7 cm by 17.8 cm) print. This enlarged display size requires an reproduction magnification ratio (abbreviated below as "Repro. Mag. Ratio") of 5.6. To determine the appropriate aperture setting that maintains the hyperfocal distance between the standard and non-standard display sizes and dof, thereby assuring proper intersection of the autofocusing zones, the aperture setting associated with the standard sized display (approximately f/4.0) is multiplied by the inverse of the DSF (here 1/.79=1.27) to yield the new lens aperture value of approximately f/5.1. In addition, the maximum hand-held shutter speed has been reduced to 0.0159 sec. by multiplying the maximum hand-held shutter speed associated with the standard size display (i.e. 0.02) by the DSF. Furthermore, since the resulting lens aperture and shutter speeds are more restrictive than those associated with the standard size display size, the minimum ambient light level for an ISO normal exposure has correspondingly increased from approximately 31.9 to 64.5 footlamberts, hence indicating that a supplemental flash unit would need to be fired at a higher ambient light level than that needed for the same image but captured for the standard size display.

Continuing with the examples shown in Table 3, now consider Case 3 which utilizes the same camera to capture the same image but which where this image will be subsequently enlarged to a non-standard 8" by 10" print (which is larger than both the 3½" by 5" standard size and 5" by 7" prints). This case requires an reproduction magnification ratio of 8.9. The appropriate aperture setting to capture the image is the original aperture setting (approximately f/4) multiplied by the inverse of the applicable DSF (here 1/0.566=1.77), i.e. approximately f/7.1. This new setting maintains the desired hyperfocal distance, image blur and intersection of the autofocusing zones between the standard and 8" by 10" non-standard display sizes. As expected, the shutter time suited for use in capturing the image again decreases and specifically is the original shutter speed (0.02) multiplied by the DSF (0.566), i.e. 0.0113 seconds. Again, owing to the increasingly restrictive lens aperture and shutter speed settings over those associated with Cases 1 and 2, the minimum ambient light level for an ISO normal exposure substantially increased (here from approximately 31.9 to 176.0 footlamberts).

With the above in mind, consider the use, as shown in Case 4, of a 2× pseudo-telephoto mode (as selected by a photographer through a focal length photographing mode switch, as described above) in conjunction with a standard 3½" by 5" print. A reproduction magnification ratio of 7.8 is required to produce this mode on this display size. Although the print size has not changed and hence neither has the viewing distance, the reproduction magnification ratio must increase (effectively double) to produce the desired pseudo-telephoto effect. In essence, the image captured with the 50 mm lens but with an additional 2× printing magnification to effectuate pseudo-telephoto produces the same final image size that would result from use of a 100 mm lens and a standard reproduction magnification ratio. Here too, the new aperture setting appropriate for the resulting pseudo-telephoto print is the original aperture setting for the standard sized print (approximately f/4) multiplied by the inverse of the applicable DSF (here 1/0.5=2), i.e. approximately f/8. This new lens aperture setting maintains the desired hyperfocal distance (40 feet) and dof in order to maintain and assure proper intersection of the autofocusing zones at their original values. The maximum hand-held shutter speed has been reduced, from 0.02 to 0.01 seconds, consistent with use of the DSF. As expected, owing to these rather restrictive lens aperture and shutter speed settings, the maximum ambient light level for an ISO normal exposure has substantially increased from 31.9 to 254.8 foot-lamberts.

TABLE 3

DISPLAY SIZE FACTOR BASED CORRECTION OF MAGNIFICATION INDUCED IMAGE BLUR RESULTING FROM USE OF NON-STANDARD DISPLAY SIZES IN A CAMERA WITH MULTIPLE AUTOFOCUSING ZONES
(100 speed film, 50 mm lens and five autofocusing zones)

|  | Case 1 (Baseline) | Case 2 | Case 3 | Case 4 |
|---|---|---|---|---|
| Standard Print |  |  |  |  |
| Repro. Mag. Ratio | 3.900 | 3.900 | 3.900 | 3.900 |
| Width (in.) | 3.500 | 3.500 | 3.500 | 3.500 |
| Length (in.) | 5.000 | 5.000 | 5.000 | 5.000 |
| Print Diagonal (in.) | 6.103 | 6.103 | 6.103 | 6.103 |
| Viewing Dist. (in.) | 12.548 | 12.548 | 12.548 | 12.548 |
| Std. Blur Circle Crit. (in.) | .002 | .002 | .002 | .002 |
| Std. Focal Length Factor | 1.000 | 1.000 | 1.000 | 1.000 |
| Non-Standard Print |  |  |  |  |
| Repro. Mag. Ratio | 3.900 | 5.600 | 8.900 | 7.800 |
| Width (in.) | 3.500 | 5.000 | 8.000 | 3.500 |
| Length (in.) | 5.000 | 7.000 | 10.000 | 5.000 |
| Print Diagonal (in.) | 6.103 | 8.602 | 12.806 | 6.103 |
| Viewing Dist. (in.) | 12.548 | 14.238 | 16.198 | 12.548 |
| DISPLAY_SIZE_FACTOR | 1.000 | .790 | .566 | .500 |
| ADJUSTED_BLUR_CIRCLE_CRITERIA (in.) | .00200 | .00158 | .00113 | .00100 |
| ADJUSTED_FOCAL_LENGTH_FACTOR | 1.000 | .790 | .566 | .5000 |
| F_NUMBER of maximum permissible aperture | 4.036 | 5.109 | 7.136 | 8.073 |
| Longest hand-held shutter time (sec.) | .0200 | .0159 | .0113 | .0100 |
| Minimum ambient light level for normal exposure (foot-lamberts) | 31.852 | 64.546 | 175.984 | 254.818 |
| Effective Hyperfocal Distance (ft.) | 40.000 | 40.000 | 40.000 | 40.000 |
| Cross-over DOF Ratio | 1.000 | 1.000 | 1.000 | 1.000 |

| Switch Points (ft.) | Focus Points (ft.) |
|---|---|
| 20.000 | 40.000 |
| 10.000 | 13.333 |
| 6.666 | 8.000 |
| 5.000 | 5.714 |
| 4.000 | 4.444 |

With the examples shown in Table 3 in mind, consider Case 1 in Table 4 in which the aperture setting appropriate for the standard display size and standard focal length photographing mode has been changed from f/4 to f/8.1 to provide a 50% overlap between adjacent autofocusing zones, i.e. the Cross-over DOF ratio has been set to 2.0. This particular example serves as a baseline for this table. In particular, with a 50% overlap, the near dof for one zone overlaps with a far dof for the next successive zone. For example, if the camera were focused at 8 feet, the dof would extend from 5.7 to 13.3 feet (approximately 1.7 m to 4.1 m). Although the DSF has not changed from that shown in Case 1 in Table 3, the hyperfocal distance has been reduced to 20 feet to provide the extra dof required to produce the 50% overlap.

With the baseline photographic condition established in Table 4, assume a photographer has now instructed the camera, such as through display size switch 206 s described above in conjunction with FIG. 2, to capture an image for subsequent enlargement to a non-standard 5" by 7" size. For simplicity, this image is being captured using a standard focal length photographing mode. As shown in Table 4, this situation requires a reproduction magnification ratio of 5.6. The lens aperture setting appropriate for this particular non-standard display size is determined by multiplying the lens aperture setting associated with the standard display size (approximately f/8.1) by the inverse of the DSF (here $1/0.79=1.27$), i.e. approximately f/10.2. This new lens aperture setting will maintain the desired hyperfocal distance (here 20 feet) and the same 50% overlap of the autofocusing zones and hence preserve the same perceived blur circle in both the standard and non-standard size prints. Again, the shutter speed is reduced, here from 0.020 to approximately 0.016 seconds through use of the DSF. Also, the increasingly restricted lens aperture and shutter speed settings increase, as expected, the minimum ambient light level necessary for an ISO normal exposure from 127.4 to 258.2 foot-lamberts.

TABLE 4

DISPLAY SIZE FACTOR BASED CORRECTION OF MAGNIFICATION INDUCED IMAGE BLUR RESULTING FROM USE OF NON-STANDARD DISPLAY SIZES IN A CAMERA WITH MULTIPLE AUTOFOCUSING ZONES
(100 speed film, 50 mm lens and five autofocusing zones)

|  | Case 1 (Baseline) | Case 2 |
|---|---|---|
| Standard Print |  |  |
| Reproduction Magnification Ratio | 3.900 | 3.900 |
| Width Dimension (in.) | 3.500 | 3.500 |
| Length Dimension (in.) | 5.000 | 5.000 |
| Print Diagonal (in.) | 6.103 | 6.103 |
| Viewing Distance (in.) | 12.548 | 2.548 |
| Std. Blur Circle Criteria (in.) | .002 | .002 |
| Std. Focal Length Factor | .500 | .500 |
| Non-Standard Print |  |  |
| Reproduction Magnification Ratio | 3.900 | 5.600 |
| Width Dimension (in.) | 3.500 | 5.000 |
| Length Dimension (in.) | 5.000 | 7.000 |
| Print Diagonal (in.) | 6.103 | 8.602 |
| Viewing Distance | 12.548 | 14.238 |
| DISPLAY_SIZE_FACTOR | 1.000 | .790 |
| ADJUSTED_BLUR_CIRCLE_CRITERIA (in.) | .00200 | .00158 |
| ADJUSTED_FOCAL_LENGTH_FACTOR | 1.000 | .790 |
| F_NUMBER of maximum permissible aperture | 8.073 | 10.215 |
| Longest hand-held shutter time (sec.) | .0200 | .0159 |
| Minimum Ambient light level for normal exposure (foot-lamberts) | 127.409 | 258.182 |
| Effective Hyperfocal Distance (ft.) | 1.000 | 20.000 |
| Cross-over DOF Ratio | 2.000 | 2.000 |

| Switch Points (ft.) | Focus Points (ft.) |
|---|---|
| 20.000 | 40.000 |
| 10.000 | 13.333 |
| 6.666 | 8.000 |
| 5.000 | 5.714 |
| 4.000 | 4.444 |

Of course, rather than calculating the appropriate exposure settings immediately prior to image capture, pairs (a "program") of appropriate lens aperture and corresponding shutter speed settings (and, where applicable, flash parameters) for each different permissible display size, each different focal length of an actual lens that can be used and each different focal length photographing mode that could be used with that lens could be pre-stored in the camera. Then, based upon the selected display size, the focal length of the actual lens in use and the selected focal length photographing mode, the proper program would be selected. Given the appropriate lens aperture for a standard size print, the program would delineate the corresponding pair of lens aperture and shutter speed settings to use in capturing the current image. By virtue of the DSF and the need to maintain constant autofocusing zones, hyperfocal distances and perceived levels of image blur, any change in the selected display size or in the focal length photographing mode, away from a standard focal length photographing mode and standard size print, would cause a corresponding so-called "program shift" of the resulting lens aperture and shutter speed values.

Moreover, as one can now appreciate, based upon e.g. considerations of cost and desired performance, portions of our inventive process ranging from merely one simple aspect—such as using DEPTH_NUMBER to select the appropriate lens aperture or selecting shutter speed to minimize camera shake, to more complex portions—such as determining the appropriate lens aperture based upon scene depth-of-field requirements coupled with using extra system for intentional overexposure or determining whether or not to use fill flash, to the entire process can be utilized in many different cameras. By incorporating selectively larger portions of the inventive process into appropriate cameras, a manufacturer can readily provide a wide variety of cameras offering widely differing levels of automated sophistication that nevertheless will all provide, though to varying degrees based upon the amount of the inventive process that is used, overall image quality that is significantly improved over that generally obtainable from cameras of comparable cost and/or complexity known in the art.

H. Various Illustrative Extensions and Modifications to the Invention

Clearly, by now those skilled in the art recognize that our inventive process can be extended and/or modified in numerous ways based upon the specific application.

In particular, as noted above, our inventive process utilizes knowledge based rules to determine the appropriate exposure settings and flash parameters in a photographic situation. Some of these rules, such as the amount of extra system speed that remains after intentional over- or under-exposure, are implemented through table look-up operations; while other rules, such as those regarding the determination of the initial amount of extra system speed, are implemented by real-time calculation of various equations. For any specific application of our inventive exposure control process, these rules can be implemented either way depending upon the cost, processing throughput and sophistication of the associated camera microcomputer. In that regard, an implementation of our process could rely on using look-up operations into ROM based tables where the results of each step of the inventive process have been pre-defined for a variety of input conditions and are coupled with interpolation, where appropriate, rather than separately stepping through the entire process for each successive image being photographed. The size of each table is defined by the cost of additional memory and its attendant size and circuitry requirements. Alternatively, to reduce the size of the tables, certain relatively simple portions of the process, such as those illustratively discussed above, could be implemented through executing software based calculations while other portions that would otherwise rely on calculating relatively complex time-consuming equations could instead be implemented using table look-up operations. In this manner, the benefits achievable through both approaches would be readily realized in practice.

Furthermore, although our inventive process has been described in detail as utilizing a specific arrangement of distinct steps and discrete processes, many of these steps and/or processes can be combined as necessary or desirable in a given implementation. Moreover, although we have described one specific prioritized manner in which extra system speed is utilized in each separate lighting condition, i.e. ambient, fill or full flash, to initially provide what we believe are the most dramatic improvements in image quality or power reductions followed by increasingly less noticeable improvements, other different prioritized schemes of incrementally consuming available extra system speed can be used instead, if desired. For example, in a full flash situation as described above, we utilize available extra system speed first to appropriately throttle back the output power produced by the flash unit (assuming an energy saving flash unit is being used) to permit rapid re-charging of the flash and then to provide spread or bounce flash illumination. Alternatively, a camera manufacturer could elect to utilize extra system speed to first provide spread or bounce flash illumination over saving available flash power. Alternatively, in an ambient lighting situation as discussed above, we have decided to utilize extra system speed first to increase the shutter speed (decrease the time during which the shutter is open) to reduce camera shake, then to account for intentional changes in film exposure and finally to readjust the lens aperture to a smaller size to impart additional depth-of-field to a resulting photograph beyond that required by the scene currently being photographed. Clearly, a change in lens aperture could be made first prior to increasing the shutter speed, though the resulting benefit to image quality by a sharpened background would usually be significantly less than reducing image blur. In any event, many other changes readily apparent to those skilled in the art can be made to the prioritized schemes specifically set forth above to incrementally consume available extra system speed. Furthermore, several different such schemes could be available with selection of a specific scheme to use in any one photographic situation being made by the camera microcomputer, that implements our inventive exposure control system, based upon applicable rules. For example, the camera, based upon lighting conditions of a scene, could signal the photographer to connect a tripod to the camera. Once the camera microcomputer senses that the camera is connected to the tripod and is thus likely to remain stable over a prolonged exposure period, the microcomputer could then switch to a prioritized scheme that favors increased lens apertures over shortened shutter speeds in order to consume available extra system speed in a manner that improves image quality. Alternatively, if the photographer set a switch on the camera indicating that a tripod was not available, or the camera itself detected that a tripod was not connected to the camera after a fixed time-out interval occurred, then a scheme, such as that described in detail above, which favors shortened shutter speeds to minimize camera shake and image blur over smaller lens apertures would instead be selected and utilized. Generally speaking, the camera microcomputer, using appropriate input sensors and/or through other well known techniques can readily determine all the specific photographic resources that are currently available to the photographic system for use in taking each photograph. For example, the input sensors could illustratively include a microswitch to determine if a tripod is connected to the base of the camera. In addition, the microcomputer could send out appropriate queries on its communications link to identify all units connected thereto and thereafter receive corresponding response messages from each such unit with its relevant photographic parameters (i.e. perform a so-called "resource check"). Once these available resources have been ascertained, the microcomputer could then choose and subsequently utilize the specific prioritized scheme that is most likely to improve the resulting image quality given the specific resources that are currently available. Since photographers often do not shoot a complete roll of film under the same photographic conditions, this process of ascertaining system resources and selecting one of a number of different schemes could be repeated, as often as necessary, prior to activating the shutter for each successive photograph in order to account for any changes in available system resources, select the most suitable prioritized scheme and accordingly choose the exposure settings and flash parameters, as appropriate, to maximally improve—to the extent possible—the quality of the resulting image.

In addition, cameras that are designed for serious amateur and/or professional photographers can nevertheless benefit from inclusion of our inventive process. However, in these cameras, various constants, proportionality factors and/or tables, as appropriate, that are used in our inventive process could be replaced with user controls in order to impart a degree of variability to our process that enables the photographer to customize the response of the process and the camera to his or her desires while still benefiting from quality improvements obtainable through use of the inventive process.

Furthermore, our inventive process has been described as relying on only two points in the scene to define subject thickness; namely, primary subject (foreground) distance and background subject distance. Alternatively, our inventive process could utilize three or, where appropriate, more points to define scene depth. In this instance, pixellated scene sensors and accompanying image processing circuits could be used to measure distances and light levels of a number of points in the scene. These points could either be pre-determined or, preferably, selected based upon an automatic identification of various elements (e.g. foreground subjects) in the scene. The distance and light level associated with each measurement point (here being a different pixel) could then be appropriately weighted, based upon an appropriate identification of that point as a pre-defined portion of a given element (e.g. foreground or background) of the scene, in order to yield corresponding weighted measures. These measures would, in turn, be employed to provide scene light levels and subject distances for subsequent use by our inventive process.

In particular, once the foreground and background portions of the scene are grossly identified, typically through rangefinder measurements, distance and light level measurements could be made using a pixellated area sensor. Given the generally overwhelming importance of accurately capturing the foreground portion of the scene in providing high quality photographic images, more measurement points could be used to assess the foreground than those used to assess the background portion of the scene. For example, two measurement points could be used for the primary subject and one for the background. In this case, the primary subject distance would be broken into two distances: a distance to a main subject in the foreground and a distance to a background subject in the foreground. These two foreground distances when coupled with the distance to the actual background in the scene would yield a three point measurement of scene depth. The required depth-of-field would then be chosen based upon the largest distance associated with these three points. The light level for each of these three points would also be measured and then weighted to yield appropriate values for the subject light levels. Advantageously, such a three point measurement could handle distances in front of the main subject. In this regard, since depth-of-field is more restrictive at subject distances that are close to the camera (near depth-of-field) than farther away (far depth-of-field), the inventive process could automatically elect to utilize the formula, as set forth above, for near depth-of-field (either for close-up photography or not, as appropriate) in lieu of that for the far depth-of-field in order to meet the requirements of the current scene being photographed. As such, a lens aperture setting would be selected that provides a depth-of-field that more accurately matches the current scene requirement than that which might otherwise occur.

In general, increasing the number of measurement points in the scene, for measuring distance and light levels, would likely yield increasingly accurate assessments of the scene requirements, including the necessary depth-of-field needed to fully capture the scene, as well as the extra system speed that may currently exist to photograph the scene. As all these assessments become more accurate, increasingly higher levels of overall image quality would likely result from use of our inventive process. However, as the number of measurement points increase so does the cost and complexity of the accompanying image sensors and processing electronics that would be needed to sense and process data for these points. With currently available electro-optical and electronic technology, we have found that two measurement points provide a very satisfactory compromise in terms of cost, implementational complexity and ensuing improvements in image quality.

Furthermore, the exposure settings, measured scene parameters and/or flash parameters appropriate to a photographed image could be stored on the negative in the vicinity of the frame for that image. During digital or optical enlargement and printing, an automated printer could read the values of these settings and/or parameters and appropriately regulate the printing exposure in a manner that reduces printing errors. Specifically, if the image on the negative includes intentional over-exposure, then the amount of over-exposure, expressed for example in stops of system speed, could be encoded onto the negative. Hence, the printer, after having read the amount of over-exposure existing in the negative, would then accordingly alter its printing algorithm(s) to provide optimal image quality on the print. Furthermore, other printing-based exposure values could be selected, as appropriate, based upon encoded data recorded for each photographed image on the negative in order to assure, to the extent possible, that the printed image is transferred, on an enlarged basis, from the negative to paper with little, if any and preferably no, resulting degradation in image quality. In fact, these encoded parameters might even permit the printer, in certain situations (such as e.g. slight underexposure) to even enhance image quality beyond that on the negative in order to compensate for various film or camera based limitations, artifacts or even certain photographic errors inherent in a given exposure. These image enhancements may illustratively include noise suppression, sharpness enhancement or tone scale modifications.

In addition, while we have described our invention as incorporating a focal length photographing mode switch that permits a photographer to select one of only a finite number of different effective focal lengths, this switch could be replaced by a continuously adjustable, e.g. linear, control. Through this control, the photographer could specify a desired amount, such as on an absolute or relative basis, through which, during photofinishing, a photo-printer is to subsequently enlarge a current image stored on the negative through a corresponding reproduction magnification ratio to occupy the entire selected display size. This assumes, of course, that the photo-finishing equipment is capable of supporting this type of variable enlarging. In use, during image capture, the camera microprocessor would read the setting of this control and, through film encoder 288 (see FIG. would record, on the film and in the vicinity of the frame for this image, the associated amount of enlarging therefor. Based upon the desired amount of enlarging, the photo-printer would determine the appropriate reproduction magnification ratio to generate a full sized image for the desired display size. In essence, this methodology would provide the photographer with the ability to continuously vary, within a finite range, the effective focal length of the final image. For purposes of generating optimized exposure parameters, the camera microprocessor would determine, typically through a table look-up operation (as described above) and interpolation of accessed values, a corresponding value of the DISPLAY_SIZE_FACTOR based upon the selected display size and the desired effective focal length and then use that value in subsequently optimizing these parameters, in the manner set forth above, for a current image then being captured.

Furthermore, while we have described our invention as utilizing a switch to select among a finite number of different display sizes, this switch could also be replaced by a continuously variable, e.g. a linear, control to allow the photographer to precisely specify the display size of the ensuing printed image and permit the camera to provide the requisite amount of correction to the exposure settings in order to maintain a constant blur circle on the print, as perceived by a viewer. This assumes, of course, that a photo-printer would support user selection of any reproduction magnification ratio existing within a continuous range.

Moreover, although our inventive process and apparatus has been described in the context of use with a photographic camera, and specifically a 35 mm camera, our invention could be utilized in any nearly any image capturing device and nearly any image sensor—whether, for example, photographic or electro-optical —that utilizes scene illumination coupled with lens aperture and shutter speed settings (or the equivalent) to form a replica of the image(s) of a scene. These devices can illustratively include photographic cameras of substantially any type or film format or film type, or other electronic cameras whether still frame, motion or both that employ illustratively either charge coupled devices (CCD) or vidicon based imagers. Regardless of the specific image sensor used in an image capturing device, i.e. whether that sensor is illustratively photographic film or an electro-optic imager, that sensor may possess may possess a unique exposure vs. quality function. This function may depend on, for example, frequency response, noise, tone reproduction, color reproduction and/or dynamic range. With a knowledge of the proper parameters and their inter-relationships appropriate to a given image capturing device, the rules, including the various formulas, set forth above can be readily modified, in ways that would be readily apparent to those skilled in the art, to optimize the resulting quality of the images by selecting the preferred exposure and illumination conditions in any imaging situation that are appropriate for that specific device. Specifically, the parameters and their associated values that dictate optimum quality for a photographic image are likely to be quite different from the appropriate parameters and their corresponding values for an electronic camera that uses an electro-optic imager. Nevertheless, the parameters appropriate to a specific image capturing device can be optimized in the general manner set forth above to first determine the existence and amount of extra system speed available in a current imaging situation and second utilize that extra system speed in a pre-defined, e.g. prioritized incremental, manner which is specific to that image capturing device and its image sensor and which provides improved image quality over an appropriate standard exposure applicable to that device. In addition, with suitable modifications that are readily apparent to those skilled in the art to the formulas set forth above, our inventive process could be readily adapted to function to properly set exposures taken with light of a wide variety of wavelengths, e.g. infra-red or ultra-violet, and not just the visible spectrum.

Furthermore, while our invention has been described above in terms of user selectable non-standard display sizes and non-standard focal length photographing modes for hand-held prints, the teachings of our invention are equally applicable to different display formats, e.g. transparencies or video images (such as of a photograph stored on a CD-ROM and displayed on a television set). To optimize camera exposure (and, where appropriate, flash) parameter settings at the time of image capture for a different display format other than prints, a different viewing distance equation than that used in equation (19) above, would be used to empirically relate viewing distance to display size for that specific format. This new equation would be substituted for equation (19) to define the viewing distances for both standard and non-standard size displays. The value of the DISPLAY_SIZE_FACTOR would then be determined based upon these distances and the appropriate reproduction magnification ratios for the corresponding display sizes. In this regard, if reversal film were to be loaded into the camera, the camera microprocessor could then detect, through the DX contacts, the use of such film and suitably access a different table of pre-stored DISPLAY_SIZE_FACTOR values, that are based upon a proper perceptually-based viewing distance equation and corresponding reproduction magnification values, particular to transparencies. In addition, since the blur circle criteria of these display format may change from that associated with traditional photographic images and enlargements therefrom, the blur circle criteria and its use, as described above, may need to be suitably changed accordingly, though any such change would be readily apparent to those skilled in the art.

Although one complete embodiment of the present invention, as well as various severable portions thereof and various extensions and modifications to this embodiment, has been shown and described in detail herein, many other varied embodiments that incorporate the teachings of our invention may be very easily constructed by those skilled in the art.

INDUSTRIAL APPLICABILITY AND ADVANTAGES

The present invention is useful in photographic cameras, and particularly within automatic exposure control apparatus that is often incorporated in these cameras, to produce pictures that exhibit an increased overall quality level over that obtainable through such cameras known in the art and particularly for user selected non-standard display sizes and/or non-standard focal length photographing modes. Through use of the invention, a photographer first selects a desired display size and/or a focal length photographing mode. Thereafter, exposure settings (and where suitable flash parameters) are automatically optimized for that size and focal length photographing mode based upon scene requirements, such as providing sufficient depth-of-field, adequate film exposure and avoiding image blur, and film quality characteristics. Where appropriate, these settings deviate from corresponding normal exposure values obtained by adhering to the ISO/ANSI exposure standards in order to provide image quality for the desired display size and focal length photographing mode that is superior to that which would otherwise result from adhering to these standards.

I claim:

1. A method for use in an image capturing device for capturing an image of a scene on a frame of photographic film wherein the image as captured on the frame will be subsequently enlarged, in a manner defined by a pre-defined display characteristic, into an output image, said device having autofocusing capability with a number of autofocusing zones and further having a shutter speed and a lens with respectively a variable shutter speed and a variable lens aperture associated therewith, said method comprising the steps of:

first determining an initial lens aperture value suitable for use with said number of autofocusing zones and associated with a standard display characteristic;

first ascertaining an initial shutter speed value which, in combination the initial lens aperture value, will produce a baseline exposure of said scene;

second determining, in response to said pre-defined display characteristic, a new lens aperture value such that a corresponding hyperfocal distance for one of said autofocusing zones remains substantially constant between said pre-defined and standard display characteristics such that an amount of depth-of-field overlap between adjacent ones of said zones will be substantially maintained between said pre-defined and standard display sizes and said captured image, when enlarged in said manner, will possess an amount of image blur that does not exceed a pre-defined amount of image blur associated with said standard display characteristic;

second ascertaining a new shutter speed value which, in combination with said new lens aperture value, will produce a baseline exposure of the scene;

capturing an image of said scene using said new lens aperture and shutter speed values; and printing, on said film and in a vicinity of said frame, data indicative of the pre-defined display characteristic.

2. The method in claim 1 wherein the pre-defined display characteristic is either a pre-defined value of display size of said output image or a pre-defined reproduction magnification ratio that will be used in forming said output image, and said standard display characteristic is a pre-determined standard display size and a pre-determined standard reproduction magnification ratio associated therewith.

3. The method in claim 2 wherein said second determining step comprises the step of ascertaining said new lens aperture by multiplying the initial lens aperture value by an inverse of a pre-defined display size factor (DSF), appropriate to the pre-defined display characteristic; and said second ascertaining step comprises the step of ascertaining said new shutter speed by multiplying the initial value of shutter speed by the pre-defined DSF.

4. The method in claim 3 wherein said second determining step further comprising the steps of:

reading a selected value, from an input control, of a value for said pre-defined display characteristic; and ascertaining, in response to the selected value, the value of the DSF.

5. The method of claim 4 wherein said baseline exposure is substantially an ISO normal exposure.

6. The method in claim 5 wherein said DSF value ascertaining step comprises the step of accessing, from a look-up table and in response to said selected value, a corresponding value of the DSF.

7. The method in claim 6 wherein values of said DSF, as stored in said table, are each given by the following equation:

$$\text{DISPLAY SIZE FACTOR} = ((M_S/M_N)(V_{DN}/V_{DS}))^X$$

where:

$M_S$ = a reproduction magnification ratio for the standard display size;

$M_N$ = a reproduction magnification ratio for the pre-defined display size;

$V_{DN}$ = a viewing distance associated with the pre-defined display size;

$V_{DS}$ = a viewing distance associated with the standard display size; and $X$ = a pre-defined numerical value; and the viewing distance is given by the following equation:

$$V_d = 3.64 + 11.34(\log_{10}(D))$$

where:

$V_d$ = the viewing distance as measured, in inches, between the print and an eye of a human observer; and $D$ = a diagonal dimension of the print.

8. In an imaging system, a method for capturing an image of a scene on a frame of photographic film and for subsequently enlarging the image as captured on the frame, in a manner defined by a pre-defined display characteristic, into an output image, said method comprising the steps of:

in an image capturing device having autofocusing capability with a number of autofocusing zones and further having a shutter speed and a lens with respectively a variable shutter speed and a variable lens aperture associated therewith, said image capturing device also having:

first determining an initial lens aperture value suitable for use with said number of autofocusing zones and associated with a standard display characteristic;

first ascertaining an initial shutter speed value which, in combination the initial lens aperture value, will produce a baseline exposure of said scene;

second determining, in response to said pre-defined display characteristic, a new lens aperture value such that a corresponding hyperfocal distance for one of said autofocusing zones remains substantially constant between said pre-defined and standard display characteristics such that an amount of depth-of-field overlap between adjacent ones of said zones will be substantially maintained between said pre-defined and standard display sizes and said captured image, when enlarged in said manner, will possess an amount of image blur that does not exceed a pre-defined amount of image blur associated with said standard display characteristic;

second ascertaining a new shutter speed value which, in combination with said new lens aperture value, will produce a baseline exposure of the scene;

capturing an image of said scene using said new lens aperture and shutter speed values; and printing, on said film and in a vicinity of said frame, data indicative of the pre-defined display characteristic; and in an enlarging device:

reading said data for the frame and from the film; and enlarging said image captured on the frame in the manner specified by said data to yield the output image.

9. The method in claim 8 wherein the pre-defined display characteristic is either a pre-defined value of display size of said output image or a pre-defined reproduction magnification ratio that will be used in forming said output image, and said standard display characteristic is a pre-determined standard display size and a pre-determined standard reproduction magnification ratio associated therewith.

10. The method in claim 9 wherein said second determining step comprises the step of ascertaining said new lens aperture by multiplying the initial lens aperture value by an inverse of a pre-defined display size factor (DSF), appropriate to the pre-defined display characteristic; and said second ascertaining step comprises the step of ascertaining said new shutter speed by multiplying the initial value of shutter speed by the pre-defined DSF.

11. The method in claim 10 wherein said second determining step further comprising the steps of:

reading a selected value, from an input control, of a value for said pre-defined display characteristic; and ascertaining, in response to the selected value, the value of the DSF.

12. The method of claim 11 wherein said baseline exposure is substantially an ISO normal exposure.

13. The method in claim 12 wherein said DSF value ascertaining step comprises the step of accessing, from a look-up table and in response to said selected value, a corresponding value of the DSF.

14. The method in claim 13 wherein values of said DSF, as stored in said table, are each given by the following equation:

$$\text{DISPLAY SIZE FACTOR} = ((M_S/M_N)(V_{DN}/V_{DS}))^X$$

where:

$M_S$ = a reproduction magnification ratio for the standard display size;

$M_N$ = a reproduction magnification ratio for the pre-defined display size;

$V_{DN}$ = a viewing distance associated with the pre-defined display size;

$V_{DS}$ = a viewing distance associated with the standard display size; and

X = a pre-defined numerical value; and the viewing distance is given by the following equation:

$$V_d = 3.64 + 11.34(\log_{10}(D))$$

where:

$V_d$ = the viewing distance as measured, in inches, between the print and an eye of a human observer; and D = a diagonal dimension of the print.

15. Apparatus for an image capturing device that captures an image of a scene on a frame of photographic film wherein the image as captured on the frame will be subsequently enlarged, in a manner defined by a pre-defined display characteristic, into an output image, said device having autofocusing capability with a number of autofocusing zones and further having a shutter speed and a lens with respectively a variable shutter speed and a variable lens aperture associated therewith, said apparatus comprising:

first means for determining an initial lens aperture value suitable for use with said number of autofocusing zones and associated with a standard display characteristic;

first means for ascertaining an initial shutter speed value which, in combination the initial lens aperture value, will produce a baseline exposure of said scene;

second means for determining, in response to said pre-defined display characteristic, a new lens aperture value such that a corresponding hyperfocal distance for one of said autofocusing zones remains substantially constant between said pre-defined and standard display characteristics such that an amount of depth-of-field overlap between adjacent ones of said zones will be substantially maintained between said pre-defined and standard display sizes and said captured image, when enlarged in said manner, will possess an amount of image blur that does not exceed a pre-defined amount of image blur associated with said standard display characteristic;

second means for ascertaining a new shutter speed value which, in combination with said new lens aperture value, will produce a baseline exposure of the scene;

means for capturing an image of said scene using said new lens aperture and shutter speed values; and means for printing, on said film and in a vicinity of said frame, data indicative of the pre-defined display characteristic.

16. The apparatus in claim 15 wherein the pre-defined display characteristic is either a pre-defined value of display size of said output image or a pre-defined reproduction magnification ratio that will be used in forming said output image, and said standard display characteristic is a pre-determined standard display size and a pre-determined standard reproduction magnification ratio associated therewith.

17. The apparatus in claim 16 wherein said second determining means comprises means for ascertaining said new lens aperture by multiplying the initial lens aperture value by an inverse of a pre-defined display size factor (DSF), appropriate to the pre-defined display characteristic; and said second ascertaining means comprises means for ascertaining said new shutter speed by multiplying the initial value of shutter speed by the pre-defined DSF.

18. The apparatus in claim 17 wherein said second determining means further comprises:

means for reading a selected value, from an input control, of a value for said pre-defined display characteristic; and means for ascertaining, in response to the selected value, the value of the DSF.

19. The apparatus of claim 18 wherein said baseline exposure is substantially an ISO normal exposure.

20. The apparatus in claim 19 wherein said DSF value ascertaining means comprises means for accessing, from a look-up table and in response to said selected value, a corresponding value of the DSF.

21. An imaging system for capturing an image of a scene on a frame of photographic film and for subsequently enlarging the image as captured on the frame, in a manner defined by a pre-defined display characteristic, into an output image, said system comprising:

an image capturing device having autofocusing capability with a number of autofocusing zones and further having a shutter speed and a lens with respectively a variable shutter speed and a variable lens aperture associated therewith, said image capturing device also having:

first means for determining an initial lens aperture value suitable for use with said number of autofocusing zones and associated with a standard display characteristic;

first means for ascertaining an initial shutter speed value which, in combination the initial lens aperture value, will produce a baseline exposure of said scene;

second means for determining, in response to said pre-defined display characteristic, a new lens aperture value such that a corresponding hyperfocal distance for one of said autofocusing zones remains substantially constant between said pre-defined and standard display characteristics such that an amount of depth-of-field overlap between adjacent ones of said zones will be substantially maintained between said pre-defined and standard display sizes and said captured image, when enlarged in said manner, will possess an amount of image blur that does not exceed a pre-defined amount of image blur associated with said standard display characteristic;

second means for ascertaining a new shutter speed value which, in combination with said new lens aperture value, will produce a baseline exposure of the scene;

means for capturing an image of said scene using said new lens aperture and shutter speed values; and means for printing, on said film and in a vicinity of said frame, data indicative of the pre-defined display characteristic; and an image enlarging device having:

means for reading said data for the frame and from the film; and means for enlarging said image captured on the frame in the manner specified by said data to yield the output image.

22. The system in claim 21 wherein the pre-defined display characteristic is either a pre-defined value of display size of said output image or a pre-defined reproduction magnification ratio that will be used in forming said output image, and said standard display characteristic is a pre-determined standard display size and a pre-determined standard reproduction magnification ratio associated therewith.

23. The system in claim 22 wherein said second determining means comprises means for ascertaining said new lens aperture by multiplying the initial lens aperture value by an inverse of a pre-defined display size factor (DSF), appropriate to the pre-defined display characteristic; and said second ascertaining means comprises means for ascertaining said new shutter speed by multiplying the initial value of shutter speed by the pre-defined DSF.

24. The system in claim 23 wherein said second determining means further comprises:

means for reading a selected value, from an input control, of a value for said pre-defined display characteristic; and means for ascertaining, in response to the selected value, the value of the DSF.

25. The system of claim 24 wherein said baseline exposure is substantially an ISO normal exposure.

26. The system in claim 25 wherein said DSF value ascertaining means comprises means for accessing, from a look-up table and in response to said selected value, a corresponding value of the DSF.

* * * * *